(12) United States Patent
Stowell et al.

(10) Patent No.: US 12,361,235 B2
(45) Date of Patent: *Jul. 15, 2025

(54) ELECTROMAGNETIC STATE SENSING DEVICES

(71) Applicant: Lyten, Inc., San Jose, CA (US)

(72) Inventors: Michael W. Stowell, Sunnyvale, CA (US); Bruce Lanning, Littleton, CO (US)

(73) Assignee: Lyten, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/667,316

(22) Filed: May 17, 2024

(65) Prior Publication Data

US 2024/0303447 A1 Sep. 12, 2024

Related U.S. Application Data

(63) Continuation of application No. 18/393,422, filed on Dec. 21, 2023, now Pat. No. 12,026,576, which is a
(Continued)

(51) Int. Cl.
  *G06K 7/10*     (2006.01)
  *C09D 11/52*    (2014.01)
  *H04W 4/80*     (2018.01)

(52) U.S. Cl.
  CPC .......... *G06K 7/10297* (2013.01); *C09D 11/52* (2013.01); *H04W 4/80* (2018.02)

(58) Field of Classification Search
  CPC ........ G06K 7/10297; G06K 7/00; G06K 7/08; G06K 7/084; C09D 11/52
(Continued)

(56) References Cited

U.S. PATENT DOCUMENTS 6,219,933 B1   4/2001   Taniguchi et al.
6,525,105 B1   2/2003   Udagawa et al.
(Continued)

FOREIGN PATENT DOCUMENTS

CN   207737077 U   8/2018
DE   200216290 U1  1/2003
(Continued)

OTHER PUBLICATIONS

Das, R., "Energy Harvesting for Vehicles", IDTechEx, downloaded from https://www.idtechex.com/journal/print-artles.asp?articleids=3984; 4 pages, Dec. 7, 2011.
(Continued)

*Primary Examiner* — Edwyn Labaze
(74) *Attorney, Agent, or Firm* — Paradice & Li LLP

(57) ABSTRACT

A container includes a surface defining a volume of the container, a first resonance portion disposed on a first portion of the surface of the container using one or more first carbon-based inks, and a second resonance portion disposed on a second portion of the surface of the container using one or more second carbon-based inks different than the one or more first carbon-based inks. The first resonance portion can resonate within a first range of frequencies in response to one or more electromagnetic pings received from a user device, and the second resonance portion can resonate within a second range of frequencies in response to the one or more electromagnetic pings, the second range of frequencies being different than the first range of frequencies. In some instances, the user device may be a smartphone, a radio frequency identification (RFID) reader, or a near-field communication (NFC) device.

30 Claims, 26 Drawing Sheets

Related U.S. Application Data continuation of application No. 18/239,900, filed on Aug. 30, 2023, now Pat. No. 11,915,088, which is a continuation of application No. 18/073,055, filed on Dec. 1, 2022, now Pat. No. 11,783,141, which is a continuation of application No. 17/693,649, filed on Mar. 14, 2022, now Pat. No. 11,537,806, which is a continuation of application No. 17/153,146, filed on Jan. 20, 2021, now Pat. No. 11,288,466, which is a continuation of application No. 16/530,173, filed on Aug. 2, 2019, now Pat. No. 10,943,076.

(60) Provisional application No. 62/716,741, filed on Aug. 9, 2018.

(58) Field of Classification Search
USPC .............................. 235/451, 439, 435, 375
See application file for complete search history.

(56) References Cited

U.S. PATENT DOCUMENTS

| | | |
|---|---|---|
| 6,667,092 B1 | 12/2003 | Brollier et al. |
| 6,885,291 B1 | 4/2005 | Pollack et al. |
| 7,057,562 B2 | 6/2006 | Forster et al. |
| 7,204,135 B2 | 4/2007 | Robert |
| 7,404,319 B2 | 7/2008 | Poulbot et al. |
| 7,581,439 B2 | 9/2009 | Rensel et al. |
| 7,847,697 B2 | 12/2010 | Bannerjee et al. |
| 8,045,947 B2 | 10/2011 | Mandal et al. |
| 9,884,715 B2 | 2/2018 | Hoofman et al. |
| 9,944,131 B2 | 4/2018 | Wei et al. |
| 10,920,035 B2 | 2/2021 | Rogojina et al. |
| 11,014,413 B2 | 5/2021 | Raisanen et al. |
| 11,446,966 B2 | 9/2022 | Stowell et al. |
| 11,472,233 B2 | 10/2022 | Stowell et al. |
| 11,479,062 B2 | 10/2022 | Stowell et al. |
| 2003/0201044 A1 | 10/2003 | Schick |
| 2005/0110277 A1 | 5/2005 | Adamson et al. |
| 2006/0230827 A1 | 10/2006 | Klees et al. |
| 2007/0175555 A1 | 8/2007 | Myatt |
| 2007/0295069 A1 | 12/2007 | Mancosu et al. |
| 2008/0074264 A1 | 3/2008 | Sharpe et al. |
| 2008/0156092 A1 | 7/2008 | Boiarski |
| 2008/0210004 A1 | 9/2008 | Gerding et al. |
| 2009/0072951 A1 | 3/2009 | Alberth, Jr. et al. |
| 2009/0267761 A1 | 10/2009 | Georgescu et al. |
| 2009/0277262 A1 | 11/2009 | Rensel et al. |
| 2009/0308742 A1 | 12/2009 | Paranjape |
| 2010/0073142 A1 | 3/2010 | Kim |
| 2010/0126263 A1 | 5/2010 | Brusarosco et al. |
| 2010/0207754 A1 | 8/2010 | Shostak et al. |
| 2013/0150516 A1 | 6/2013 | Lettow |
| 2015/0118492 A1 | 4/2015 | Sitharaman et al. |
| 2015/0317896 A1 | 11/2015 | Planton et al. |
| 2016/0300240 A1 | 10/2016 | Bright et al. |
| 2017/0022045 A1 | 1/2017 | Ray et al. |
| 2017/0070204 A1 | 3/2017 | McIntyre |
| 2017/0178059 A1 | 6/2017 | Gibson et al. |
| 2018/0072553 A1 | 3/2018 | Lyons et al. |
| 2018/0143062 A9 | 5/2018 | Gurumohan et al. |
| 2018/0165485 A1 | 6/2018 | Martinez de Velasco Cortina et al. |
| 2018/0265666 A1 | 9/2018 | Anzelmo et al. |
| 2018/0346684 A1 | 12/2018 | Polyzos et al. |
| 2019/0190154 A1 | 6/2019 | Stowell |
| 2020/0101797 A1 | 4/2020 | Ojala et al. |
| 2021/0005854 A1 | 1/2021 | Thompson et al. |
| 2021/0293521 A1 | 9/2021 | Stowell et al. |

FOREIGN PATENT DOCUMENTS

| | | |
|---|---|---|
| EP | 1419476 A1 | 5/2004 |
| EP | 1798070 A1 | 6/2007 |
| EP | 2118965 B1 | 5/2011 |
| JP | 2008-285331 A | 11/2008 |
| JP | 2016-051438 A | 4/2016 |
| JP | 2016-165805 A | 9/2016 |
| KR | 10-2019-0000627 A | 1/2019 |
| KR | 10-2019-0010966 A | 2/2019 |
| KR | 10-1945996 B1 | 2/2019 |
| WO | 99/29523 A1 | 6/1999 |
| WO | 2013/192335 A1 | 12/2013 |
| WO | 2018/101379 A1 | 6/2018 |
| WO | 2019/122507 A1 | 6/2019 |
| WO | 2020/027973 A1 | 2/2020 |
| WO | 2020/198451 A1 | 10/2020 |
| WO | 2022/086611 A1 | 4/2022 |

OTHER PUBLICATIONS

European Search Report and Opinion dated Oct. 10, 2022 for EP Appl. No. 20777796.2; 7 pages.

Extended European Search Report for EP Appl. No. 19846725.0, Apr. 4, 2022; 13 pages.

International Search Report and Written Opinion dated Jul. 24, 2020, issued in PCT Application No. PCT/US2020/024920; 13 pages.

International Search Report and Written Opinion dated Dec. 30, 2019, issued in PCT Appl. No. PCT/US2019/044862; 9 pages.

International Search Report and Written Opinion dated May 31, 2022, issued in PCT Appl. No. PCT/US2022/019623; 13 pages.

Japanese Office Action (translation) issued in JP Appl. No. 2023-188368 on Dec. 26, 2023; 5 pages.

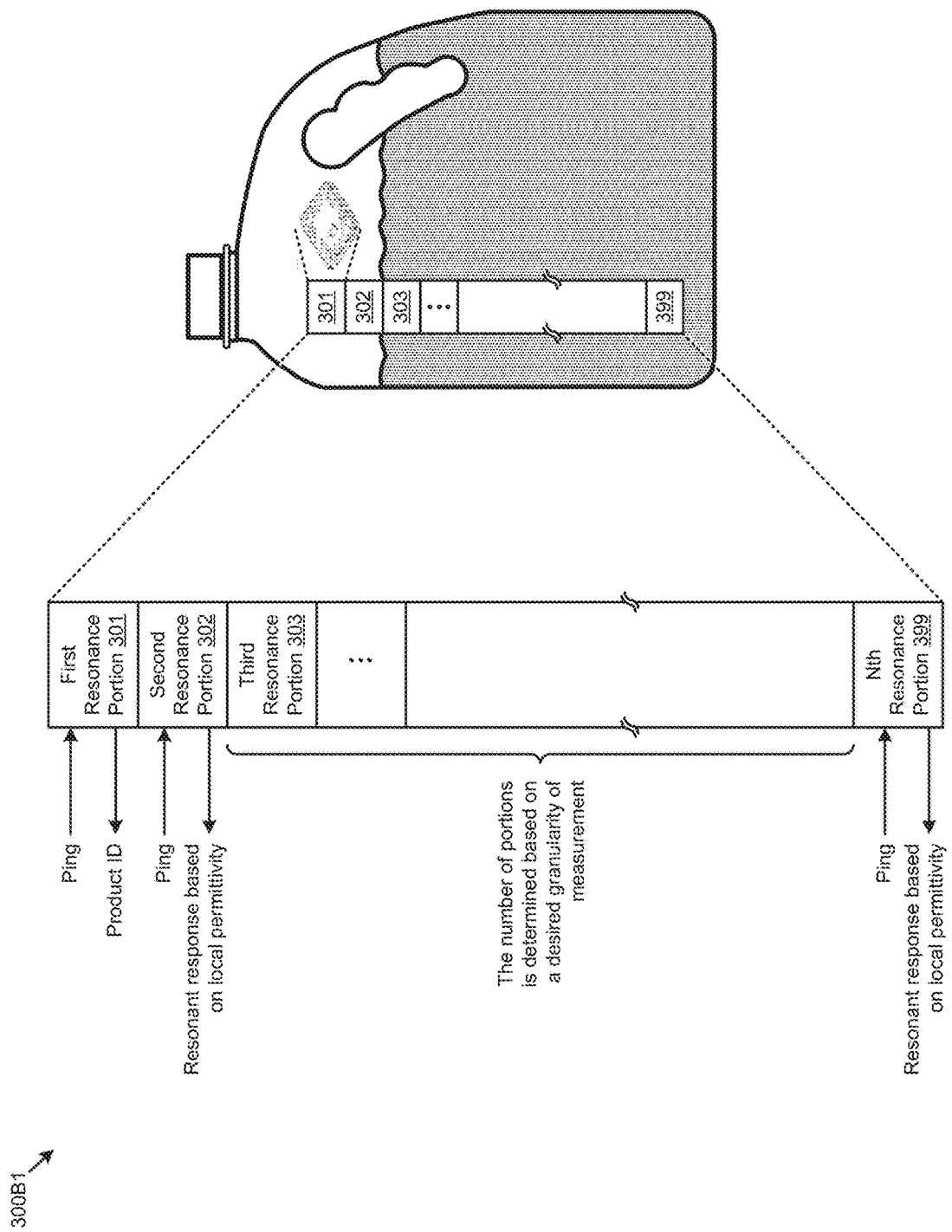
FIG. 3B1

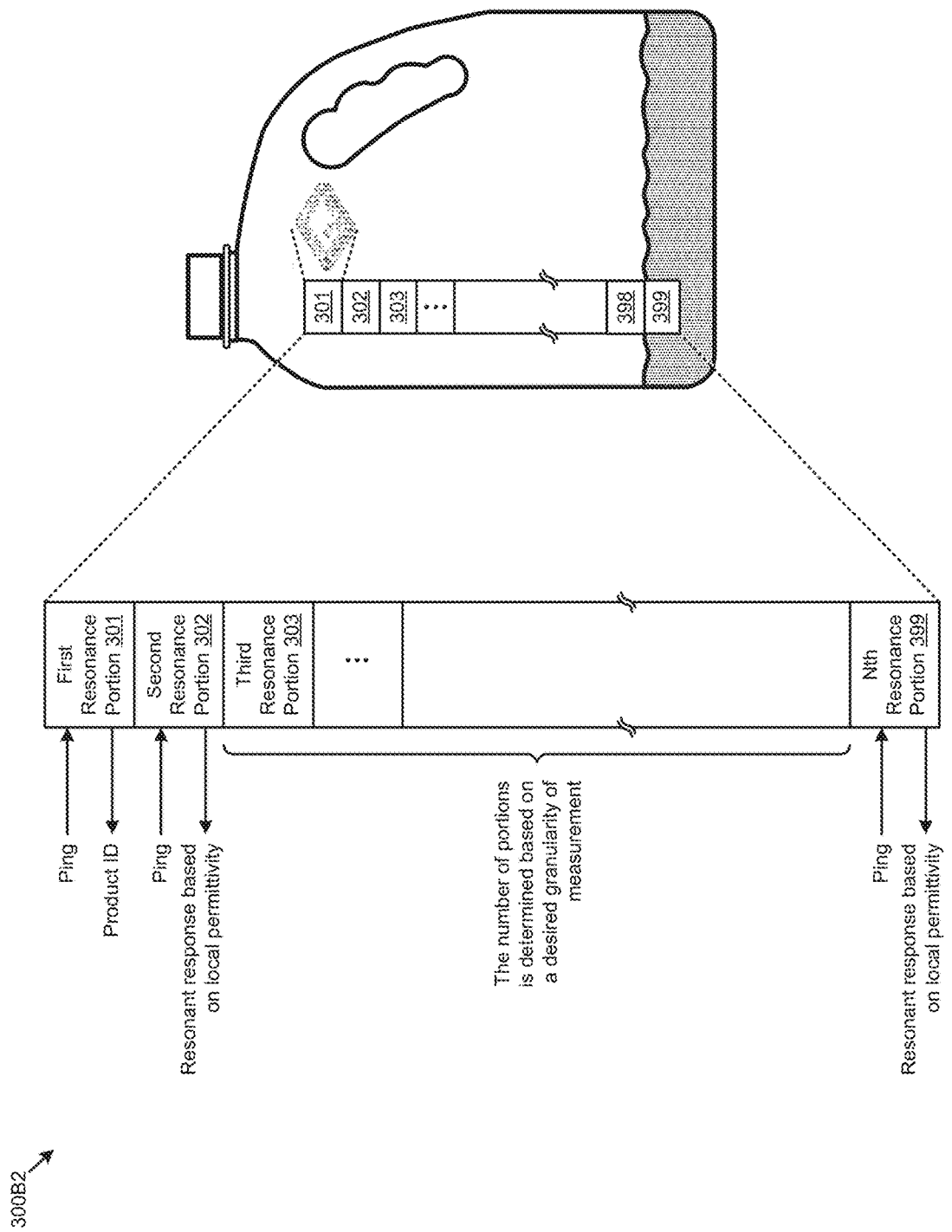
FIG. 3B2

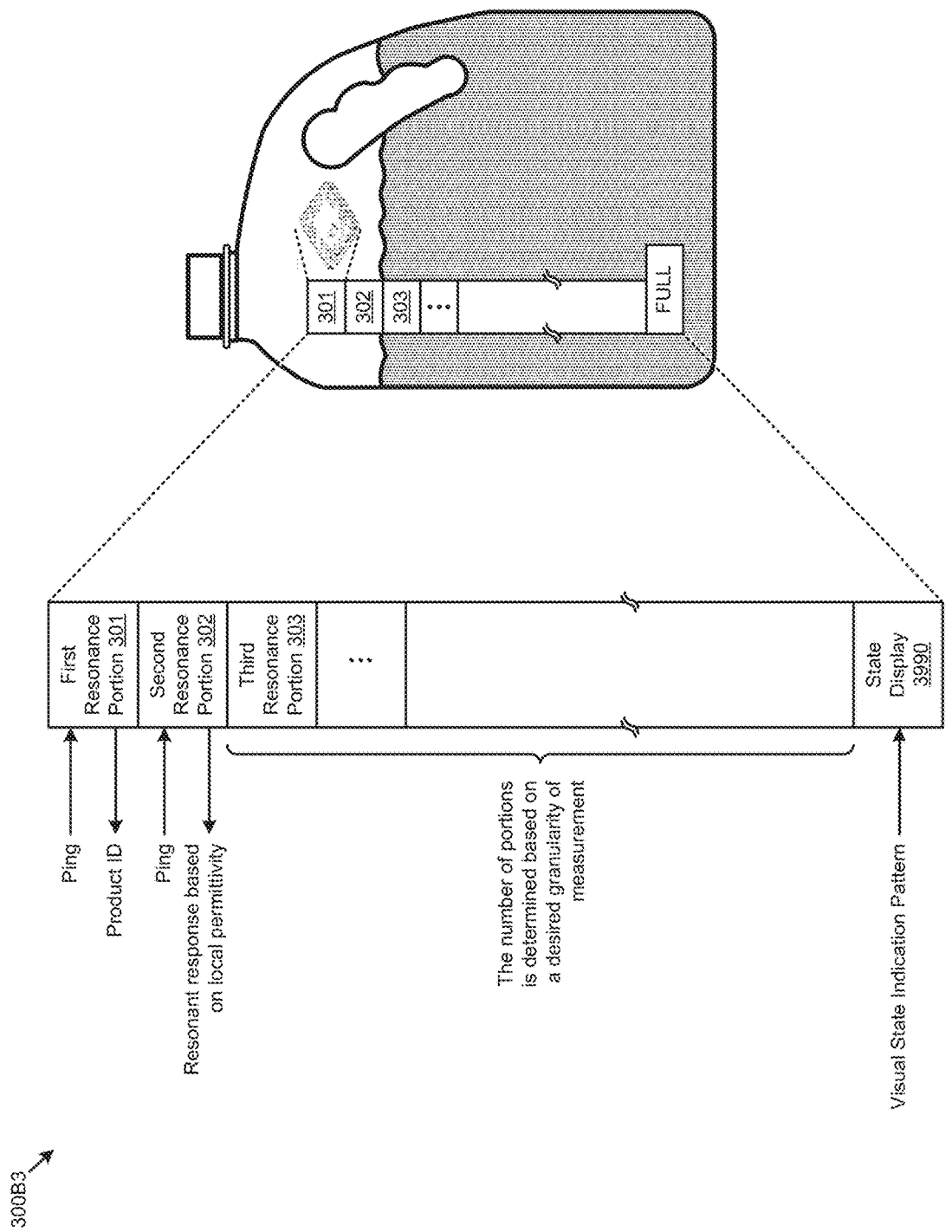
FIG. 3B3

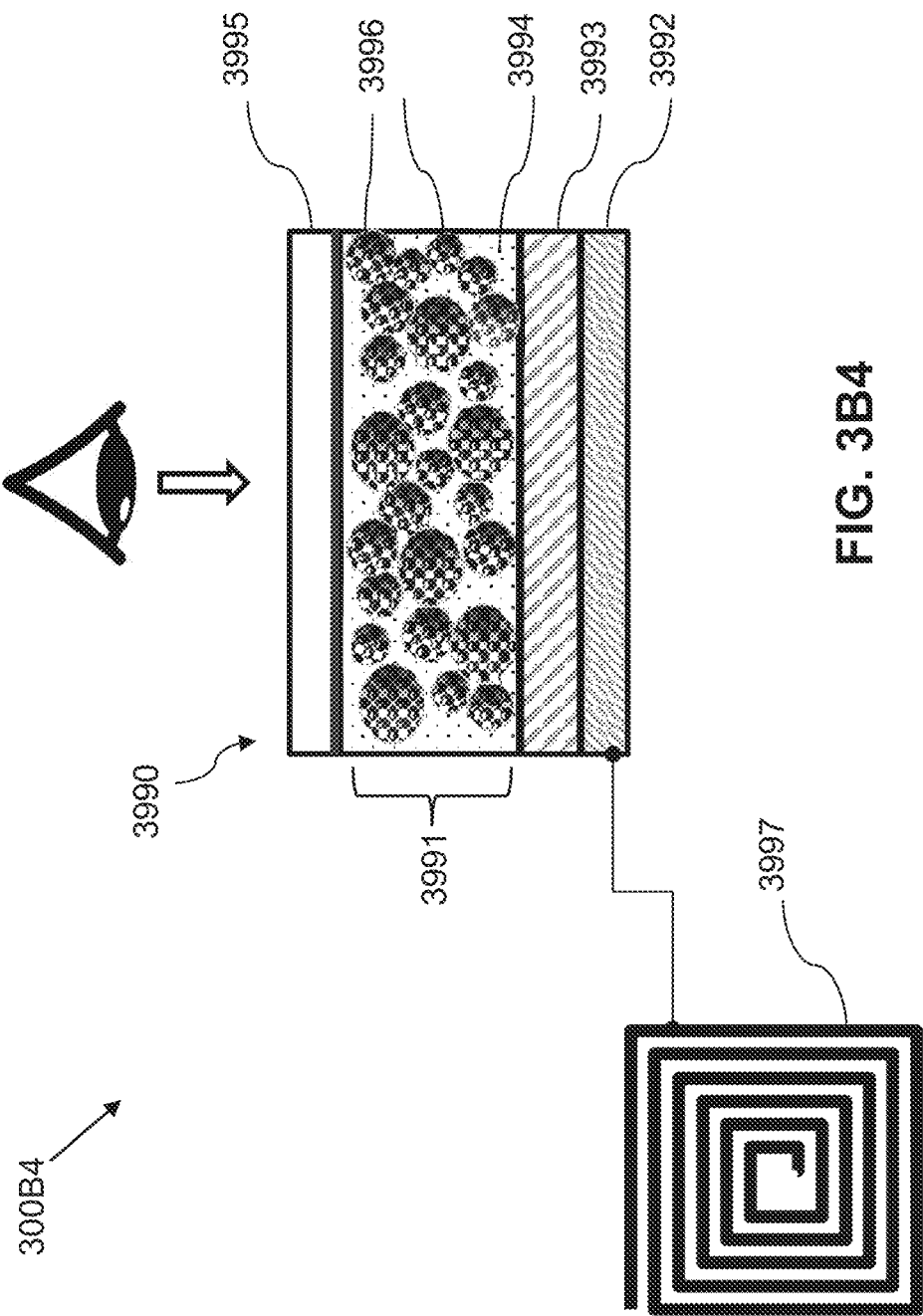
FIG. 3B4

300C

400A1
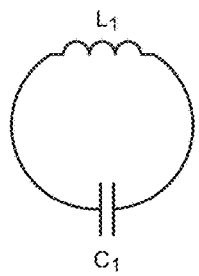
$$f_1 = \frac{1}{2p\sqrt{L_1 C_1}}$$
FIG. 4A1
400A2
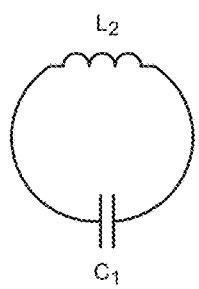
$$f_2 = \frac{1}{2p\sqrt{L_2 C_2}}$$
$$f_1 - f_2 = f_D$$
FIG. 4A2

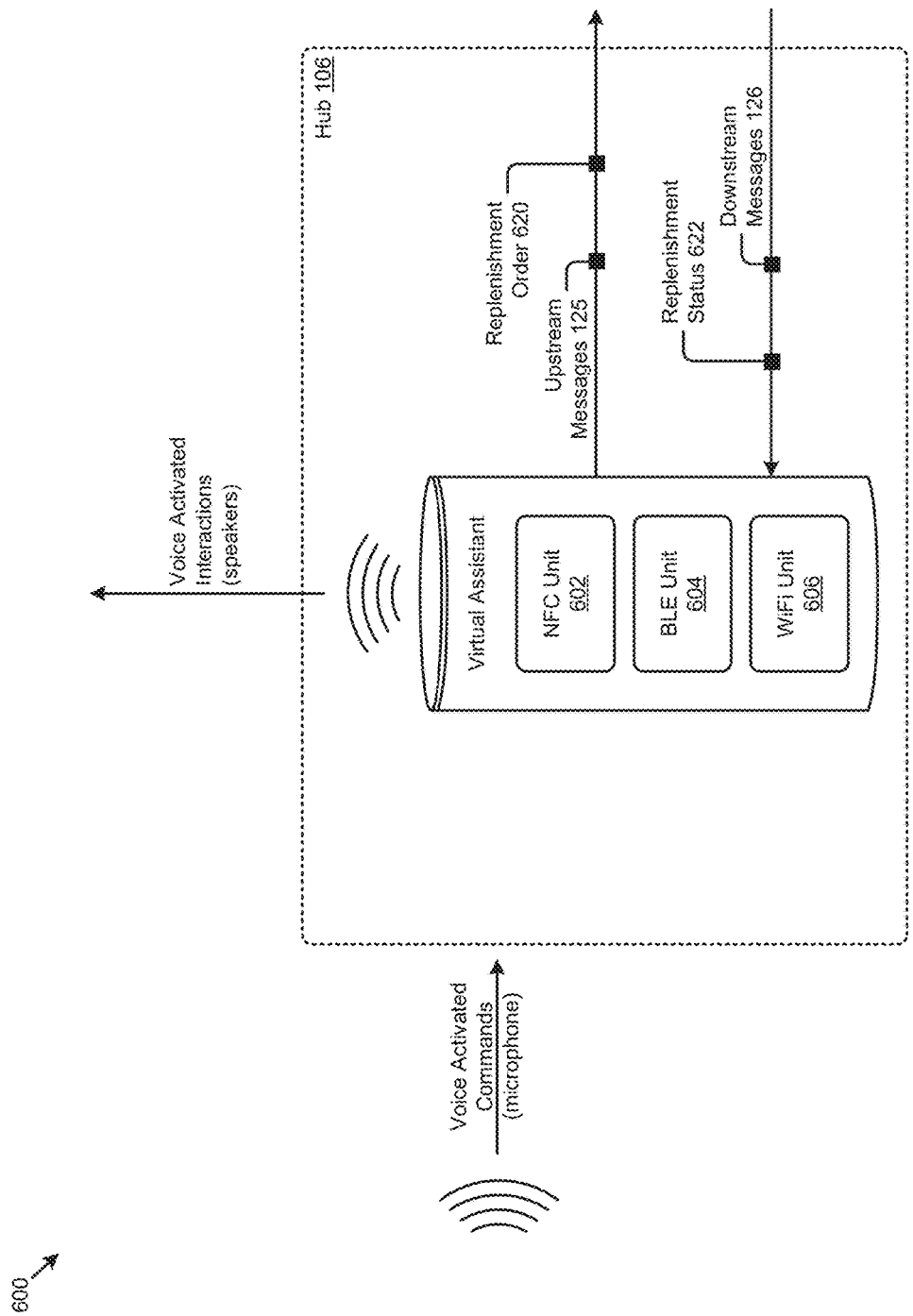

ELECTROMAGNETIC STATE SENSING DEVICES

CROSS-REFERENCE TO RELATED APPLICATIONS

This patent application is a continuation application claiming priority to U.S. patent application Ser. No. 18/393,422 entitled "ELECTROMAGNETIC STATE SENSING DEVICES" and filed on Dec. 21, 2023, which is a continuation of U.S. patent application Ser. No. 18/239,900 entitled "ELECTROMAGNETIC STATE SENSING DEVICES" and filed on Aug. 30, 2023, now U.S. Pat. No. 11,915,088 B2, which is a continuation of U.S. patent application Ser. No. 18/073,055 entitled "ELECTROMAGNETIC STATE SENSING DEVICES" and filed on Dec. 1, 2022, now U.S. Pat. No. 11,783,141 B2, which is a continuation of U.S. patent application Ser. No. 17/693,649 entitled "ELECTROMAGNETIC STATE SENSING DEVICES" and filed on Mar. 14, 2022, now U.S. Pat. No. 11,537,806 B2, which is a continuation of U.S. patent application Ser. No. 17/153,146 entitled "ELECTROMAGNETIC STATE SENSING DEVICES" and filed on Jan. 20, 2021, now U.S. Pat. No. 11,288,466 B2, which is a continuation of U.S. patent application Ser. No. 16/530,173 entitled "ELECTROMAGNETIC STATE SENSING DEVICES" and filed on Aug. 2, 2019, now U.S. Pat. No. 10,943,076 B2, which claims priority to U.S. Provisional Patent Application No. 62/716,741 entitled "PRODUCT SENSING" and filed on Aug. 9, 2018, all of which are assigned to the assignee hereof. The disclosures of all prior applications are considered part of and are incorporated by reference in this patent application.

TECHNICAL FIELD

This disclosure relates generally to sensors, and more particularly, to radio-frequency (RF) sensing devices.

DESCRIPTION OF RELATED ART

Sensors are widely used for many purposes, and typically utilize electromagnetic signals to receive and send information. For example, radiofrequency identification (RFID) tags send information to an RFID reader, where in the case of passive RFID tags, a tag utilizes energy from an interrogating signal to power the tag and send a signal back to the reader. Conventional techniques for use of electromagnetic sensing devices exhibit many deficiencies, therefore, what is needed is a technique or techniques that address such deficiencies.

SUMMARY

This Summary is provided to introduce in a simplified form a selection of subjects that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented in a container. In some implementations, the container may include a surface defining a volume of the container, a first resonance portion disposed on a first portion of the surface of the container using one or more first carbon-based inks, and a second resonance portion disposed on a second portion of the surface of the container using one or more second carbon-based inks different than the one or more first carbon-based inks. The first resonance portion can resonate within a first range of frequencies in response to one or more electromagnetic pings received from a user device, and the second resonance portion can resonate within a second range of frequencies in response to the one or more electromagnetic pings, the second range of frequencies being different than the first range of frequencies. In some instances, the user device may be a smartphone, a radio frequency identification (RFID) reader, or a near-field communication (NFC) device.

The first resonance portion may include a first assembly of three-dimensional (3D) carbon-containing structures printed on the first portion of the surface of the container, and the second resonance portion may include a second assembly of 3D carbon-containing structures printed on the second portion of the surface of the container. In some instances, a resonant frequency of the first resonance portion is based at least in part on a geometry of the first portion of the surface of the container, and a resonant frequency of the second resonance portion is based at least in part on a geometry of the second portion of the surface of the container. In some aspects, the first portion of the surface of the container has a different physical geometry than the second portion of the surface of the container. In other aspects, a resonant frequency of at least one of the first resonance portion or the second resonance portion is based at least in part on the permeability of the container.

In some implementations, the first resonance portion can indicate a presence of an item within the container by resonating within the first range of frequencies in response to the one or more electromagnetic pings. In some instances, the item includes an analyte, and the resonant frequency of the first resonance portion is based at least in part on one or more characteristics of the analyte. In other instances, the second resonance portion can indicate state information of the item by resonating within the second range of frequencies in response to the one or more electromagnetic pings. The state information may include one or more of a quantity of the item within the container, a potency of the item within the container, or a staleness of the item within the container.

In other implementations, the container may also include a third resonance portion disposed on a third portion of the surface of the container using one or more third carbon-based inks different than the one or more first carbon-based inks and the one or more second carbon-based inks. The third resonance portion can resonate within a third range of frequencies in response to the one or more electromagnetic pings. In some instances, the third resonance portion can indicate product identification information of the item by resonating within the third range of frequencies in response to the one or more electromagnetic pings. In some aspects, the product identification information includes a product code or a product ID of the item. In other instances, the first resonance portion includes a first assembly of 3D carbon-containing structures printed on the first portion of the surface of the container, the second resonance portion includes a second assembly of 3D carbon-containing structures printed on the second portion of the surface of the container, and the third resonance portion includes a third assembly of 3D carbon-containing structures printed on the third portion of the surface of the container, where each of the first, second, and third assemblies of 3D carbon-containing structures can resonate at a different frequency in response to the one or more electromagnetic pings.

In some other implementations, the first resonance portion can indicate a presence of an analyte by resonating at a first frequency in response to the one or more electromagnetic pings, and indicate an absence of the analyte by resonating at a second frequency in response to the one or more electromagnetic pings, the second frequency being different than the first frequency. In some instances, the first resonance portion includes a material that is sensitive to the presence of the analyte. In some aspects, a capacitance of the material is based at least in part on the presence of the analyte within the container. In other aspects, the material includes a redox mediator.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 3B1 illustrates a deployment scenario in which a first state of liquid contents is measured, according to an embodiment.

FIG. 3B2 illustrates a deployment scenario in which a second state of liquid contents is measured, according to an embodiment.

FIG. 3B3 illustrates a deployment scenario in which a state of liquid contents is measured and displayed, according to an embodiment.

FIG. 3B4 illustrates a cross-sectional view of a printed display for indicating the state of contents of a product, according to an embodiment.

FIG. 4A1 and FIG. 4A2 are equivalent circuit models of an electromagnetic state sensing device in a first environment and a second environment, respectively, according to an embodiment.

FIG. 6 depicts a virtual assistant as used as a hub in a replenishment system, according to an embodiment.

Like reference numbers and designations in the various drawings indicate like elements.

DETAILED DESCRIPTION

Figure 1:
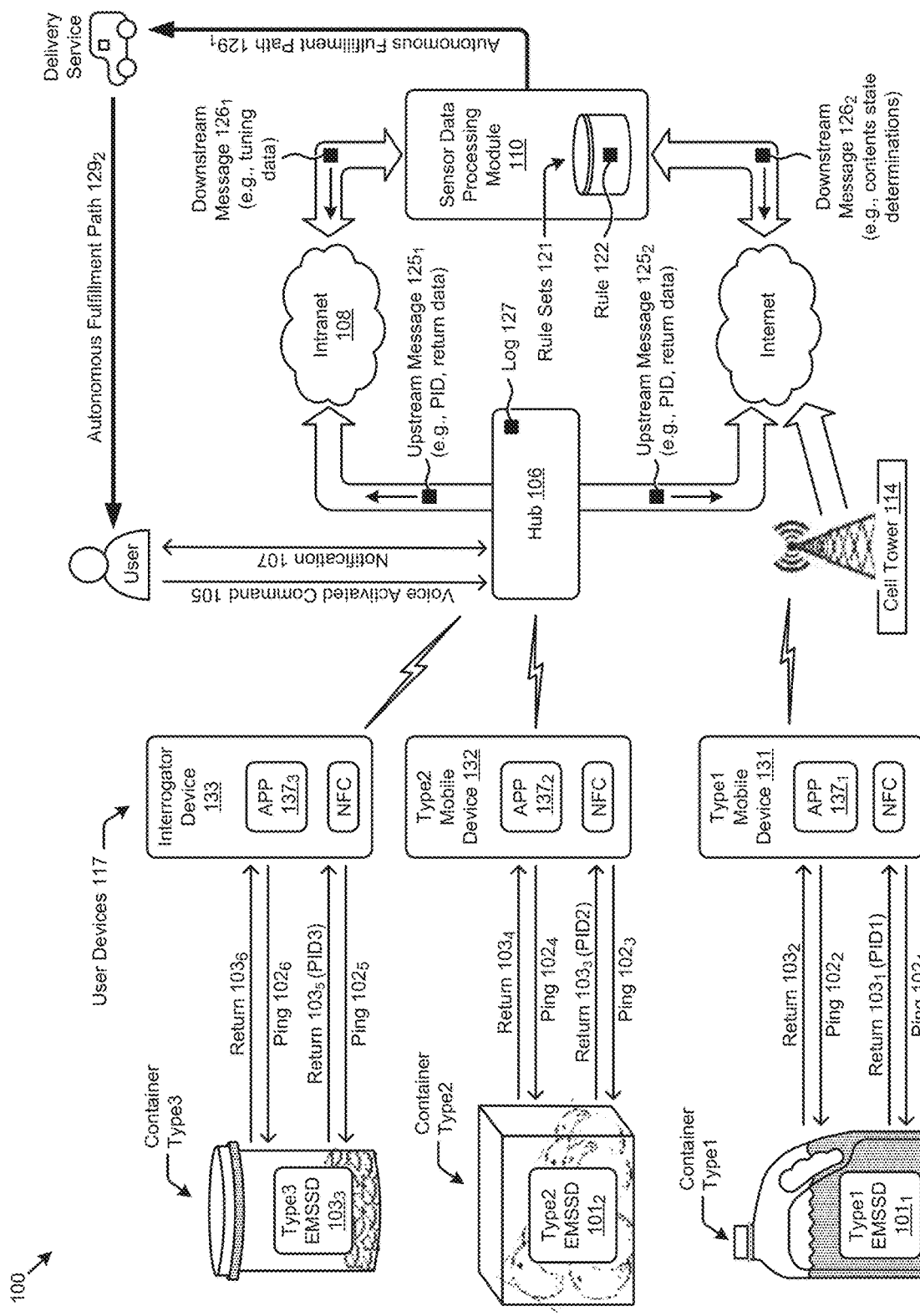
FIG. 1 depicts an environment in which electromagnetic state sensing devices can be deployed, according to an embodiment.

Aspects of the present disclosure solve problems associated with how to inexpensively deploy state sensors. Some embodiments are directed to approaches for printing sensing devices that can emit not only identification information, but also product state information.

Various methods for identification of a product in its packaging have been in use since the dawn of eCommerce. However, mere identification of the existence of a product at a particular location and time fails to address a consumer's need for ongoing automatic status checks on products that are in or near the consumer's residence, car, boat, etc. Unfortunately, neither conventional radio frequency identifiers (RFIDs) nor conventional near-field labels are able to provide this information. As such, there is a need for new types of sensing devices that can emit not only product identification information, but also product state information in a manner that can be read by a mobile reader or stationary scanner.

Various methods for identification of a product in its packaging have been in use for as long as there have been products delivered in packages. In the earliest days of bar codes, a "mark and space" symbol was printed onto the packaging. Then, through use of a symbol reader (e.g., a barcode reader/scanner), a particular product could be identified.

Printing of such symbols on packaging is very inexpensive, and symbol readers are inexpensive enough to be deployed with, and integrated into, for example, a cash register. When such a symbol reader and corresponding cash register are further interfaced with a central computer system, purchase of a unit of a uniquely identified product can be tallied. Inventory accounting, ordering, product replenishment, and other functions of ongoing commerce can be facilitated, in some cases without human intervention.

In some cases, however, it is not possible and/or not convenient to print such bar codes onto product packaging and/or, in some cases it is not possible or convenient to deploy a reader. In such cases, a radio frequency identifier (RFID) can be affixed to or embedded in the product or its packaging. When the product—with its affixed or embedded RFID—is in proximity to an RFID reader, the presence can be tallied. A given RFID can be manufactured so as to emit a unique identifier when stimulated by a "ping". The unique identifier can have any number of bits, and as such the unique identifier can be associated with a particular product. As such, product replenishment and other functions of commerce can be facilitated.

Unfortunately, merely identifying the product, or merely identifying a particular existence and location of the identified product, has limitations. For example, while the sensing of a product at a cash register or at an egress can be valuable information (e.g., to detect the purchase of a unit of a product, or to detect movement of a unit of a product), it is sometimes valuable to sense more information (e.g., the state) about the particular unit of the product.

Some attempts have been made to sense characteristics of contents by printing a sensing device on the product packaging and "pinging" the sensing device to gather information about the contents. However, such sensing devices have been limited to measuring only environmental variables such as humidity, temperature, etc. Thus, the need to sense more information (e.g., the state) about the particular unit of the product remains unfulfilled.

For example, it might be useful to know how full a container is. It may also be useful to know if a container is leaking, or if the contents are decaying, rotting or for other reasons exuding gasses, etc. This situation is further complicated by the need to regularly update the state information about a plurality of units of different products. For example, in a household situation, it might be desired to regularly update the state information (e.g., quantity, potency, staleness, etc.) of any or all products that are encountered as a consumer traverses his or her domicile (or car, or boat, etc.).

Neither conventional RFIDs nor conventional near-field labels are able to provide the needed information. What is needed are systems that facilitate collection from new types of sensing devices that can emit not only identification information, but also product-specific state information.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form. Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments-they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

FIG. 1 depicts an environment 100 in which electromagnetic state sensing devices disclosed herein can be deployed and configured to emit not only identification information, but also product state information. Specifically, the figure is being presented with respect to its contribution to addressing the problem of how to inexpensively deploy state sensors. More specifically, FIG. 1 depicts an environment whereby quantitative values can be sensed by an electromagnetic state sensing device (EMSSD) and relayed to a computing site for data processing. "Electromagnetic" as used herein refers to signals that propagate at relatively low frequencies (e.g., 125 kHz) or at higher radio frequencies (13.6 MHZ), or higher.

As shown, sensors 100 (e.g., sensor 1011, sensor 1012, and sensor 1013) are stimulated with a ping. The stimulated sensors 100 emit a resonant signature that characterizes one or more aspects of the product that is within its corresponding container. Several different container types and several different container aspects are depicted.

A ping can be raised, for instance, by a smartphone (or other type of mobile device). Specifically, an application ("app", i.e., a software application, computer program, computer-readable medium) on a mobile device (e.g., a smartphone) can control an electromagnetic emitter device driver (e.g., a near-field communication (NFC) device driver) which in turn can cause the electromagnetic emitter device to raise a ping. As such, the frequency, duration, and shape of a ping can be controlled. Upon excitation by a ping, a nearby sensor resonates and emits a signature that encodes information pertaining to aspects of the product inside its container. The information pertaining to aspects of the product inside its container are reformatted and relayed upstream for further processing. In some embodiments, and as shown, the information that is reformatted and relayed upstream can be routed for communication over the internet or intranet 108 for additional sensor data processing.

Many different types or configurations of EMSSDs can be applied to product packaging. As shown, a type1 EMSSD $101_1$ can be applied to a type 1 container, a type2 EMSSD $101_2$ can be applied to a type2 container, and a type3 EMSSD $101_3$ can be applied to a type3 container. Such containers can be a vessel (e.g., a type1 container such as a jug or bottle made of plastic or glass) to hold liquids (e.g., detergents, alcohol, fuel, milk, etc.).

Alternatively, containers can be a carton (e.g., a type2 container such as cardboard or paperboard box, which may or may not be coated with a plastic material) to hold any contents. Further, a container can be a specialized container (e.g., a type3 container such as a pill bottle, hinged box, dropper bottle) that is designed to contain some particular product, such as medicine. Any of the foregoing containers might be presented in any setting.

Strictly as one example, the foregoing containers of different types might be found in a household setting.

Accordingly, a consumer might walk through his or her domicile and, during the course of walking, the mobile device will emit one or more electromagnetic pings and capture electromagnetic returns. Any one or more user devices 117 that can be controlled to emit electromagnetic radiation can emits pings and capture returned signals.

As depicted, a user device 117 can be a type 1 mobile device 131 (e.g., an iOS phone), or a user device 117 can be a type2 mobile device 132 (e.g., an Android phone), or a user device 117 can be a stationary instance of an interrogator device 133 (e.g., a stationary RFID reader), such as might be located in a pantry or a medicine chest. Any of such user devices or variants can be configured with executable code (e.g., an app) that controls, either directly or indirectly, an electromagnetic emission device such as the shown NFC devices (user devices 117). Any number of user devices can be in general proximity of any EMSSD, and each user device emits pings and captures responses. If the pings and responses happen to occur at the same time and within close proximity to each other, each app (e.g., app $137_1$, app $137_2$, and app $137_3$) can recognize the collision and retry the pings, thus implementing a collision detection, multiple access protocol.

In the present disclosure, pings can be tuned to various frequencies for various purposes based on the type of product identified by the system, without need for human interaction. In the example shown, a first ping $102_1$ is emitted at a first frequency that corresponds to a first RFID frequency. A first portion of the EMSSD $101_1$ responds to the first ping with a first return $103_1$ (i.e., an electromagnetic signal such as "PID1") which encodes a value (e.g., a string of 1s and/or 0s) that corresponds to the product and/or container type. Given that encoded value, the app $137_1$ can determine (e.g., tune, tailor, customize) characteristics of a second ping $102_2$. The second return $103_2$ is responsive to the second ping $102_2$. The second return $103_2$ encodes information about the contents of the shown container type1. The second return $103_2$ from the EMSSD may be called a "signature." In some embodiments, the second return $103_2$ is captured by the app and decoded on the mobile device. In other embodiments, the second return $103_2$ is captured by the app, packaged into network communication packets, and forwarded to cell tower 114, which in turn relays the network communication packets to a data processing facility (e.g., sensor data processing module 110) via the internet. The data processing facility in turn applies rule sets 121 to determine a further action (replenishment, discard, repair, etc.).

The devices and systems shown in environment 100 operate together to form an autonomous monitoring system, such as a fulfillment system. As shown the sensor data processing module 110 communicates over autonomous fulfillment path $129_1$ to a delivery service, which in turn traverses autonomous fulfillment path $129_2$ to deliver replenished product to the user.

As indicated above, an EMSSD can be configured to correspond to a particular product and/or container type. FIG. 1 depicts a carton, shown as container type2, into which the carton product can be situated. Strictly as one example, the container type2 might hold perishables (e.g., fruits, vegetables, etc.). A corresponding EMSSD can be configured to sense any or all of, for instance, (1) a level or volume of product inside the container, (2) a concentration of gasses that accompany perishable foods or food spoilage, (3) a temperature. In operation, a ping 1023 at an RFID frequency causes a portion of EMSSD 1012 to respond with return 1033 that encodes a product ID (e.g., "PID2"). The product ID is used as an index for the rule sets 121 to isolate at least one rule 122, the application of which rule results in tuning data being delivered to the app in the form of a downstream message 1261. For example, based on the product identified from the first ping, the selected rule may customize the signal frequency range and/or number of pings for the type of sensor on the product, to be used when subsequent pings are sent to gather information about the contents in the product packaging.

Some topologies of environment 100 include an intranet 108. In some of such topologies a downstream message 1261 passes through a hub 106 before being routed to the app. In such cases, the occurrence of detection of the product corresponding to the product ID is logged in log 127, which log is used for various purposes, some of which are discussed infra.

As discussed, the downstream message 1261 may contain tuning data. The tuning data may include information used by the app to send one or more further pings (e.g., ping 1024). The further pings may be tuned to particular frequencies determined based at least in part on the characteristics of the EMSSD. More specifically, the product ID can be used as a key to retrieve one or more rules, which in turn can inform the app about specific ping frequencies as well as the timing of pings. Strictly as one example, rules can be processed by the app so as to interrogate an EMSSD in accordance with any of various pings, including simple to complex combinations of pings over any time period and in various timed sequences. As such, the return 1034 may include several signatures in response to the various pings, any of which signatures can be sent as messages (e.g., upstream message 1251, upstream message 1252) (e.g., over the internet) to the sensor data processing module 110 for analysis. The analysis may result in determination of any or all of, for instance, (1) a level or volume of product inside the container, (2) a concentration of analytes that accompany perishable foods or food spoilage (e.g., ethylene, ammonia, other gasses), (3) a temperature, and/or other information about the state of contents in the container. The determinations can be sent to the hub 106 as formatted content in downstream message 1262.

In some topologies, the downstream message 1261 passes through a hub 106 before being routed to the app. A hub can be implemented by a voice activated command 105 (e.g., a voice assistant). The voice assistant can intercept the downstream message 1261 and process it, possibly by emitting a notification 107, which notification may be in the form of natural language such as "It's time to order more kale—shall I place an order for you?" Or "It got too warm in here today—you should move the kale to a cooler location." Or "The kale is going bad—you should compost it now." In some topologies the notification 107 can take other forms such as, but not limited to, text or email messages. The notification message may include information such as a quantity indication, an expiration date, a refill date, a refill count, a lot number, a chemical composition, and/or a concentration indication. In some topologies, a log can be maintained of at least some of the information regarding contents in the product packaging. For example, the log may include an entry corresponding to at least a portion of the information about the contents. The log can be maintained by a network access point, where the network access point may be activated by receiving a voice activated command.

In some settings, and using all or portions of the foregoing communication and data analysis techniques, an interrogator device 133 emits ping 1025, receives return 1035 (e.g., product ID "PID3") and then emits a further ping 1026, which further ping is tuned specifically for the characteristics of container type3 and/or the characteristics of the product that is contained in container type3. The emission of the further ping 1026, results in emission of return 1036.

As mentioned hereinabove, an app on a mobile device (e.g., a smartphone) can control an electromagnetic emitter device driver (e.g., an NFC device driver) which in turn can cause the electromagnetic emitter device to raise a ping. A processing flow in one illustrative deployment scenario is presented in FIG. 2.

Figure 2:
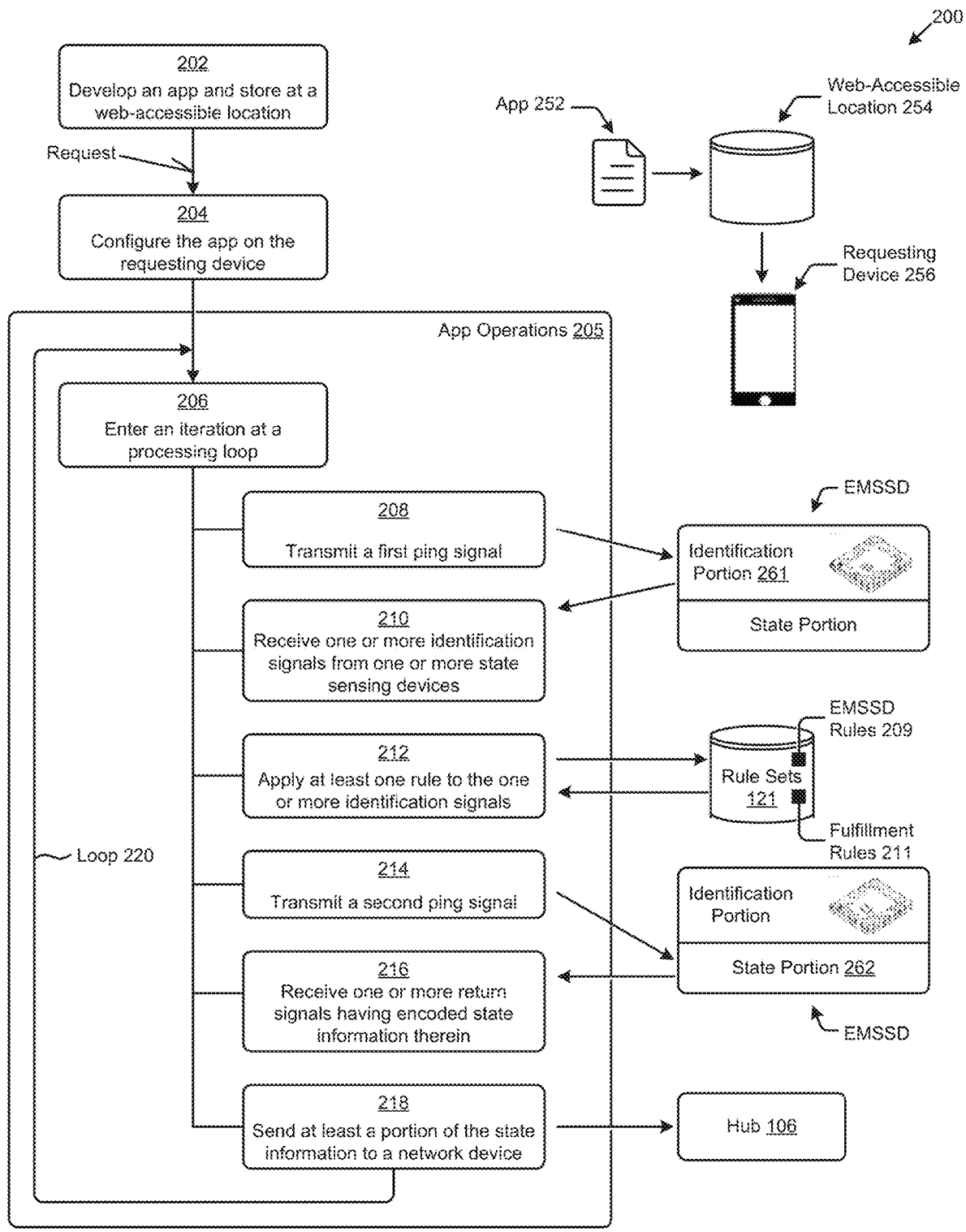
FIG. 2 presents a flow chart depicting a processing flow by which electromagnetic state sensing devices can be deployed, according to an embodiment.

FIG. 2 presents a flow chart depicting a processing flow 200 by which electromagnetic state sensing devices can be deployed. As an option, one or more variations of processing flow 200 or any aspect thereof may be implemented in the context of the architecture and functionality of the embodiments described herein. The processing flow 200 or any aspect thereof may be implemented in any environment.

In the depicted deployment scenario, an app is developed by application and driver software engineers and stored at a web-accessible location (step 202). The web-accessible location 254 can be any location where a downloadable instance of an app 252 can be stored. A download can be requested by any requesting device 256 that is connected to the internet. Moreover, the requesting device can be a mobile device of any type, or can be a stationary device of any type such as a desktop computer or a hub or a digital assistant. In this scenario, the requesting device 256 is depicted as a smartphone but may also be, for example, a smartwatch, a tablet or a laptop computer.

At any moment in time the requesting device can issue a request (e.g., via an internet call to a uniform resource identifier (URI)), which request causes the app to be downloaded onto the device and configured for ongoing operation (step 204). The configuration can be specific to characteristics of the target device (i.e., requesting device) and/or any supervisory software (e.g., operating system) that is hosted on the target device.

At some moment in time after the download and configuration, the app enters a processing loop (step 206). The iterations through the loop 220 can be performed on any schedule, possibly a schedule that implements various power-saving techniques. In some cases, the order of the operations performed in the loop can change based on conditions that are present at the moment. Although the app operations 205 depict a particular flow of the operations, in some situations alternative ordering is possible and, in some cases, some of the operations are not performed in a given iteration of the loop.

As shown, the loop 220 includes operations to emit a first ping signal when in proximity of an EMSSD (step 208) so as to stimulate at least the identification portion 261 of the EMSSD. Based on an identification code (e.g., a product ID) derived from an identification signal (step 210), the app may apply all or portions of applicable rules (step 212). The identification code (e.g., a product ID) can be used as an index into the rule sets 121 to identify EMSSD rules 209 and fulfillment rules 211.

Application of certain of the EMSSD rules 209 result in tuning data being delivered to the app. Application of certain of the fulfillment rules 211 result in actions associated with the product contents, such as reading a liquid level or providing measurements of different analytes, or reading a quantity of contents within its container. The app in turn will transmit a second ping signal (step 214) so as to stimulate at least the state portion 262 of the EMSSD. The app receives returned state signals that are returned in response to the second ping signal based on the state of the product at the time of the second ping (step 216). Those returned state signals are decoded to determine state information. For example, the printed electromagnetic state sensing device may emit a first variation of the second electromagnetic radiation signal (e.g., a first resonant frequency) when contents within the product packaging are in a first state, and emit a second variation of the second electromagnetic radiation signal (e.g., a second resonant frequency) when contents within the product packaging are in a second state. In some cases, the returned state signals are analyzed by the requesting device (e.g., by the app) while in other cases, such as shown, the requesting device offloads the requesting device by sending the returned state signals to an upstream network device (step 218).

In this particular embodiment, the upstream device is an instance of hub 106, however the upstream device can be any device connected to an intranet or connected to the internet.

The foregoing processing relies at least in part on response characteristics of the EMSSD. In particular, the app relies on the aspect that an EMSSD includes identification portion 261 and at least one state portion 262. Various techniques for forming an EMSSD are shown and discussed with reference to FIG. 3A.

Figure 3A:
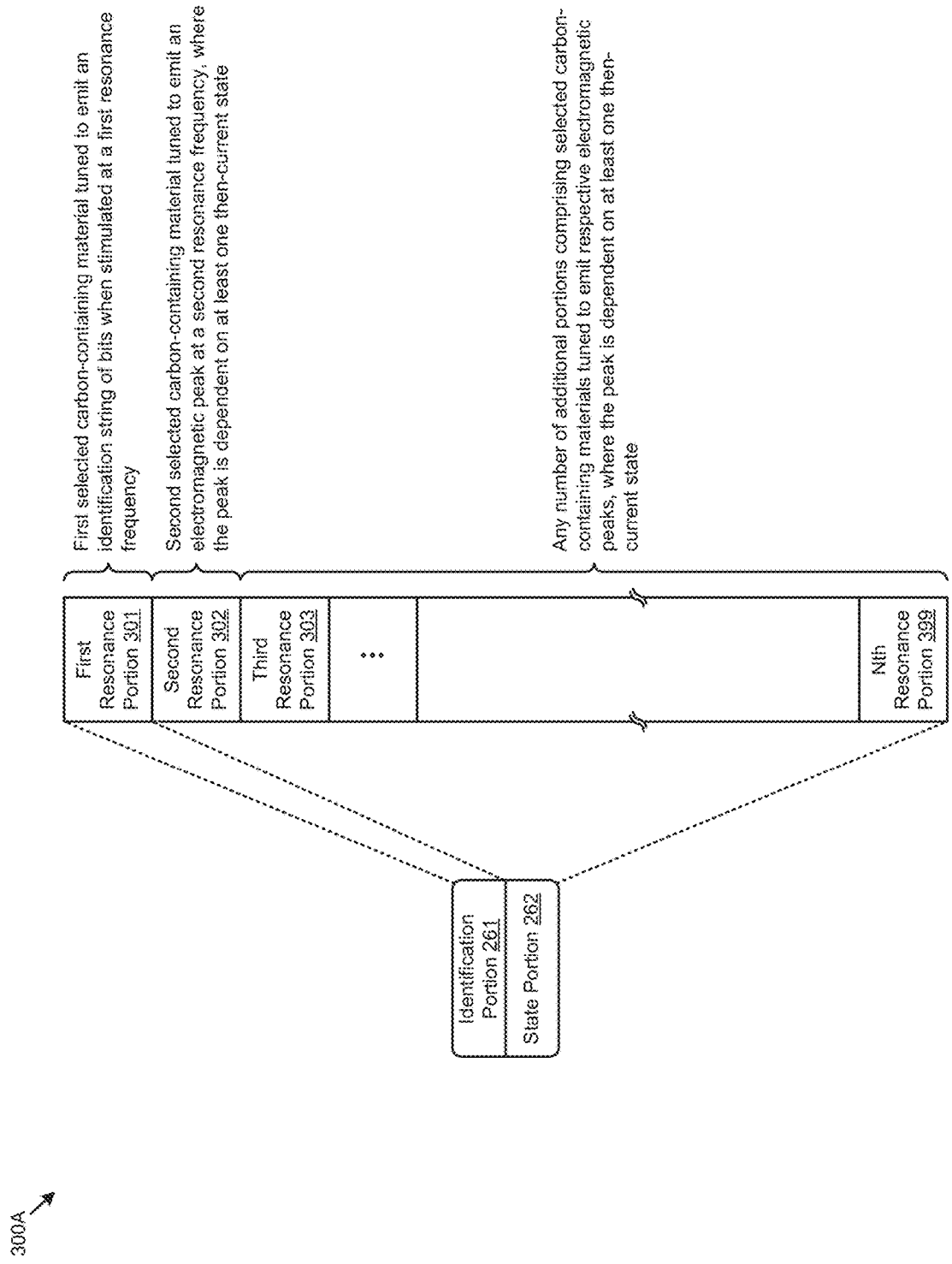
FIG. 3A is a schematic of an electromagnetic state sensing device, according to an embodiment.

FIG. 3A is a schematic of an electromagnetic state sensing device 300A. As an option, one or more variations of electromagnetic state sensing device 300A or any aspect thereof may be implemented in the context of the architecture and functionality of the embodiments described herein. The electromagnetic state sensing device 300A or any aspect thereof may be implemented in any environment.

The EMSSD 300A is configured as an elongated sensor. That is, the EMSSD 300A has a plurality of portions that span over a length (e.g., longitudinally in a particular direction, such as vertically) where contents within a product are located. As shown, a first resonance portion 301 of the EMSSD 300A is configured to provide functions of an RFID. Specifically, when pinged at a predetermined frequency, the first resonance portion 301 energizes and emits a string of bits, at least a portion of which can be concatenated to form a unique identification code. The EMSSD 300A also includes a second resonance portion 302, a third resonance portion 303, and a $N^{th}$ resonance portion 399, where the second through $N^{th}$ resonance portions may be used to convey information about the product (i.e., state of the contents in the product packaging). There may be many resonance portions juxtaposed (e.g., in a linear array, as shown) in proximity to the $N^{th}$ resonance portion 399. That is, the resonance portions of the EMSSD 300A are arranged along a path and may or may not be adjacent to each other.

In some implementations, the EMSSD 300A may be printed on a surface of the container using an ink printing process in which each of the plurality of resonance portions can be printed onto a corresponding portion of the container surface, using the ink, and configured to have a different resonance frequency than the other resonance portions. In some aspects, the resonance frequency of a respective resonance portion of the EMSSD 300A may be determined by a material property and/or geometry of the printed ink corresponding to the respective resonance portion. In some aspects, the resonance portions of the EMSSD 300A may be substantially the same size and shape, and may be printed onto the container surface using different carbon-containing inks. In other aspects, the resonance portions of the EMSSD 300A may be printed onto the container surface using the same carbon-containing inks, and the resonance portions may have different sizes and/or geometries than one another.

In one implementation, the identification portion 261 of the EMSSD 300A may be tuned to resonate at a different frequency or frequencies than any state portion.

The various portions or components of the EMSSD 300A can be printed in various geometries using carbon-containing inks. In some aspects, the geometry (e.g., linear/curved/spiral patterns, line widths, shape factors) and carbon-containing inks (e.g., compositions of various allotropes) may be determined by the manufacturer or designer of the EMSSD based on sensing criteria specific to the EMSSD 300A. In some cases, the sensing criteria includes an environmental indication such as "Is ethylene present?" or "Is this portion of the EMSSD deformed from presence of liquid?", etc. In some cases, a sensing criterion and the respective resonance corresponds to an environmental indication such as "What is the permittivity at this location?" As such, a series of resonant portions of an EMSSD can be printed on a container, where the series of resonant portions are tuned to respond to the particular container and contents to be detected, and/or may be tuned based on the particular location of that resonant portion on the container. For example, a change in the amount of liquid contents in a container will cause a change in permittivity sensed by the EMSSD.

Accordingly, the EMSSD can be designed to be sensitive to the permittivity of the particular resonant portion in a then-current environment. Techniques to accomplish and/or tune sensitivity to the permittivity or permeability of the particular resonant portion in a then-current environment include choosing a particular carbon ink, or combinations of carbon inks, and tailoring geometries (e.g., layout and/or dimensions) of electrode lines. Strictly as one example, a container that holds liquid will exhibit a first permittivity when the container is full, whereas the same container will exhibit a second permittivity when the container is, for instance, nearly empty.

This phenomenon can be used when determining the level of liquid in a container. In fact, this phenomenon can be observed when using only a single resonance portion (e.g., as an analog signal to a particular degree of accuracy), or when using a series of resonance portions such as in an elongated linear array of resonance portions (e.g., which are configured into a series of digital bits to any desired degree of accuracy). In the case of a single resonance portion, the frequency variance over environmental changes comprises the analog signal, whereas in the case of multiple resonance portions, the return from each resonant portion is analyzed against a threshold to determine an "on" or "off" value. The "on" or "off" values of multiple resonance portions can be combined to form a string of digital bits.

Although the foregoing example is specific to liquid in a container, deployment of the EMSSDs as disclosed herein can be used to detect any change in the environment in proximity of the container. As examples of change in the environment, EMSSDs can detect anything that presents any one or more of a galvanostatic change, and/or a piezo-static change, and/or a potentio-static change. Any such change or changes in the proximal environment causes a change or changes in the resonant response or responses of one or more portions of the EMSSD. For example, a piezo-static change may result from deformation of the product contents (e.g., expansion due to temperature or quantity of contents present), which can cause strain on the resonant portions of the EMSSD and consequently change the resonant frequency emitted. Different types of product contents have different densities, and as such different products can cause different degrees of strain on the resonant portions. As such, each product and each container may have a unique EMSSD, which is calibrated for that specific product and container combination.

Techniques for sensing the level of liquid in a container are shown and described in the deployment scenarios of FIG. 3B1 and FIG. 3B2.

FIG. 3B1 illustrates a deployment scenario 300B1 in which a first state of liquid contents is measured. As an option, one or more variations of deployment scenario 300B1 or any aspect thereof may be implemented in the context of the architecture and functionality of the embodiments described herein. The deployment scenario 300B1 or any aspect thereof may be implemented in any environment.

In this deployment scenario, the EMSSD is printed on the side (e.g., outer surface) of a liquid container. In other deployments, the EMSSD is printed on the inside of a container. In other deployments, the EMSSD is printed on top of a label that is affixed to a container.

When the liquid fills the container to near capacity (as shown), resonant portion 303 through resonant portion 399 overlay areas where there is liquid in the container, whereas resonant portion 302 is in a position where there is no liquid in the container. The permittivity and/or permeability of the environment around the resonant portions at those two locations are different, based at least on the level of the liquid inside the container.

Accordingly, given that other parameters are the same across the length of the EMSSD, the resonant frequency emitted by resonant portion 302 is different from resonant portion 399. The aforementioned parameters include materials and environmental characteristics such as the densities of the contents or its packaging, the dielectric constants of the contents or its packaging, the permeability of a label that is affixed to packaging, the shape of the container, variations of thickness of the container, etc.

Given the several ping returns from the several resonance portions of the EMSSD, the differences in the several ping returns correspond to a liquid level. More specifically, several pings at different frequencies are emitted by the user device. These different frequencies trigger responses in the form of ping returns from different resonant portions of the EMSSD. The signals that comprise these ping returns are then analyzed to identify the amplitudes of center frequencies.

A nearly empty liquid level is shown and described in the deployment scenario of FIG. 3B2. In some situations, the presence or absence of liquid dominates the resonance of a particular resonant portion. However, the presence or absence of liquid at one end of the EMSSD might cause a variation in the resonant frequency of a different resonant portion that is disposed at the opposite end of the EMSSD. This effect, as well as other effects that are brought about by the geometry of the container, can be measured during calibration procedures.

Further details regarding printed sensors and resonant components are described in U.S. Pat. No. 10,218,073, entitled "Antenna with Frequency-Selective Elements," which is assigned to the assignee of the present application and is incorporated herein by reference.

FIG. 3B2, FIG. 3B3 and FIG. 3B4 illustrate deployment scenarios 300B2, 300B3 and 300B4, respectively, in which a second state of liquid contents is measured and optionally displayed on the container. As an option, one or more variations of deployment scenarios 300B2, 300B3 or 300B4 or any aspect thereof may be implemented in the context of the architecture and functionality of the embodiments described herein. The deployment scenarios 300B2, 300B3 or 300B4 or any aspect thereof may be implemented in any environment.

When the liquid in the container is almost empty (as shown in FIG. 3B2), resonant portion 302 through resonant portion 398 are in a position where there is no liquid in the container, whereas resonant portion 399 is in a position where there is liquid in the container. The permittivity and/or permeability of the environment at those two locations are different, based at least on the level of the product. Accordingly, given that other parameters are the same across the length of the EMSSD, the resonant frequency emitted by resonant portion 302 is different from resonant portion 399. Given the several ping returns from the several resonance portions of the EMSSD, the differences in the several ping returns correspond to a liquid level. The accuracy (e.g., full, ½ full to +¼ full, ¼ full to +⅛ full, etc.) can be configured into the EMSSD, such as by the number, length and/or spacing of resonant portions.

In some embodiments, the state of the contents may be displayed on the container, such as with a printed visual state indication pattern on a state display 3990 as shown in FIG. 3B3. The state display may be printed using, for example, carbon-containing inks. In this figure, the state display 3990 reads "FULL", indicating that the level of liquid in the container is full. The state display 3990 may be printed directly on the outer surface of the container or may be printed on a substrate (e.g., a label) and affixed to the container.

Although the state display 3990 is located at the bottom end of the EMSSD in this figure, the state display 3990 may be located elsewhere in the container, such as at the upper end of the EMSSD, or at a separate location from the EMSSD. The state display 3990 may be used to indicate various types of states of the product contents, such as quantities, freshness, or a suggested action (e.g., "time to reorder"), where the indication may utilize text and/or graphics (e.g., icons).

FIG. 3B4 shows a cross-sectional view of a printed state display 3990 according to some deployment scenarios. State display 3990 is an electrophoretic visual display device using a carbon matrix 3991 (i.e., an electrophoretic display matrix), in accordance with some embodiments. Display 3990 includes a substrate 3992, a first electrode layer 3993 on the substrate 3992, a layer of the carbon matrix 3991 on the substrate 3992, an electrophoretic ink 3994 within carbon matrix 3991, and a second electrode layer 3995 on the carbon matrix 3991. When the electrode layers 3993 and 3995 are energized, ink 3994 moves toward or away from layer 3995 to form images (e.g., patterns, graphics, text) to be viewed from layer 3995, as indicated by the icon of an eye. The carbon matrix 3991 is made of carbon particles 3996 linked by polymers, forming a porous network. Substrate 3992 may be a flexible material such as a polymer film or paper material (e.g., cardboard, paper, polymer-coated paper, and polymer films).

The thickness of the carbon matrix 3991 layer can be made thinner than conventional electrophoretic display materials (i.e., shorter distance between electrode layers 3993 and 3995) because of the conductive nature of the carbon matrix 3991, which enables electrode connections within the matrix itself. For example, the thickness of carbon matrix 3991 may be 10 μm to 40 μm or 10 μm to 100 μm. The electrical conductivity of the carbon matrix 3991 may be greater than 20,000 S/m or greater than 5,000 S/m or greater than 500 S/m or greater than 50 S/m. Having a thinner immobile phase (carbon matrix 3991) beneficially requires less energy to move the ink 3994, making the display 3990 low-power and therefore more amenable to being powered solely by energy harvesting methods. For example, the state display 3990 may be powered by an energy harvesting antenna 3997, which may harvest energy from electromagnetic signals emitted by the user device.

Carbon matrix 3991 is a porous conductive layer with pores within or between carbon particles 3996 that enable ink 3994 to move through the carbon matrix 3991. Ink that moves toward second electrode layer 3995 creates a visible image, while ink that moves away from layer 3995 creates blank spaces in the image that is viewed. In some embodiments, the ink 3994 may be a white electrophoretic ink to contrast the dark color of carbon matrix 3991. Carbon matrix 3991 is made of carbon particles 3996 that are held together by a binder, such as a polymer (e.g., cellulose, cellulose acetate butyrate, styrene butadiene, polyurethane, polyetherurethane) or cross-linkable resins (e.g., acrylates, epoxies, vinyls) that form polymerizable covalent bonds. The binder links the carbon particles 3996 together but does not encompass all of the space between the carbon particles such that pores (i.e., spaces, voids) are present within the carbon matrix 3991. The carbon particles 3996 are electrically conductive and may include allotropes such as graphene, carbon nano-onions (CNOs), carbon nanotubes (CNTs), or any combination of these. Some or all of the carbon particles 3996 may be aggregates of sub-particles of these allotropes. In some embodiments, a majority of the carbon matrix 3991 may be graphene, such as greater than 50%, or greater than 80%, or greater than 90% of the carbon particles in the carbon matrix 3991 being graphene. In some embodiments, the state display 3990 is an electrophoretic display matrix comprising a plurality of carbon particles cross-linked with each other by a polymer, where the matrix has a porosity comprising at least one of: i) an inter-particle porosity having an average distance of up to 10 μm between the carbon particles, or ii) an intra-particle porosity having an average pore size of greater than 200 nm. Further details of printed visual displays may be found in U.S. Provisional Patent Application No. 62/866,464, filed on Jun. 25, 2019 and entitled "Electrophoretic Display"; which is owned by the assignee of the present disclosure and is incorporated by reference in its entirety.

Figure 3C:
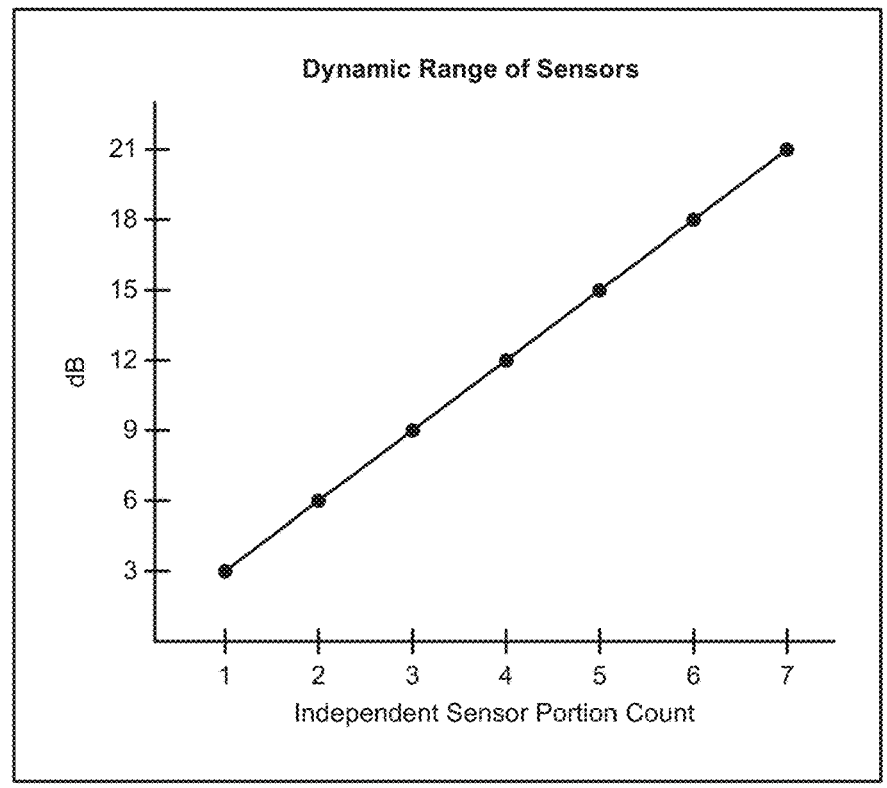
FIG. 3C is a selection chart for determining a dynamic range of an electromagnetic state sensing device, according to an embodiment.

A technique to determine a dynamic range of sensitivity based on a number of independent sensor portions of an EMSSD is given in FIG. 3C.

FIG. 3C is a selection chart 300C for determining a dynamic range of an electromagnetic state sensing device. As an option, one or more variations of selection chart 300C or any aspect thereof may be implemented in the context of the architecture and functionality of the embodiments described herein. The selection chart 300C or any aspect thereof may be implemented in any environment.

As shown, the more sensor portions that are used in an elongated EMSSD, the more accurate the readings can be. In the figure, the dynamic range of 3 dB corresponds to a ratio of 2 (one bit corresponding to one sensor portion), 6 dB corresponds to a ratio of 4 (two bits corresponding to two sensor portions), and 9 dB corresponds to a ratio of 8 (three bits corresponding to three sensor portions). As examples, if there is only one independent sensor, the reading can be either {empty or full} with a large plus or minus error, whereas if there are three sensor portions (e.g., three portions arranged with equal spacing in the direction of how the product contents will be depleted), the combination of readings from each of the three sensors can indicate {full, ⅞, ¾, ⅝, ½, ⅜, ¼, ⅛, or empty} with a plus or minus error of approximately ¹⁄₁₆th. That is, the various indications will result from conditions in the environment that correspond to whether the product contents fully cover, or partially cover, or do not cover the various resonant portions.

The heretofore-described embodiments rely at least in part on readings from EMSSD portions, where each portion in a different environment responds to a ping with a different respective return signature. The different respective return signatures can be measured within various environments, and the readings of the return signatures can be used as calibration points as shown in FIG. 4A1 and FIG. 4A2.

FIG. 4A1 and FIG. 4A2 are equivalent circuit models 400A1 and 400A2, respectively, of an electromagnetic state sensing device in a first environment (e.g., carton nearly full of powder) and a second environment (e.g., carton almost empty). As an option, one or more variations of the equivalent circuit models or any aspect thereof may be implemented in the context of the architecture and functionality of the embodiments described herein. The equivalent circuit models or any aspect thereof may be implemented in any environment.

In exemplary embodiments, each carbon-containing material (i.e., ink) used in each portion of an EMSSD is formulated differently so as to resonate at different tuned frequencies. The physical phenomenon of material resonation can be described with respect to a corresponding molecular and/or morphological composition. Specifically, a material having a first molecular structure will resonate at a first frequency when in a particular environment, whereas a material having a second, different molecular structure will resonate at a second, different frequency in the same particular environment. Similarly, a material having a first molecular structure will resonate at a first frequency or frequencies when in a particular environment, whereas the same material having the same molecular structure will resonate at a second, different frequency or frequencies when in a different environment. In many cases, the aforementioned resonant frequencies form a signature that is unique to the composition when situated in a particular environment. For example, a first carbon-containing ink may be formulated primarily with graphene. A second carbon-containing ink may be similar to the first ink but differ in molecular structure from the first carbon-containing ink, such as having a different composition (e.g., having multi-walled spherical fullerenes or other allotrope added) or structure (e.g., graphene made of fewer or more layers than in the first ink).

This phenomenon is controllable using the herein described techniques. More particularly, (1) the material can be tuned to resonate innately at a selected frequency, and (2) the response of the material in different environments can be measured and used in calibration.

As shown in FIGS. 4A1 and 4A2, and as discussed hereunder, the difference between a first ping return measurement from a first resonant portion in first environment compared to a second ping return measurement from the same resonant portion in a second environment corresponds to the difference in a resonant frequency. Furthermore, other parameters being equal, the difference between a first environment and a second environment can correspond to a product sensing state (e.g., product is present or product is not present). The difference in a resonant frequency between product sensing states (e.g., state=product present or state=product not present) can be measured in situ. In some cases, the difference in a resonant frequency between product sensing states can be calculated. Regardless of if the difference in a resonant frequency between product sensing states is empirically measured (e.g., for calibration) or if the difference in a resonant frequency between product sensing states is calculated, the phenomenon arises due to atomic structure or molecular structure of materials in the sensor, and/or due to environmental conditions present at the time of measurement. The following paragraphs explain this phenomenon, step by step.

As is known in the art, atoms emit electromagnetic radiation at a natural frequency for the particular element. That is, an atom of a particular element has a natural frequency that corresponds to the characteristics of the makeup of the atom. For example, when a Cesium atom is stimulated, a valence electron jumps from a lower energy state (e.g., a ground state) to a higher energy state (e.g., an excited energy state). When the electron returns to its lower energy state, it emits electromagnetic radiation in the form of a photon. For Cesium, the photon emitted is in the microwave frequency range of 9.192631770 THz.

Structures that are larger than atoms, such as molecules formed of multiple atoms, also resonate (i.e., emit electromagnetic radiation) at predictable frequencies. For example, liquid water in bulk resonates at 109.6 THz. Water that is in tension (e.g., at the surface of bulk, in various states of surface tension) resonates at or near 112.6 THZ.

Carbon atoms and carbon structures also exhibit natural frequencies that are dependent on the structure. For example, the natural resonant frequency of a carbon nanotube (CNT) is dependent on the tube diameter and length of the CNT. Growing a CNT under controlled conditions (e.g., to control the tube diameter and length) leads to controlling the structure's natural resonant frequency. Accordingly, growing CNTs is one way to tune to a desired resonant frequency.

Other structures formed of carbon can be created under controlled conditions. Such structures include but are not limited to carbon nano-onions (CNOs), carbon lattices, graphene, graphene-based, other carbon containing materials, engineered nanoscale structures, etc. and/or combinations thereof. Such structures can be formed so as to resonate at a particular tuned frequency and/or such structures can be modified in post-processing so as to obtain a desired characteristic or property. For example, a desired property such as a high reinforcement value when mixed with a polymer can be brought about by the selection of, and ratios of particular combinations of, materials and/or by the addition of other materials.

Moreover, co-location of multiples of such structures introduces further resonance effects. For example, two sheets of graphene may resonate between themselves at a frequency that is dependent on the length, width, spacing, shape of the spacing, and/or other physical characteristics of the sheets and/or their juxtaposition to each other.

The aforementioned materials have specific, measurable characteristics. This is true for naturally occurring materials as well as for engineered carbon allotropes. Such engineered carbon allotropes can be tuned to exhibit physical characteristics. For example, carbon allotropes can be engineered to exhibit physical characteristics corresponding to (a) a particular configuration of constituent primary particles, (b) formation of aggregates, and (c) formation of agglomerates. Each of these physical characteristics influence the particular resonant frequencies of materials formed using corresponding particular carbon allotropes.

In addition to tuning a particular carbon-based structure for a particular physical configuration that corresponds to a particular resonant frequency, carbon-containing compounds can be tuned to a particular resonant frequency or set of resonant frequencies. A set of resonant frequencies is termed a 'resonance profile'. One possible technique for tuning a particular carbon-based structure to emit set of resonant frequencies is disclosed as follows.

Forming Frequency-Tuned Materials

Carbon-containing resonance materials can be tuned to exhibit a particular resonance profile by tailoring the specific compounds that make up the materials to have particular electrical impedances. Different electrical impedances in turn correspond to different frequency response profiles.

Impedance describes how difficult it is for an alternating current to flow through an element. In the frequency domain, impedance is a complex number having a real component and an imaginary component due to the structures behaving as inductors. The imaginary component is an inductive reactance component $X_L$, which is based on the frequency f and the inductance L of a particular structure in Eq. 1:

$$XL = 2\pi f L \quad \text{(Eq. 1)}$$

As the received frequency increases, the reactance also increases such that, at a certain frequency threshold, the resonant response will attenuate. Inductance L is affected by the electrical impedance Z of a material, where Z is related to the material properties of permeability $\mu$ and permittivity $\varepsilon$ by the relationship in Eq. 2:

$$Z = \sqrt{\frac{\mu' + j\mu''}{\varepsilon' + j\varepsilon''}} = \sqrt{\frac{\mu_0}{\varepsilon_0}}$$

Thus, tuning of material properties changes the electrical impedance Z, which affects the inductance L and consequently affects the reactance $X_L$.

The present embodiments observe that carbon-containing structures with different inductances will have different frequency responses. That is, a carbon-containing structure with a high inductance L (being based on electrical impedance Z) will reach a certain reactance at a lower frequency than another carbon-containing structure with a lower inductance.

Further, the present embodiments utilize material properties of permeability, permittivity and conductivity when formulating a carbon-containing compound to be tuned in accordance with requirements of a particular product state sensor.

It is observed that a first carbon-containing structure will resonate at a first frequency, whereas that same structure will resonate at a second frequency when that structure is in a different environment (e.g., when the carbon-containing structures are in physical contact with structures of the environment).

As shown, the resonant frequency can be correlated to an equivalent electrical circuit comprising a capacitor $C_1$ and an inductor $L_1$. The frequency $f_1$ is given by Eq. 3:

$$f_1 = \frac{1}{2\pi\sqrt{L_1 C_1}}$$

If the environment is changed slightly, such as when liquid in a container is no longer contacting the sensor or is no longer being adjacent to the wall of the container on which the sensor is attached, then the environmental change in turn changes the inductance and/or capacitance of the structure as a whole. The changes can be correlated to an equivalent electrical circuit comprising a capacitor $C_2$ and an inductor $L_2$. The frequency f2 is given by Eq. 4:

$$f_2 = \frac{1}{2\pi\sqrt{L_2 C_2}}$$

Since the quantity $f_1$-$f_2$ is used when comparing two readings, or when comparing a reading to a calibration point, the magnitude of the quantity $f_1$-$f_2$ determines the sensitivity. Accordingly, the geometry of the printed portions of an EMSSD (e.g., the length of electrical conduit lines, the width of electrical conduit lines, curvature, etc.) and the choice of carbons used in the carbon-containing inks are often dominant factors when determining sensitivity of an EMSSD. Even though the resonant frequency of a portion of an EMSSD can be calculated (e.g., using the foregoing equations) many deployment scenarios rely on empirical data capture techniques to form calibration points. In many cases, the more calibration points that are taken, the more accurate are the measurements. In various calibration scenarios, many sets of calibration points are taken and saved for each variation of a container and/or intended contents.

Figure 4B:
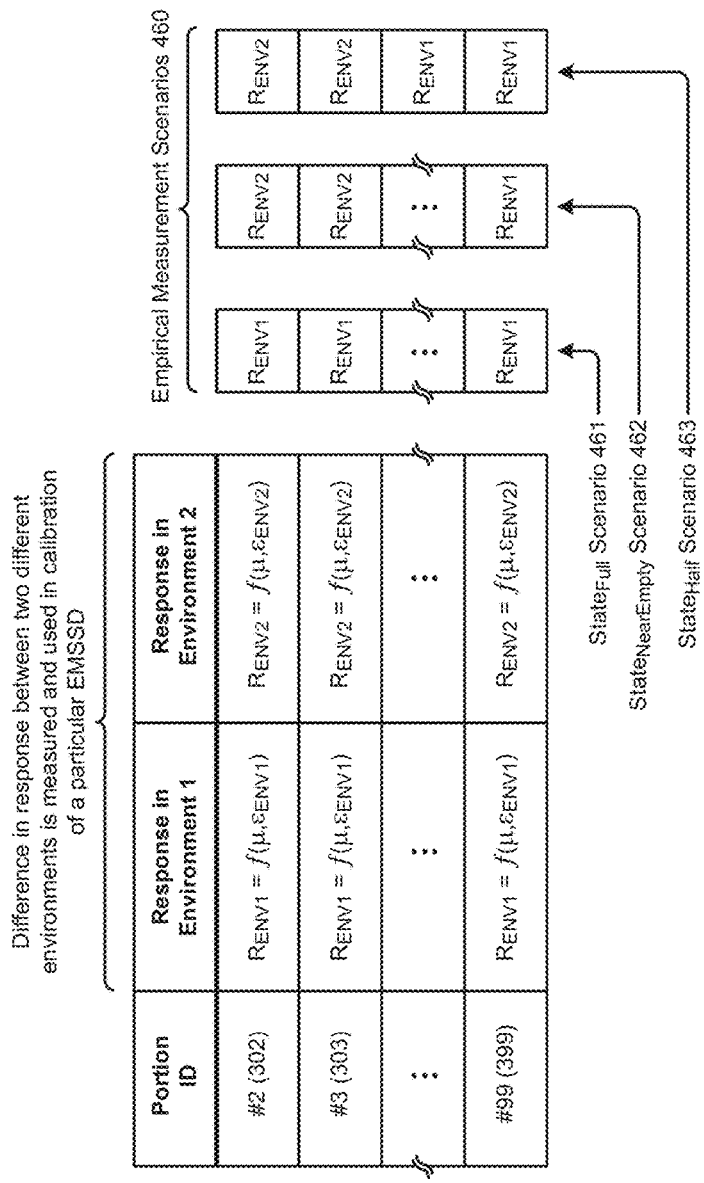
FIG. 4B depicts an empirical data capture technique as used for calibrating electromagnetic state sensing devices in different environments, according to an embodiment.

FIG. 4B depicts an empirical data capture technique 400B as used for calibrating electromagnetic state sensing devices in different environments. As an option, one or more variations of empirical data capture technique 400B or any aspect thereof may be implemented in the context of the architecture and functionality of the embodiments described herein. The empirical data capture technique 400B or any aspect thereof may be implemented in any environment.

Practical uses of this empirical data capture technique result in capture of the actual measurements of each particular portion of a multi-portion EMSSD. In an example use scenario, a three-column table such as is depicted in FIG. 4B is constructed by taking a series of empirical measurements. Specifically, for each independent portion of an EMSSD, its response to stimulus is measured under two different environmental conditions. The empirical response of a particularly-tuned independent portion of an EMSSD is measured in a first environment (denoted $R_{ENV1}$) and recorded. Next, the empirical response of a particularly-tuned independent portion of an EMSSD is measured in a second environment (denoted $R_{ENV2}$) and recorded. Strictly as examples, the first environment might be when a container is full or almost full and the second environment might be when a container is empty or almost empty.

As can be seen $R_{ENV1}$ is a function of two dominant variables: (1) the permeability of the material that forms the independent portion of the EMSSD, and (2) the permittivity of the local environment. Such in situ measurements are taken for the first environment and for the second environment for each independent portion.

When an EMSSD is composed of a large number of independent portions (e.g., portion ID #2 302, portion ID #3 303, portion ID #99 399, etc.), a very accurate assessment of the contents can be made. The depiction of FIG. 4B includes empirical measurement scenarios 460, namely a state$_{Full}$ scenario 461 a state$_{NearEmpty}$ scenario 462, and a state$_{Half}$ scenario 463. In this example, environment 1 corresponds to a set of conditions when the container is full, whereas environment 2 corresponds to a set of conditions when the container is empty. Thus, in a situation where the container is completely full, each independent portion of an EMSSD resonates with a response corresponding to $R_{ENV1}$. For comparison, in a situation where the container is near empty, each independent portion of an EMSSD resonates with a response corresponding to $R_{ENV2}$, except the 'bottom' portion (portion ID #99), which resonates with a response corresponding to $R_{ENV1}$ due to some contents remaining near the bottom portion #99.

In the situation where (1) there are just four independent portions of an EMSSD distributed in a vertical stacking across the container (e.g., extending from an upper to a lower portion of a container to detect a quantity of the contents in the container), and (2) the 'top two' portions resonate with a response corresponding to $R_{ENV1}$, and (3) the 'bottom two' portions resonate with a response corresponding to $R_{ENV2}$, it can be deemed that the container is at half capacity.

Some embodiments may include tuning the different carbon-containing inks to resonate at different center frequencies that are widely separated in the frequency domain. In this way, the ping frequencies that are used to stimulate particular independent portions might also be widely separated. Multiple independent portions of an EMSSD can be stimulated successively using a 'chirp' technique, where successive pings at different frequencies are separated across time slices such that the response signature from a given independent portion of an EMSSD is at a much higher amplitude than any harmonic responses from other portions of the EMSSD. One possible signature capture technique is shown and described as pertains to FIG. 5A.

Figure 5A:
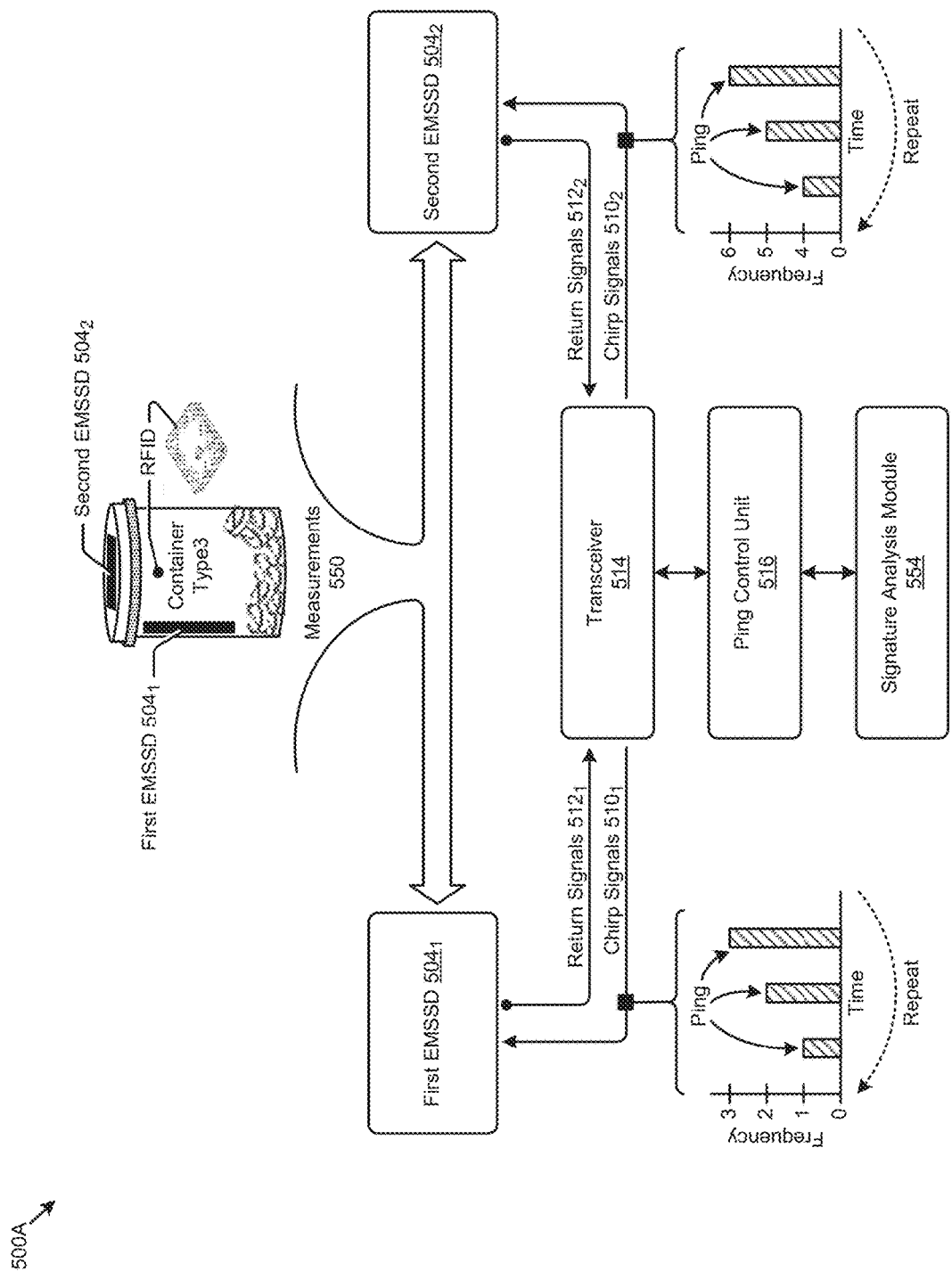
FIG. 5A depicts a signature capture technique as used for electromagnetic state sensing, according to an embodiment.

FIG. 5A depicts a signature capture technique 500A as used for electromagnetic state sensing. As an option, one or more variations of signature capture technique 500A or any aspect thereof may be implemented in the context of the architecture and functionality of the embodiments described herein. The signature capture technique 500A or any aspect thereof may be implemented in any environment.

FIG. 5A is being presented with respect to a technique for capturing and analyzing a returned signal signature after independent portions of an EMSSD formed of carbon-containing tuned resonance materials have been stimulated by chirp signals. Specifically, the figure depicts measurements 550 that are taken from EMSSDs on a nearby container. As a result of stimulation of the EMSSDs with a chirp signal sequence, the EMSSDs respond (e.g., via resonance emissions). A return response (e.g., return signals 5121, return signals 5122) is captured from each EMSSD. More specifically, when a first EMSSD 5041 on the container is stimulated by a ping (e.g., a ping from a chirp sequence of chirp signals 5101), return signals 5121 are received and processed. Similarly, when a second EMSSD 5042 on the container is stimulated by a ping (e.g., a ping from a chirp sequence of chirp signals 5102), return signals 5122 are received and processed.

As shown, a particular container might include multiple EMSSDs, each with its respective identification portion and state portion, as well as a separate RFID. As an example, a container might be in the form of a dispenser (e.g., an inhaler) for dispensing a medicament (e.g., for asthma treatment), and the dispenser might have its own RFID, separate from any EMSSD. The RFID might have been applied to the dispenser at the time of manufacture of the dispenser, such as for product identification or inventory purposes. The EMSSDs might have been applied, possibly using an adhesive label, by a compounder or pharmacy at the time of fulfilling a prescription for the medicament, such as to track quantity and dosing information for a specific patient. For various reasons, the identification portion of the EMSSDs might be configured to operate at different frequencies. As an example, the identification portion of a first EMSSD might operate at 125 kHz, whereas the identification portion of a second EMSSD might operate at 13.6 MHz, and so on.

The foregoing chirp/ping signals can be sent by transceiver 514. Also, the return signals can be received by the same (or different) transceiver 514. As shown, the chirp signals can occur in a repeating sequence of chirps (e.g., chirp signals 5101, chirp signals 5102). For example, a chirp signal sequence might be managed by a ping control unit 516 that repeats a pattern comprising a 1 GHz ping, followed by a 2 GHz ping, followed by a 3 GHz ping, and so on. The entire chirp sequence can be repeated in its entirety continuously. In some cases, there can be brief periods between each ping such that the returned signals from the resonant materials (return signals 5121, return signals 5122) can be analyzed (e.g., in a signature analysis module 554) immediately after the end of a ping. In other cases, the signals corresponding to the ping stimulus and the signals of the returned response are concurrent. The transceiver 514, ping control unit 516 and signature analysis module can 554 may all be within a user device and software application on the user device (e.g., mobile or stationary device), or may be distributed on multiple devices such as the user device and a server that is in communication with the user device. Using digital signal processing techniques, the signals of the returned response can be distinguished from the ping signals. For example, in situations where the returned response comprises energy across many different frequencies (e.g., overtones, sidelobes, etc.), a notch filter can be used to filter out the frequency of the stimulus.

In cases where a single container hosts two or more EMSSDs, each individual EMSSD may be tuned to emit different resonant responses under different environmental conditions. For example, some EMSSDs are tuned to respond to changes in the contents of the container, whereas other EMSSDs are tuned to respond to the presence of particulates or gasses the environment.

For detecting the presence of gasses, an EMSSD is configured to comprise a sensing material (e.g., a redox mediator) that is sensitive to an analyte such that when the EMSSD is exposed to the analyte, the capacitance one or more of the constituent elements of the EMSSD changes. As such, a return response in the presence of an analyte is different than when in the absence of the analyte. More specifically, it can happen that the permittivity and/or permeability of the sensing material changes upon exposure to the analyte, which in turn changes capacitance of one or more constituent elements of the EMSSD (e.g., a capacitive element), which in turn indicates the presence of the analyte.

Further details regarding general approaches to sensing an analyte are described in U.S. Pat. No. 10,502,705 entitled "RESONANT GAS SENSOR," which is hereby incorporated by reference in its entirety.

Figure 5B:
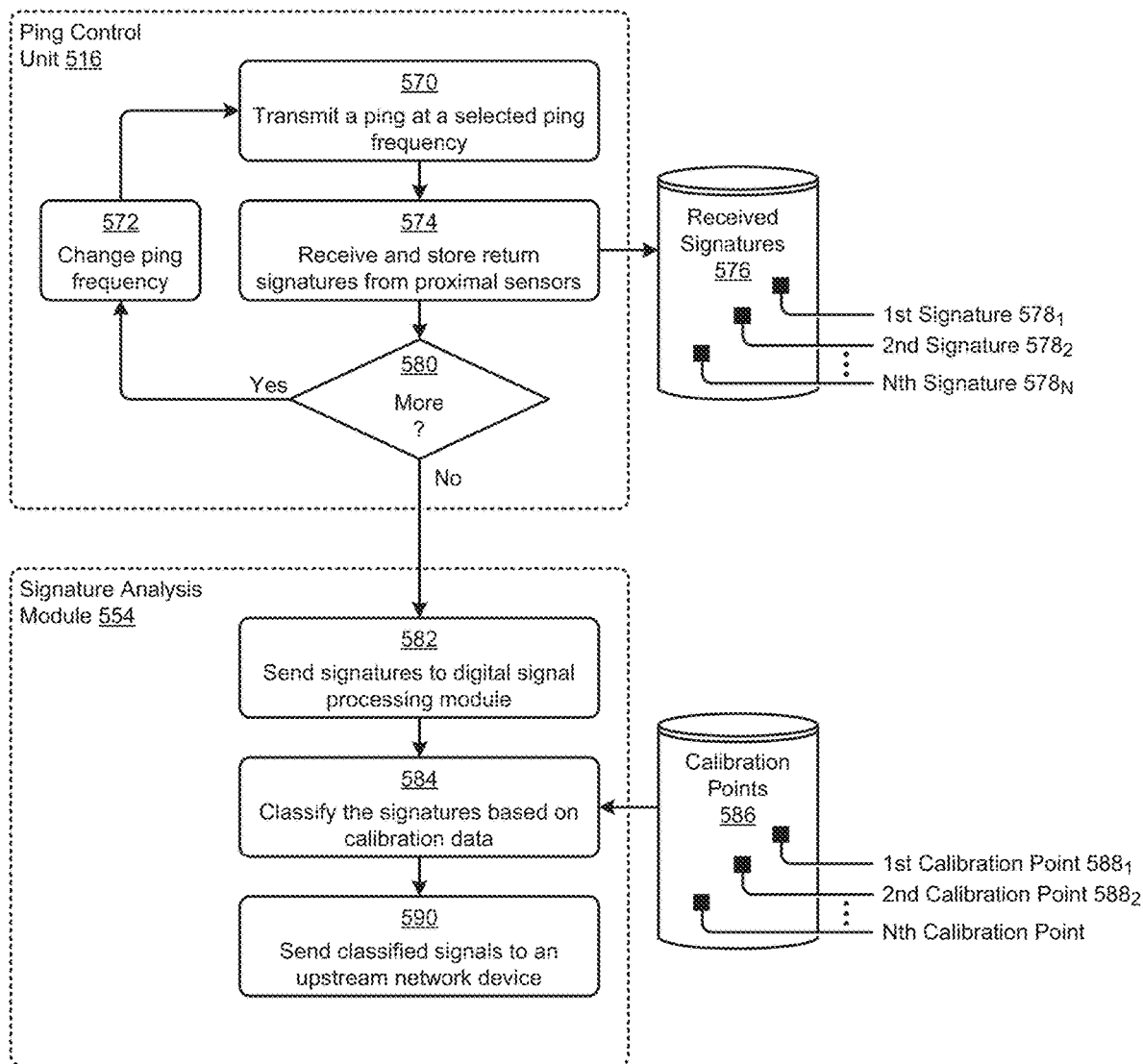
FIG. 5B depicts a signature analysis technique as used for electromagnetic state sensing, according to an embodiment.

FIG. 5B depicts a signature analysis technique 500B as used for electromagnetic state sensing. As an option, one or more variations of signature analysis technique 500B or any aspect thereof may be implemented in the context of the architecture and functionality of the embodiments described herein. The signature analysis technique 500B or any aspect thereof may be implemented in any environment.

FIG. 5B illustrates aspects pertaining to sensing devices that can emit not only identification information, but also product state information. In many situations, including the situation shown and described in FIG. 5B, product state information is determined based on measurements that are compared to predetermined points.

As shown, the flow of the system commences at step 570. A ping signal of a selected ping frequency is transmitted by ping control unit 516. The ping signal generation mechanism and the ping signal transmission mechanism can use any known techniques.

Strictly as one example, a transmitter module can generate a selected frequency (e.g., 3 GHZ) and radiate that signal using an antenna or multiple antennae. The design and location of the tuned antenna can correspond to any tuned antenna geometry and/or material and/or location such that the strength of the ping is sufficient to energize a nearby EMSSD and/or to induce resonance in nearby EMSSDs. In some embodiments, several tuned antennae are disposed upon or within structural members that are in proximity to corresponding EMSSD. As such, when an EMSSD is stimulated by a ping, it resonates back with a signature. That signature can be received (step 574) and stored in a dataset comprising received signatures 576. A sequence of transmission of a ping, followed by reception of a signature, can be repeated in a loop.

For example, and as shown, the ping frequency is changed (step 572) in the course of iterative passes (i.e., see "Yes" branch of decision 580). As step 574 is performed and received signatures 576 are processed, a first signature 5781, a second signature 5782, an $N^{th}$ signature 578N, etc. are stored. The number of iterations can be controlled by decision 580. When the "No" branch of decision 580 is taken (e.g., when there are no further additional pings to transmit), then the received signatures can be provided to a digital signal processing module (step 582) in the signature analysis module 554. The digital signal processing module classifies the signatures (step 584) against a set of calibration points 586. The calibrations points might correspond to particular ping frequencies and/or the calibrations points might correspond to particular signatures that had been measured within an in-situ environment. For example, a first calibration point 5881 might characterize a first returned signature that would be classified as being indicative of a 'full' state of the medicament in the dispenser, a second calibration point 5882 might characterize a second return signature that would be classified as being indicative of a 'half full' state of the medicament in the dispenser, and so on for N calibration points.

At step 590, classified signals are sent to an upstream network device. In some embodiments, the classified signals are relayed by a network hub that in turn transmits the classified signals to an upstream repository that hosts a machine learning database. Such a machine learning database can be trained such that a given set of sensed measurements can be correlated to particular product state conditions.

FIG. 6 depicts a virtual assistant 600 as used as a hub 106 in a replenishment system. As an option, one or more variations of virtual assistant 600 or any aspect thereof may be implemented in the context of the architecture and functionality of the embodiments described herein. The virtual assistant 600 or any aspect thereof may be implemented in any environment.

Referring again to FIG. 1, a hub 106 can be any device that implements networking communications. In some cases, a hub includes a capability for natural language communication with a human user. In the example shown, the hub 106 is implemented by a virtual assistant. A virtual assistant can be any device such as are exemplified by devices known as "AMAZON ECHO®", "GOOGLE HOME®", "NEST HUB™", etc. As used herein, a virtual assistant is any device that is (1) network connected, and (2) is capable of carrying out natural language communication with a human user using a voice input transducer (e.g., a microphone) and a voice output transducer (e.g., speakers).

When used within an environment such as depicted in FIG. 1, a virtual assistant can facilitate replenishment based on EMSSD readings combined with results of a natural language conversation. In one scenario, an EMSSD reading indicates that a perishable product has reached its expiration date. The digital assistant might speak a voice interaction of "The kale is going bad—do you want to re-order now?" In such a scenario, the user might answer with an audible "Yes", which would cause the virtual assistant to transmit one or more upstream messages 125 (e.g., possibly including user credentials), which upstream messages might include a replenishment order 620. Operational elements (e.g., servers) that are upstream from the digital assistant might then transmit downstream messages 126, which downstream messages might include a replenishment status 622.

In some cases, such as when used within an environment such as depicted in FIG. 1, a virtual assistant can facilitate processing of signals emitted by EMSSDs. In particular, a virtual assistant can carry out communications with type1 mobile device 131 and/or a type2 mobile device 132 and/or an interrogator device 133. Such communications can be carried out using the NFC unit 602 (FIG. 6) of the virtual assistant, or the Bluetooth low energy (BLE) unit 604 of the virtual assistant, or the Wi-Fi unit 606 of the virtual assistant.

Furthermore, any of a variety of protocols can be implemented such that any operations needed for product identification, and/or for product state sensing, and/or for application of rules can be carried out in any combination by a mobile device, and/or an interrogator device, and/or a virtual assistant, and/or any other network-connected device.

The following figures pertain to techniques for forming and executing rules serve to present a logical flow of operations. As hereinabove indicated, processing that corresponds to application of any rule or portion thereof and/or processing that corresponds to performance of any individual operation can be carried out at any operational element.

Figure 7A:
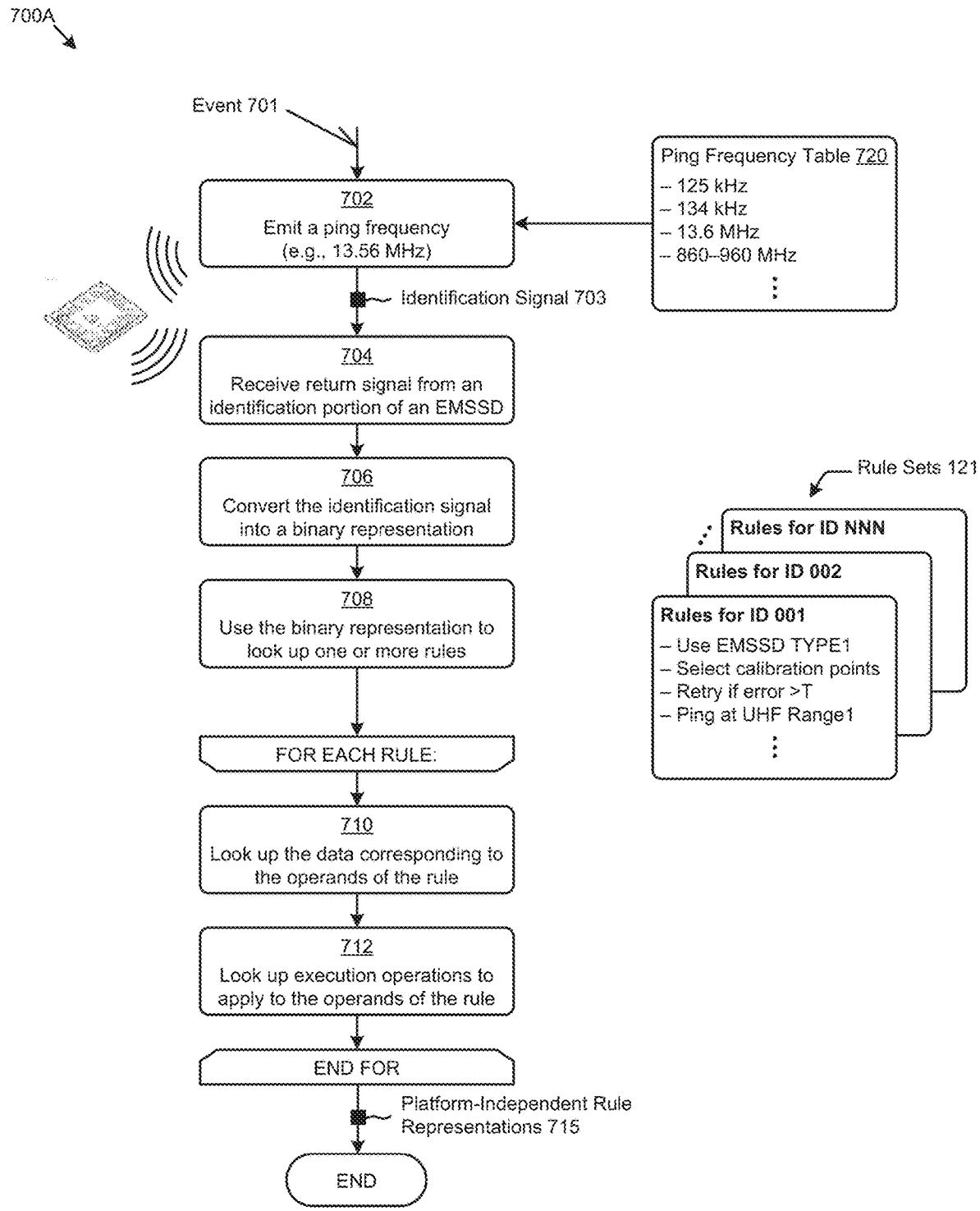
FIG. 7A presents a rule codification technique as used in a replenishment system based on electromagnetic state sensing devices, according to an embodiment.

FIG. 7A presents a rule codification technique 700A as used in a replenishment system based on electromagnetic state sensing devices. As an option, one or more variations of rule codification technique 700A or any aspect thereof may be implemented in the context of the architecture and functionality of the embodiments described herein. The rule codification technique 700A or any aspect thereof may be implemented in any environment.

As can be readily understood based on the foregoing, since there are many products that might be situated in a given setting (e.g., in a domicile, or car, or boat, etc.) and inasmuch as the foregoing EMSSDs may be applied to many different types of products that have many different types of states, and many different states within a particular state type, it follows that determination of the state or states of a particular product can be facilitated by specific processing based on the product identification. For example, if, as a result of a ping to the identification portion of an EMSSD, the product can be identified as a 64-ounce bottle of detergent of a particular brand, then the particular configuration of the remaining portions of the EMSSD can be known by a lookup in a database. For example, data returned from a lookup in a database might indicate that the EMSSD configuration for that product and its particular container (i.e., the 64-ounce bottle of detergent) comprises eight different resonance portions that are responsive to eight different stimulation frequencies.

Furthermore, data returned from a lookup in a database might indicate that the EMSSD configuration for that product and its particular container (i.e., the 64-ounce bottle of detergent) comprises 32 different calibration points. As such, once the product has been identified, a great deal of information about the EMSSD configuration can be known. Moreover, once the product has been identified, further steps to perform for the purpose of product state can be identified. The flow as depicted in FIG. 7A implements a rule codification technique such that any rule can be delivered to any device for execution.

As shown, the flow is initiated by event 701, which event might arise from an app on a user device such as a smartphone. The user device responds to the event by emitting a ping frequency (step 702). The particular frequency of the ping can be initially known from a ping frequency table 720, which table is implemented as a data structure accessible to the user device. As a result of the outgoing ping or pings, at least one identification signal 703 is emitted from an RFID or an identification portion of an EMSSD. The identification signal 703 is received (step 704), which identification signal is converted into a binary representation (step 706) using any known signal processing techniques. This binary representation is used to look up one or more rules (step 708) from one or more rule sets 121. The one or more rules can be stored using any storage device at any location and can be retrieved by using any known methods for inter-device communication. In many cases, the one or more rules comprise information pertaining to (1) the corresponding EMSSD type, (2) the location of calibration points, (3) thresholds, and (4) additional ping instructions.

Each rule can be codified by looking up data corresponding to operands of a rule (step 710) and by looking up operations to apply to the operands of the rule (step 712).

Strictly as one example, a rule might indicate to "Retry if error >T". Step 710 can look up "T" to determine a numeric value of, for example, 50%. Step 712 can look up details pertaining to the operation of "Retry", which might include, for example, a time duration to wait before a retry. In some cases, numeric values for operands are determined on the particular platform where the rule is to be executed.

When the rules have been processed through step 710 and step 712, the flow emits platform-independent rule representations 715, which are then transmitted to a device (e.g., hub or smartphone) for execution.

Figure 7B:
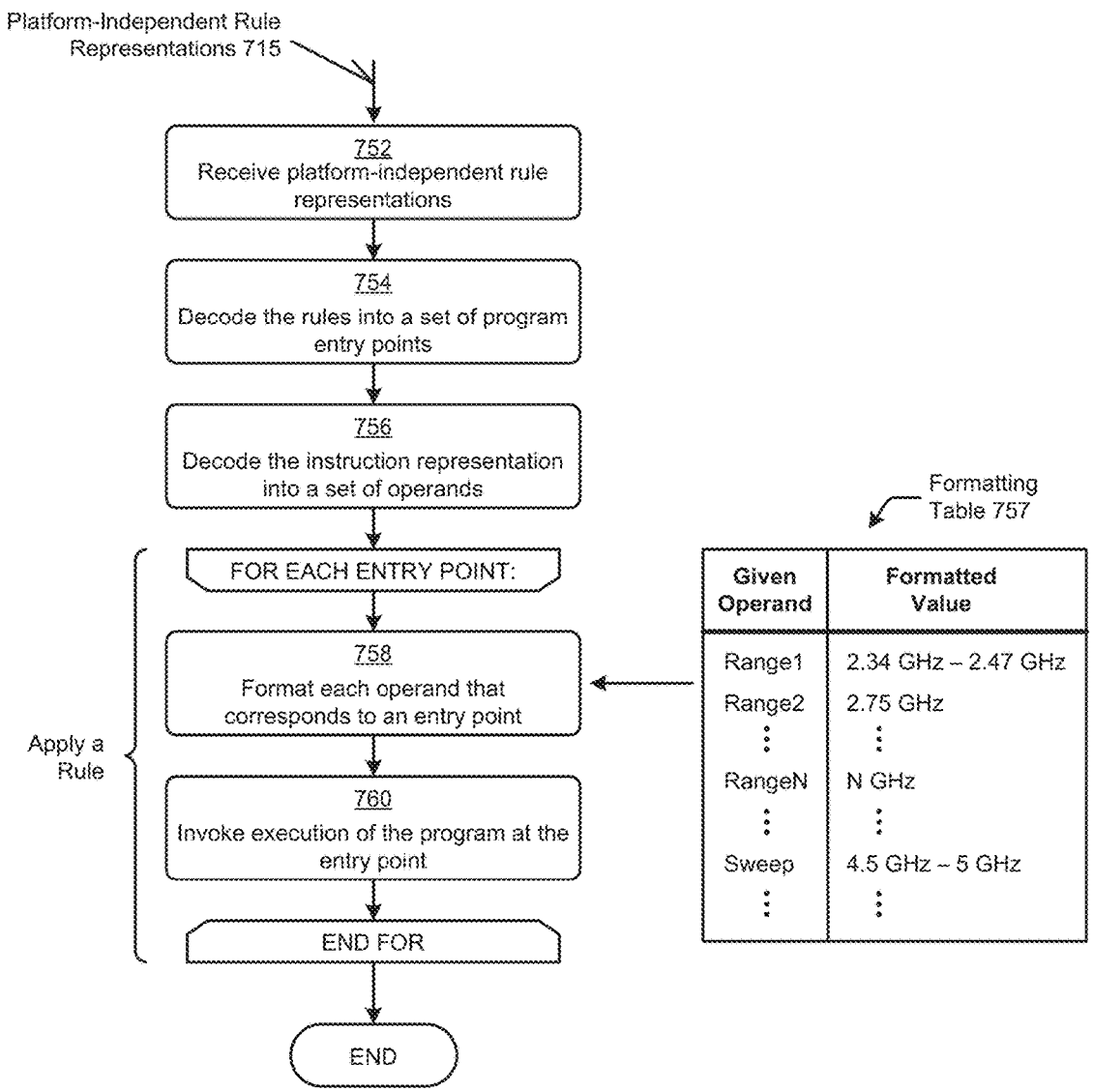
FIG. 7B presents a rule execution technique as used in a replenishment system based on electromagnetic state sensing devices, according to an embodiment.

FIG. 7B presents a rule execution technique 700B as used in a replenishment system based on electromagnetic state sensing devices. As an option, one or more variations of rule execution technique 700B or any aspect thereof may be implemented in the context of the architecture and functionality of the embodiments described herein. The rule execution technique 700B or any aspect thereof may be implemented in any environment.

As shown, the rule execution technique 700B is initiated when the device (e.g., hub or smartphone) receives the platform-independent rule representations (step 752). Each individual one of the platform-independent rule representations are decoded (step 754) to determine a corresponding entry point on the device. Also, each of the platform-independent rule representations are decoded to identify operands (step 756). A formatting table 757 might be employed to convert a particular platform-independent operand representation into a platform-specific operand representation. Then, for each entry point, the operands are formatted to correspond to the computer hardware and software architecture of the platform (step 758) and the platform-independent rule is executed on the device (step 760). In some cases, an operand might not be decoded into a numeric representation, but rather the operand is decoded into a further entry point or subroutine. As an example, the operand "sweep" as depicted in formatting table 757 might refer to a subroutine that covers many ranges in a frequency sweeping operation.

Figure 8:
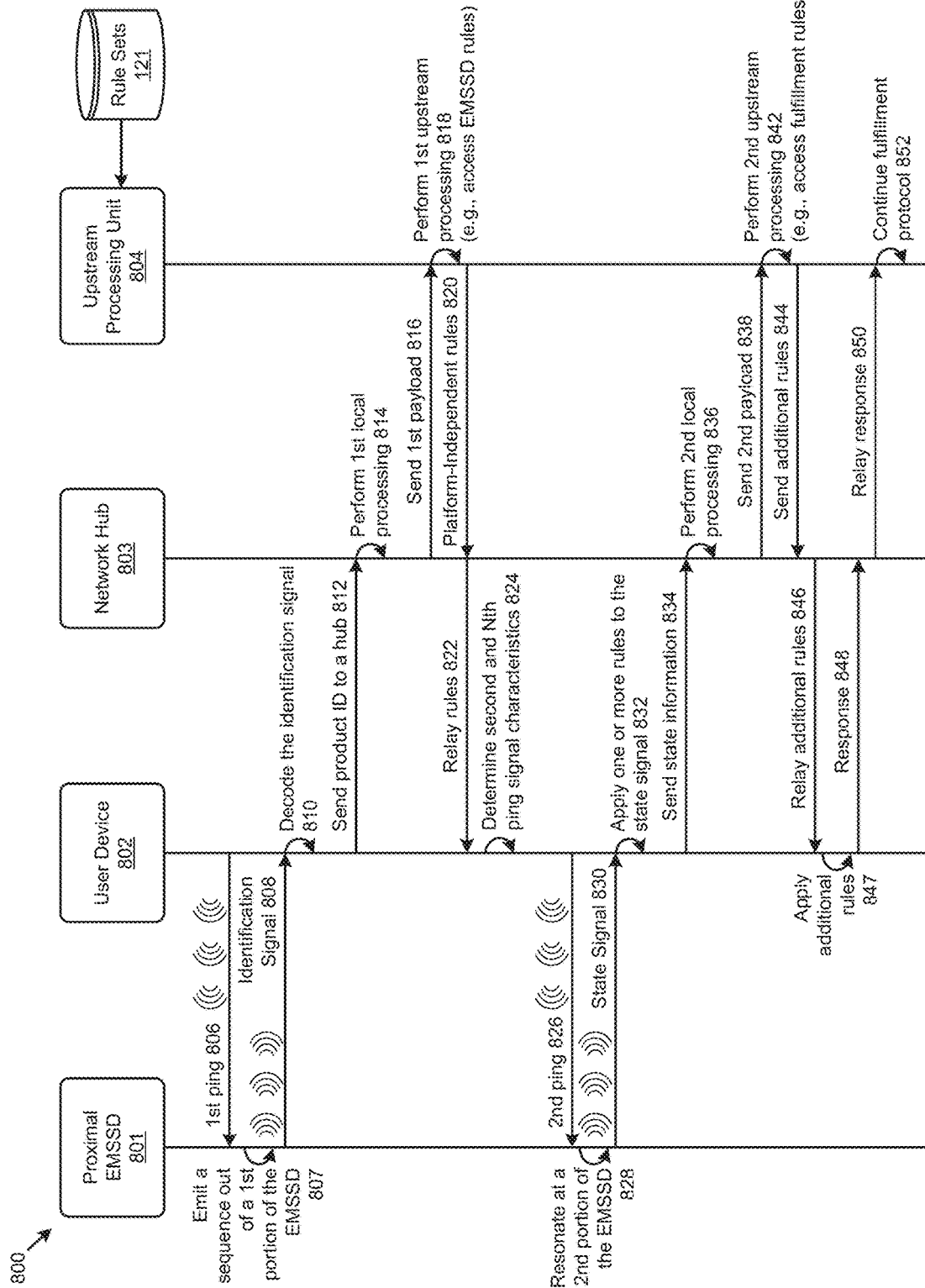
FIG. 8 depicts an example protocol as used in a replenishment system based on electromagnetic state sensing devices, according to an embodiment.

FIG. 8 depicts an example protocol 800 as used in a replenishment system based on electromagnetic state sensing devices. As an option, one or more variations of protocol 800 or any aspect thereof may be implemented in the context of the architecture and functionality of the embodiments described herein. The protocol 800 or any aspect thereof may be implemented in any environment.

The shown protocol involved four devices: (1) a proximal EMSSD 801, (2) a user device 802, (3) a network hub 803, and (4) an upstream processing unit 804. As shown, the protocol is initiated by a user device. Specifically, user device 802 emits a first ping (emission 806). The energy from the first ping causes a proximal EMSSD 801 to emit a signal (emission 807), which signal includes a portion that is interpreted as an identification signal (emission 808). The identification signal is decoded into a product ID (operation 810), which identification signal is sent to the network hub (message 812). The network hub 803 performs a first local processing (operation 814) to process all or part of emission 807, then sends all or part of emission 807 to upstream processing unit 804 (payload message 816). The upstream processing unit 804 (i.e., upstream computing device, which may include, for example, an interrogator device having an RFID reader) accesses EMSSD rules from rules set 121 and performs first upstream processing 818. The EMSSD rules are encoded as platform-independent rules and sent to the network hub (message 820), which then relays all or part of the platform-independent rules (message 822) to the user device.

At this point in the protocol, the user device has sufficient information about the characteristics of the proximal EMSSD (e.g., resulting from processing of message by determining second through Nth ping signal characteristics 824) such that the state portion of the EMSSD can be interrogated by pinging any one or more resonant portions of the proximal EMSSD. In this protocol, only one second ping (emission 826) is shown, however in most cases there are many resonant portions of the proximal EMSSD, any or all of which portions are interrogated (e.g., in a succession) by the user device.

Responsive to the second ping, the resonant portion of the proximal EMSSD resonates (emission 828) in a manner that emits a state signal (emission 830). The state signal is processed at the user device by applying one or more rules (operation 832). In this embodiment, all or portions of the state signal and/or any derivatives from processing of the state signal are sent to the network hub (message 834), which performs second local processing (operation 836). The second local processing includes forming a payload for messages that are sent to the upstream processing unit (message 838). The upstream processing unit in turn performs second upstream processing 842.

At this point in the protocol, at least the upstream processing unit has information about the particular state of a particular unit of a particular product. As such, the upstream processing unit can avail itself of additional rules that pertain to fulfillment. For example, a fulfillment rule might carry the semantics of "Ask the user if another unit of this product should be ordered now." Such additional rules are relayed (message 844) to the network hub for further processing. In some cases, and as shown, the network hub will relay all or part of the additional rules (message 846) to the user device.

Such additional rules at the user device might include forming and presenting a confirmation question in a user interface of the user device. In some cases, there are several additional rules that are applied (operation 847) at the user device. A user response, for example "Yes—order now." might be sent to the network hub (message 848) for further processing and/or for relaying the response or portion thereof to the upstream processing unit (message 850). The upstream processing unit may then complete steps (operation 852) to accomplish the user-confirmed fulfillment request.

As a result of product state determination using an EMSSD, the user was notified of an underlying need for replenishment. The user's desire for replenishment was confirmed, after which replenishment was initiated. In some cases, a fulfillment rule authorized initiation of fulfillment even in the absence of an explicit user confirmation.

ADDITIONAL PRACTICAL APPLICATION EXAMPLES

Figure 9:
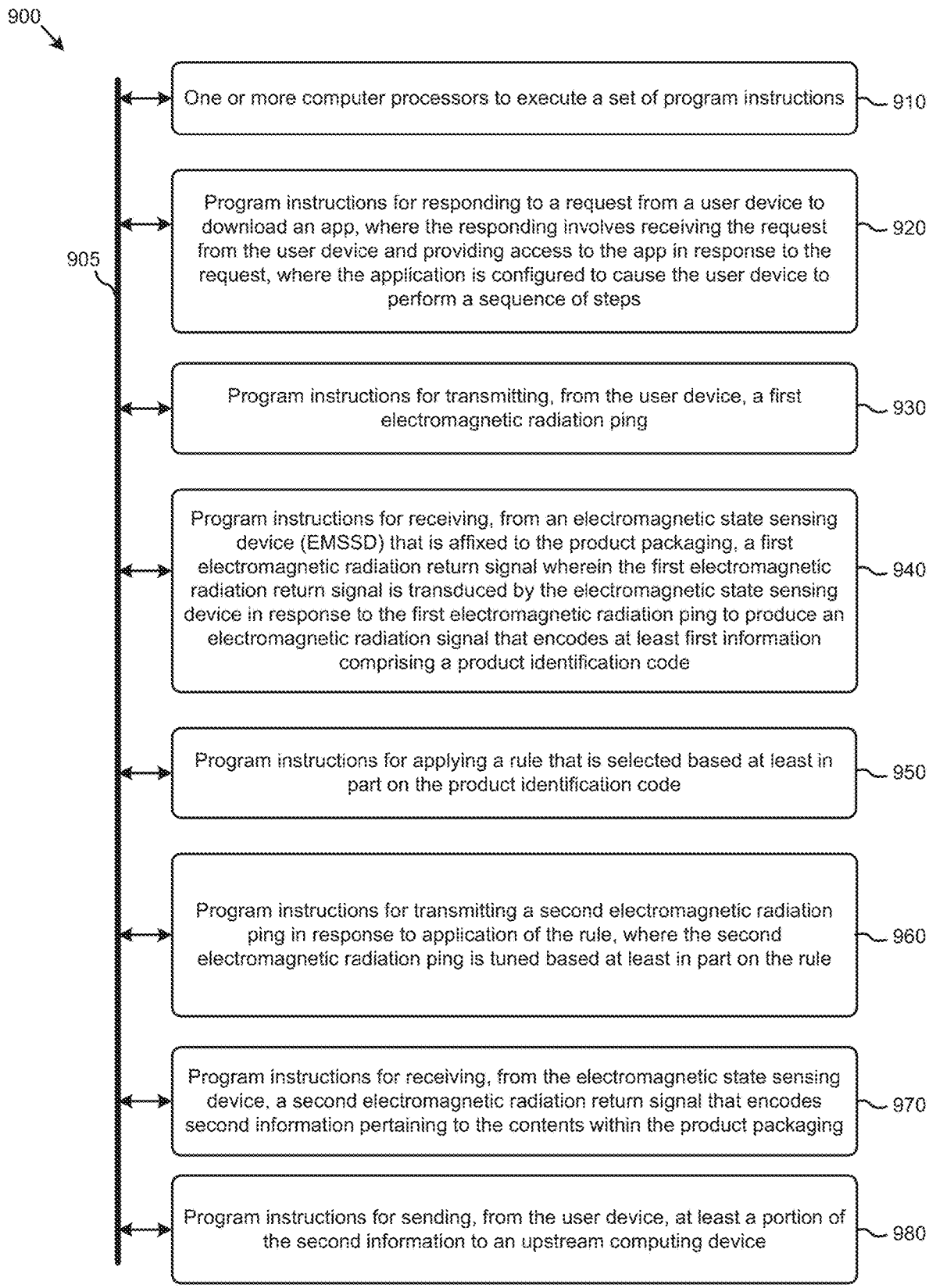
FIG. 9 depicts system components as arrangements of computing modules that are interconnected so as to implement certain of the herein-disclosed embodiments.

FIG. 9 depicts a system 900 as an arrangement of computing modules that are interconnected so as to operate cooperatively to implement certain of the herein-disclosed embodiments. This and other embodiments present particular arrangements of elements that, individually or as combined, serve to form improved technological processes that address how to inexpensively deploy state sensors. The partitioning of system 900 is merely illustrative and other partitions are possible. As an option, the system 900 may be implemented in the context of the architecture and functionality of the embodiments described herein. Of course, however, the system 900 or any operation therein may be carried out in any desired environment.

The system 900 comprises at least one processor and at least one memory, the memory serving to store program instructions corresponding to the operations of the system. As shown, an operation can be implemented in whole or in part using program instructions accessible by a module. The modules are connected to a communication path 905, and any operation can communicate with any other operations over communication path 905. The modules of the system can, individually or in combination, perform method operations within system 900. Any operations performed within system 900 may be performed in any order unless as may be specified in the claims.

The shown embodiment implements a portion of a computer system, presented as system 900, and includes one or more processors that can execute one or more sets of instructions, machine-readable code, software programs, and the like. In various implementations, execution of the instructions, machine-readable code, and/or software programs may cause the system 900 to perform one or more operations. In some implementations, the one or more operations may include responding to a request from a user device to download an app, for example, by receiving the request from the user device and providing access to the app in response to the request, where the application is configured to cause the user device to perform a sequence of steps (module 920). The one or more operations may include transmitting, from the user device, a first electromagnetic radiation ping (module 930). The one or more operations may include receiving, from an electromagnetic state sensing device (EMSSD) that is affixed to the product packaging, a first electromagnetic radiation return signal. In some aspects, the first electromagnetic radiation return signal is transduced by the electromagnetic state sensing device in response to the first electromagnetic radiation ping.

In some implementations, transducing the first electromagnetic radiation return signal may produce an electromagnetic radiation signal that encodes at least first information comprising a product identification code (module 940). The method may also include applying a rule that is selected based at least in part on the product identification code (module 950), and transmitting a second electromagnetic radiation ping in response to application of the rule, such as where the second electromagnetic radiation ping is tuned based on the rule (module 960). The method may also include receiving, from the electromagnetic state sensing device, a second electromagnetic radiation return signal that encodes second information pertaining to the contents within the product packaging (module 970), and sending, from the user device, at least a portion of the second information to an upstream computing device (module 980). In some aspects, the user device may be, for example, a smartphone, and may optionally include a stationary RFID reader.

In some embodiments, the electromagnetic state sensing device is a printed electromagnetic state sensing device, which may include a first carbon-containing ink and optionally a second carbon-containing ink. The printed electromagnetic state sensing device may emit a first variation of the second electromagnetic radiation signal (i.e., a first return signal) when contents within the product packaging are at a first state, and the printed electromagnetic state sensing device may emit a second variation of the second electromagnetic radiation signal (i.e., a second return signal) when contents within the product packaging are at a second state. In some embodiments, the printed electromagnetic state sensing device may be printed longitudinally on the product packaging.

In some embodiments, the electromagnetic radiation return signal has energy distributed across a plurality of frequencies and is emitted by the user device, wherein the user device is a mobile device. The electromagnetic radiation return signals may be emitted by an electromagnetic emission device of a mobile device or by an electromagnetic emission device of a stationary device. Strictly as one example, the electromagnetic emission device may be a near field communication device.

In some embodiments, the application is further configured to place a replenishment order in response to the second information pertaining to the contents within the product packaging. In some embodiments, the application is further configured to send a notification message in response to the second information pertaining to the contents within the product packaging. The notification message may include at least one of a quantity indication, an expiration date, a refill date, a refill count, a lot number, a chemical composition, and a concentration indication.

In some embodiments, the application is further configured to maintain a log of at least some of the second information pertaining to the contents within the product packaging. The log may be maintained by a network access point, where the network access point may receive a voice activated command. The log may include an entry corresponding to at least a portion of the second information.

In some embodiments, the application is further configured to receive, from a second electromagnetic state sensing device (EMSSD) that is affixed to product packaging, an electromagnetic radiation relay signal, wherein the electromagnetic radiation relay signal is transduced by the second electromagnetic state sensing device.

Variations of the foregoing may include more or fewer of the shown modules. Certain variations may perform more or fewer (or different) steps and/or certain variations may use data elements in more, or in fewer, or in different operations.

Still further, some embodiments include variations in the operations performed, and some embodiments include variations of aspects of the data elements used in the operations.

Figure 10B:
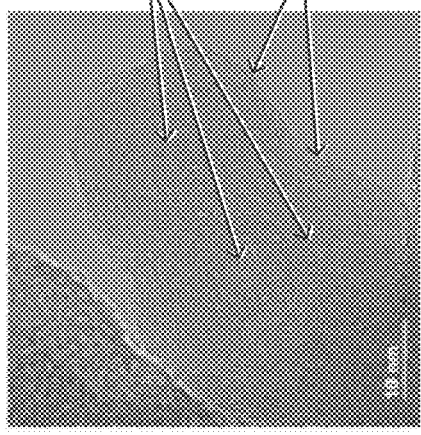
FIG. 10A through FIG. 10Y depict structured carbons, various carbon nanoparticles, various carbon-based aggregates, and various three-dimensional carbon-containing assemblies that are grown over other materials, according to some embodiments.
Figure 10A:
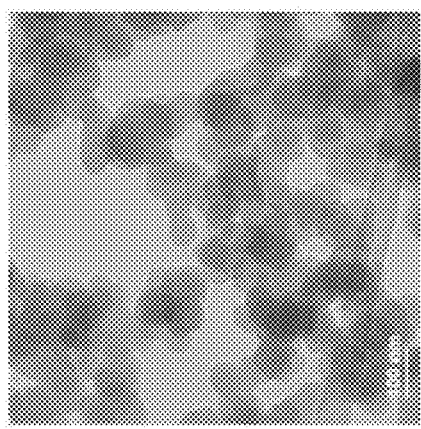
Figure 10C:
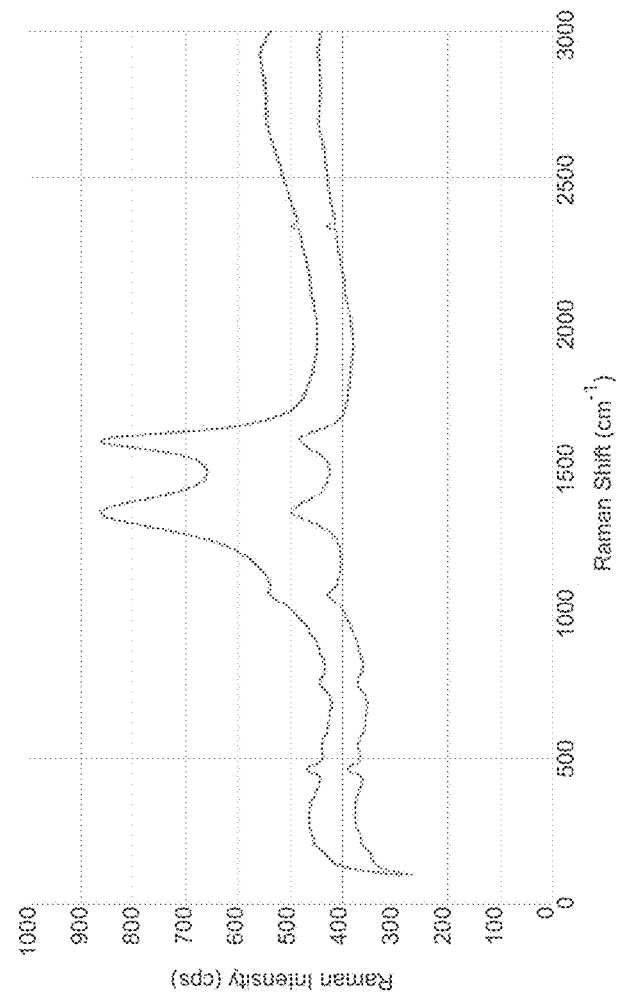
Figure 10D:
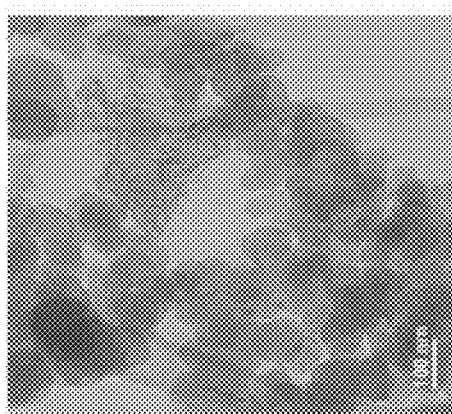
Figure 10E:
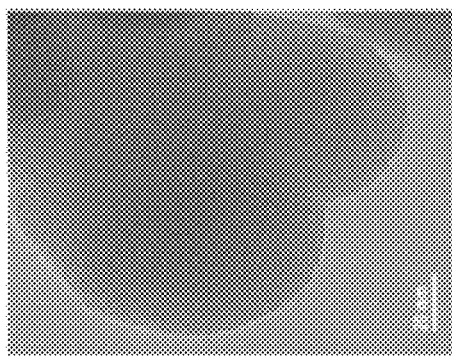
Figure 10F:
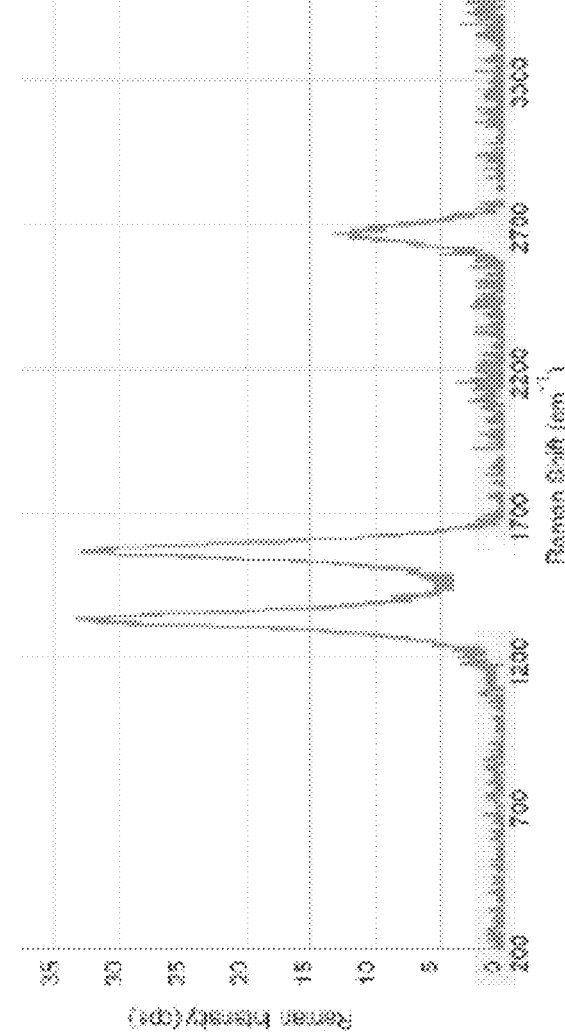
Figure 10G:
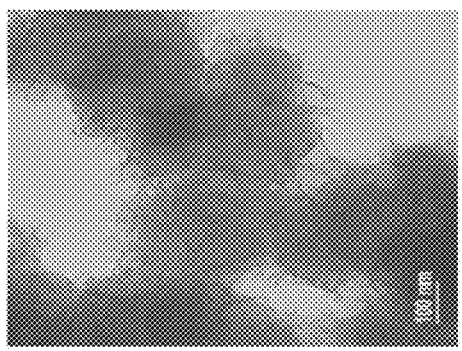
Figure 10H:
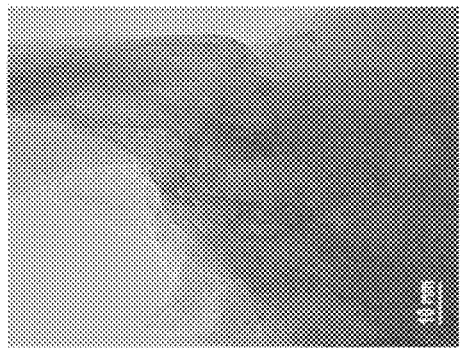
Figure 10I:
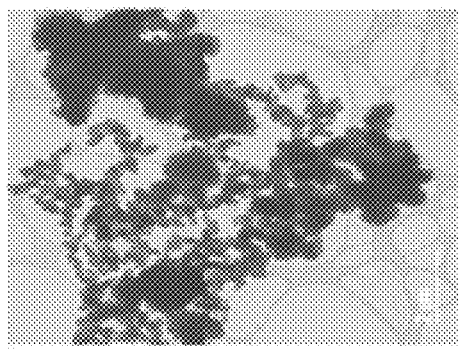
Figure 10J:
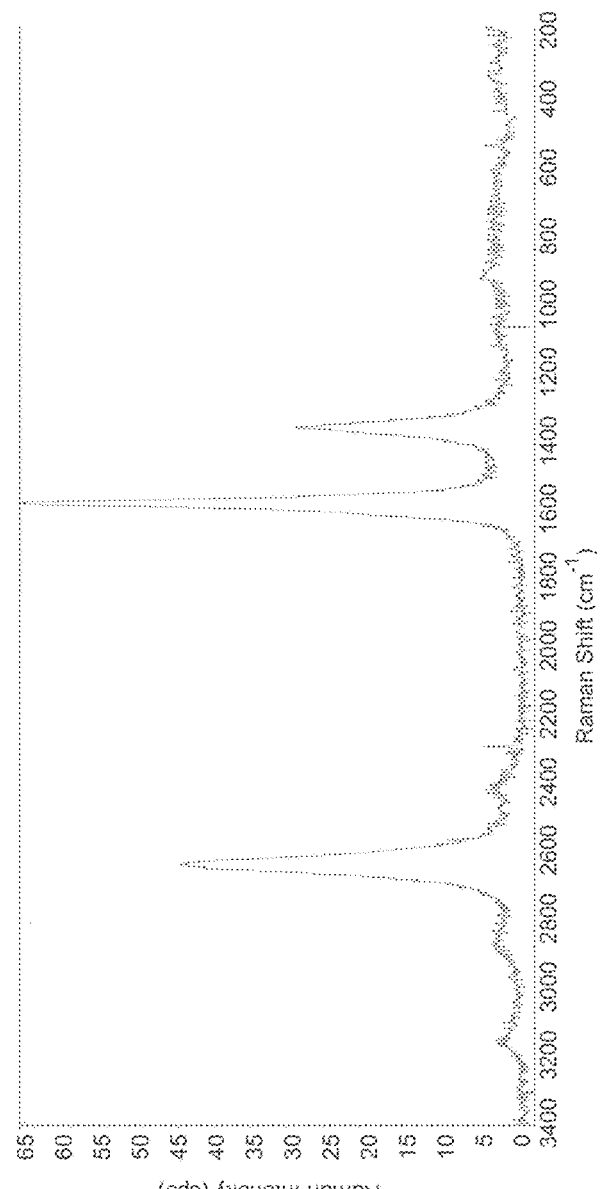
Figure 10K:
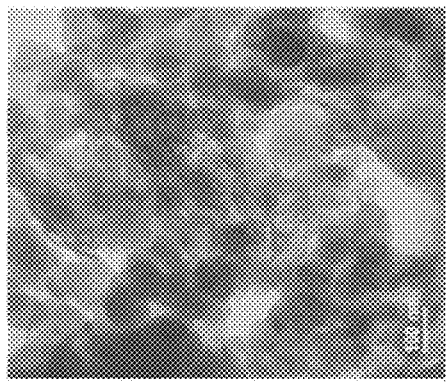
Figure 10L:
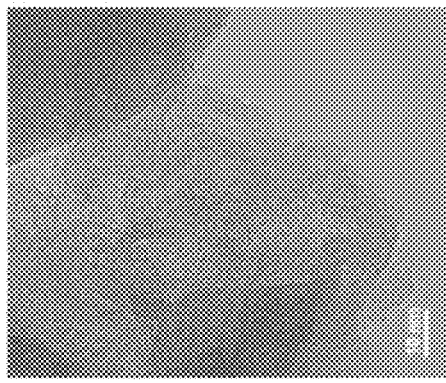
Figure 10M:
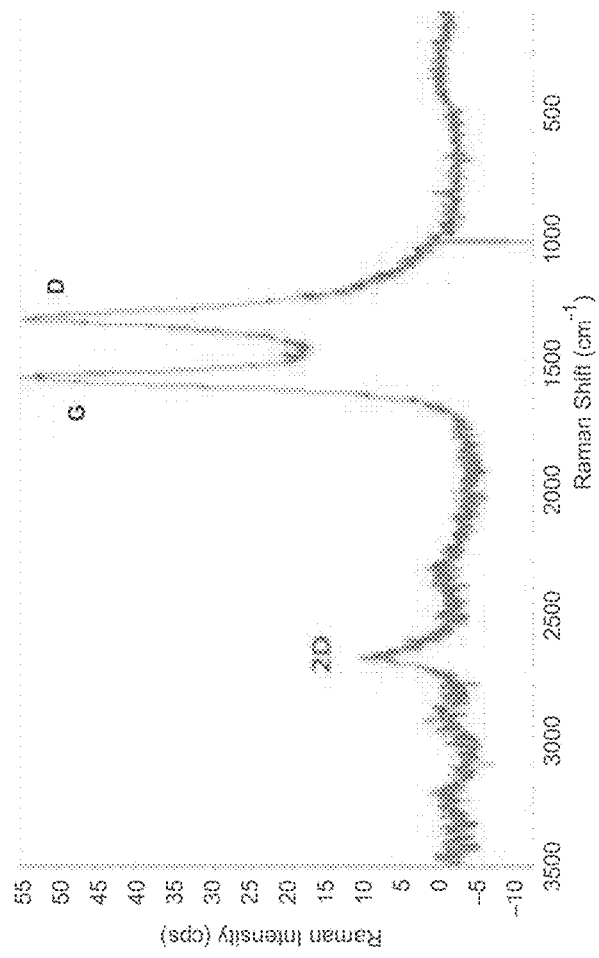
Figure 10N:
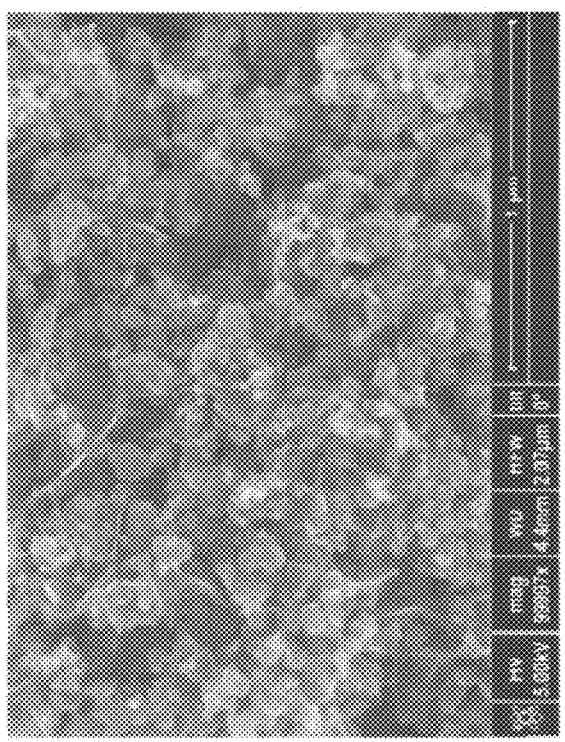
Figure 10O:
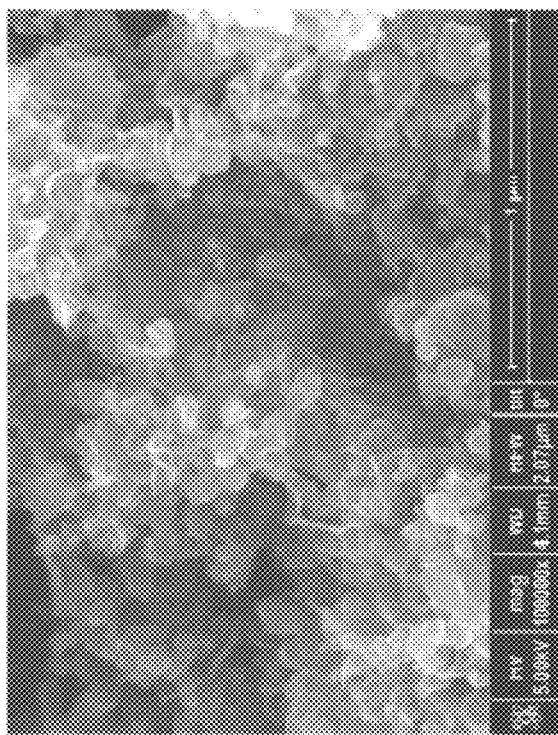
Figure 10P:
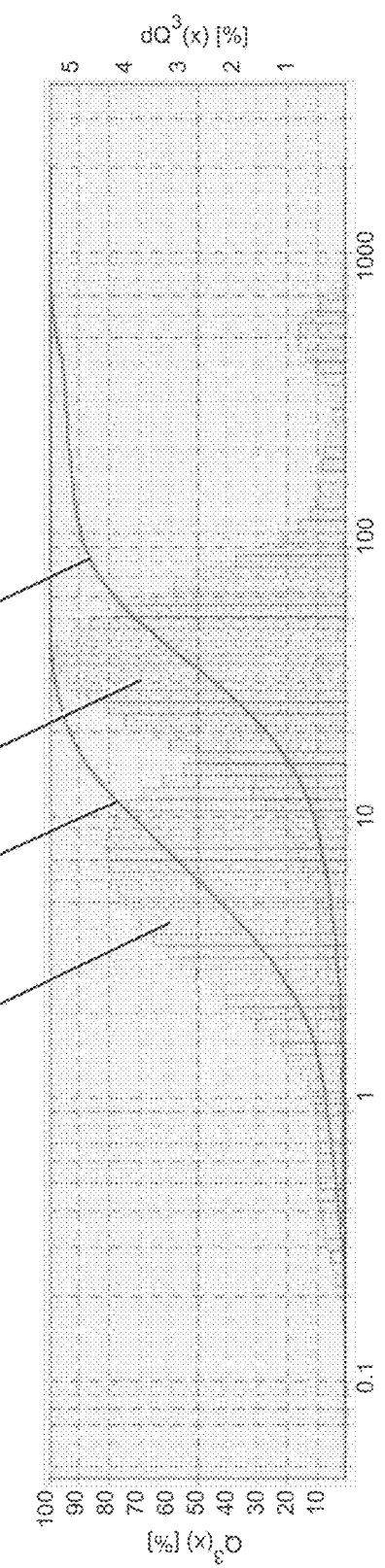
Figure 10Q:
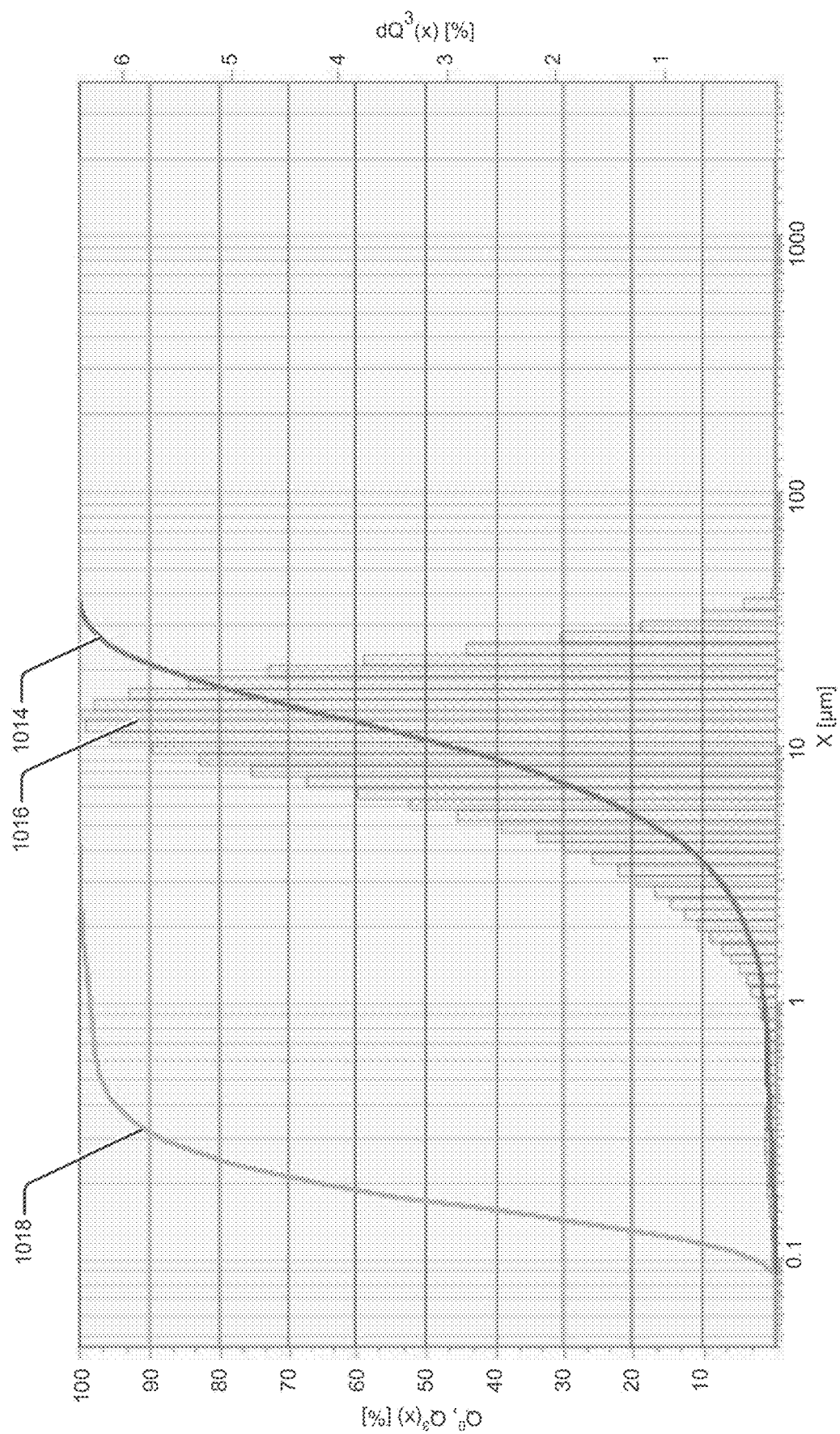
Figure 10R:
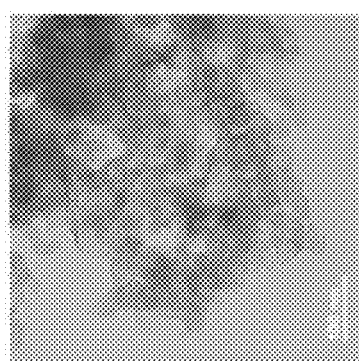
Figure 10S:
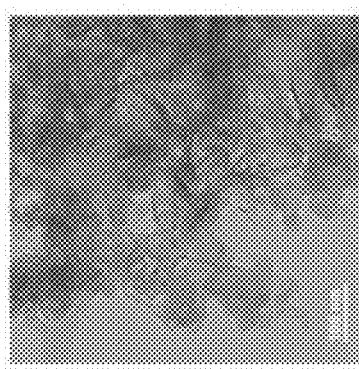
Figure 10T:
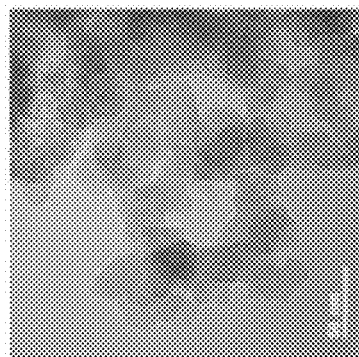
Figure 10U:
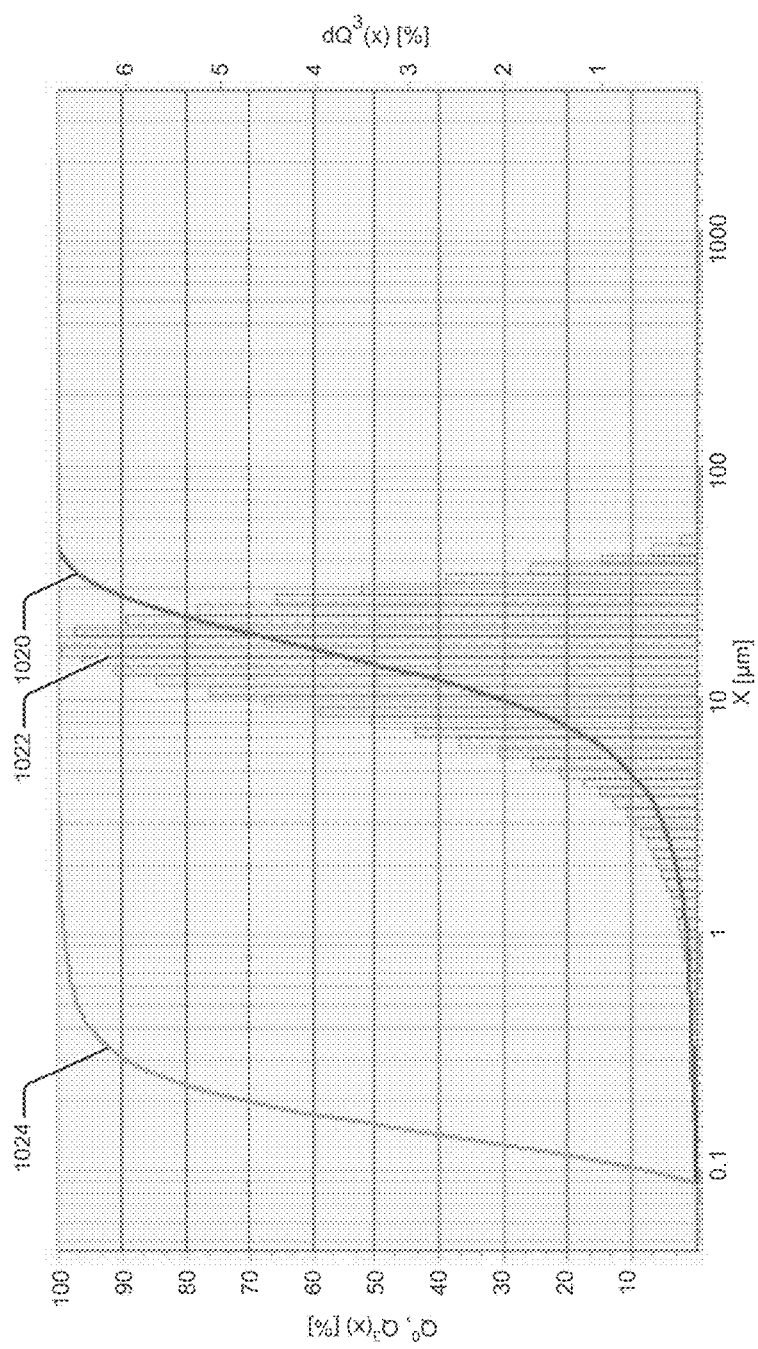
Figure 10V:
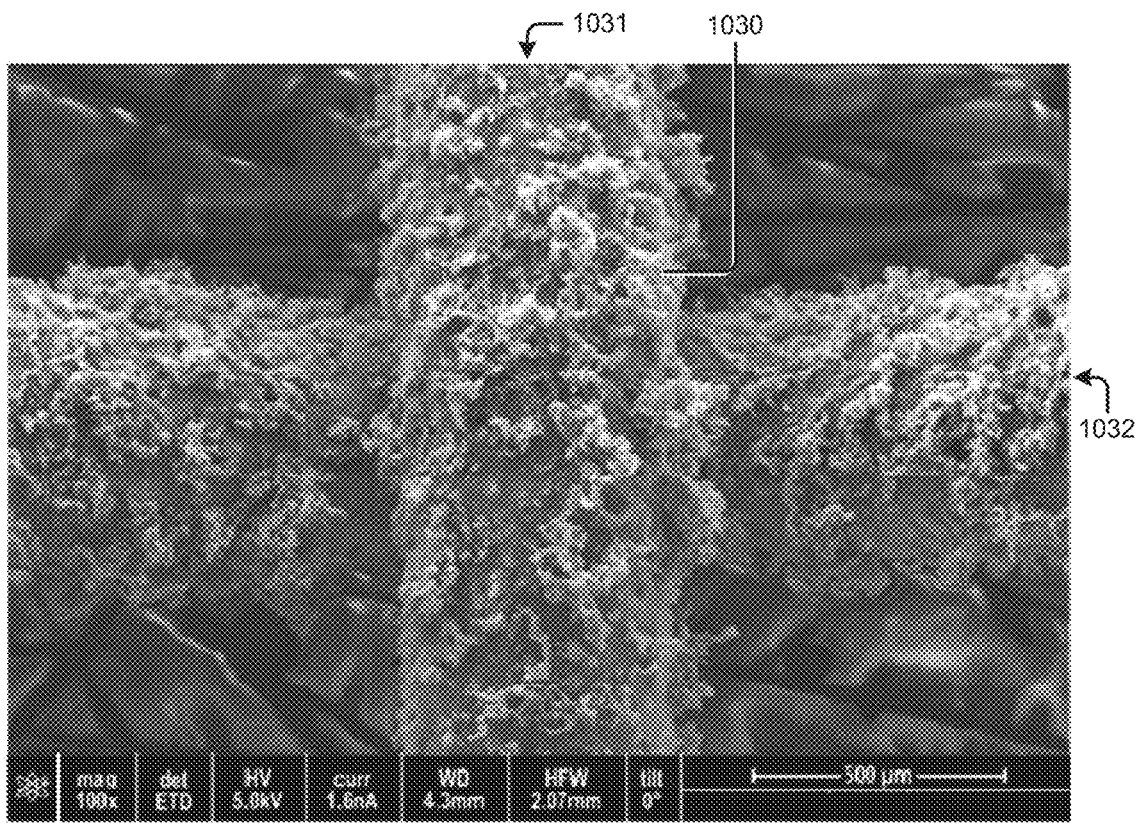
Figure 10W:
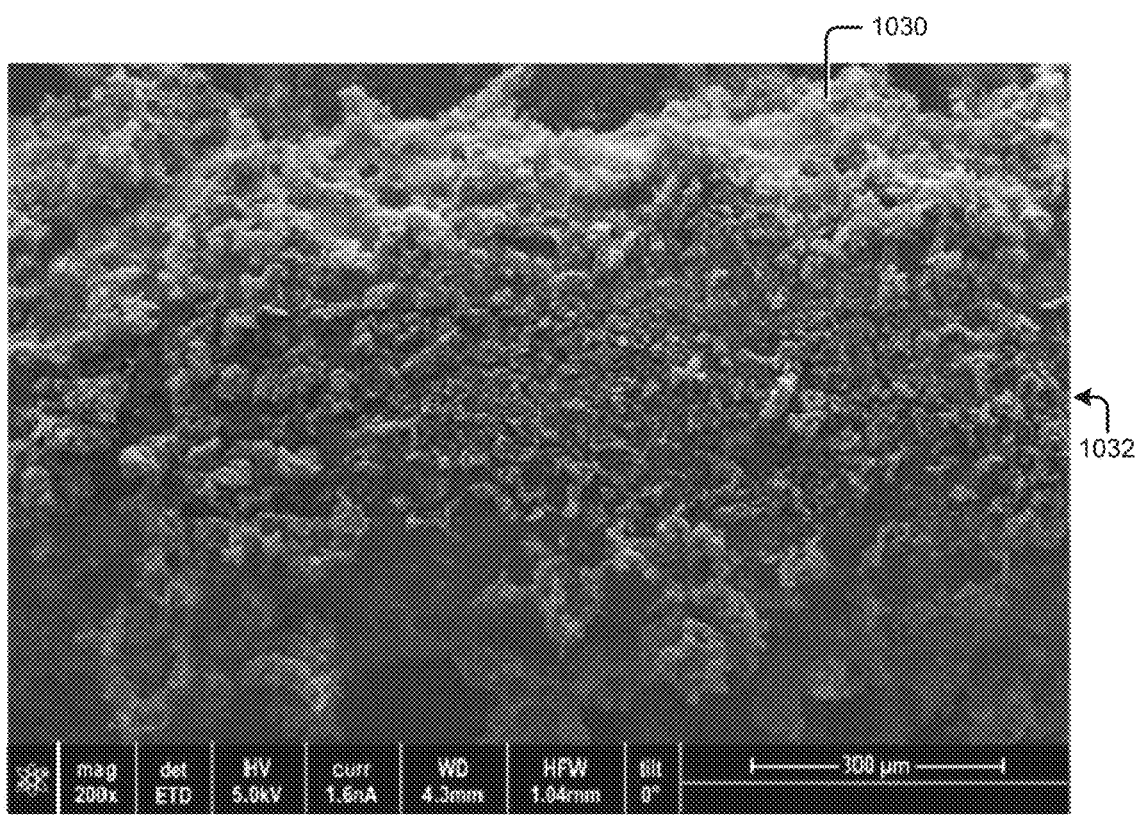
Figure 10X:
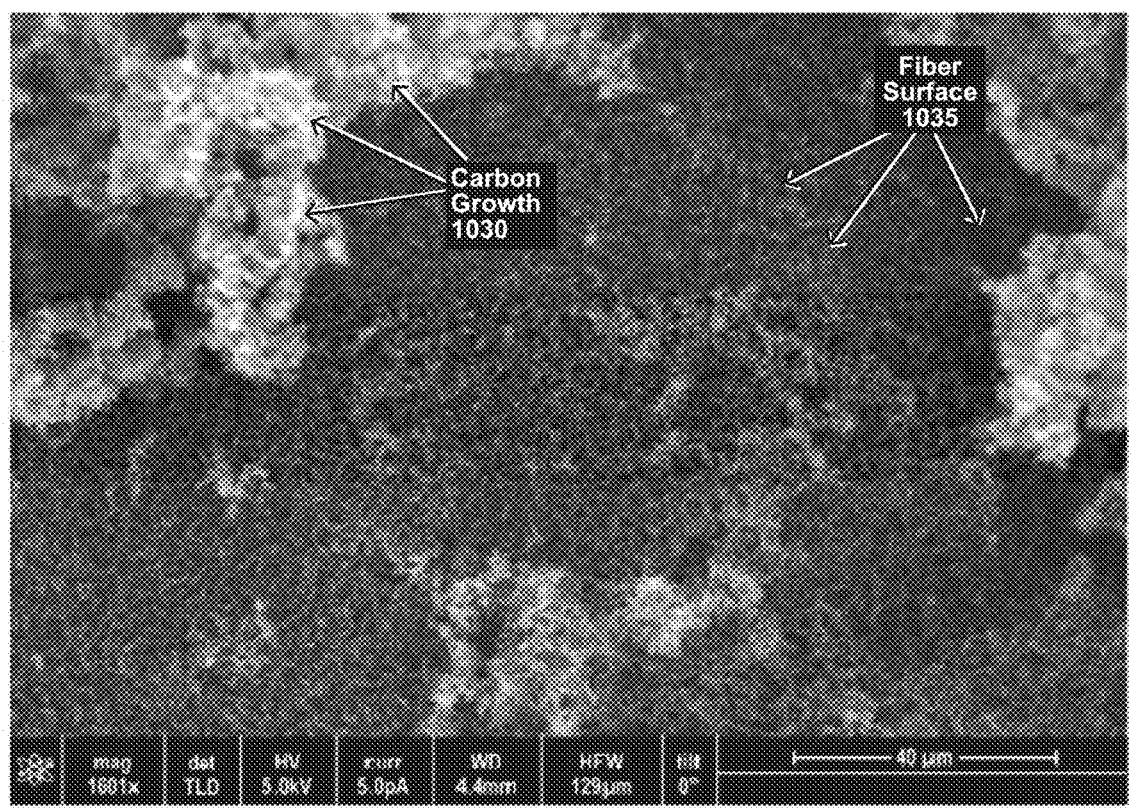
Figure 10Y:
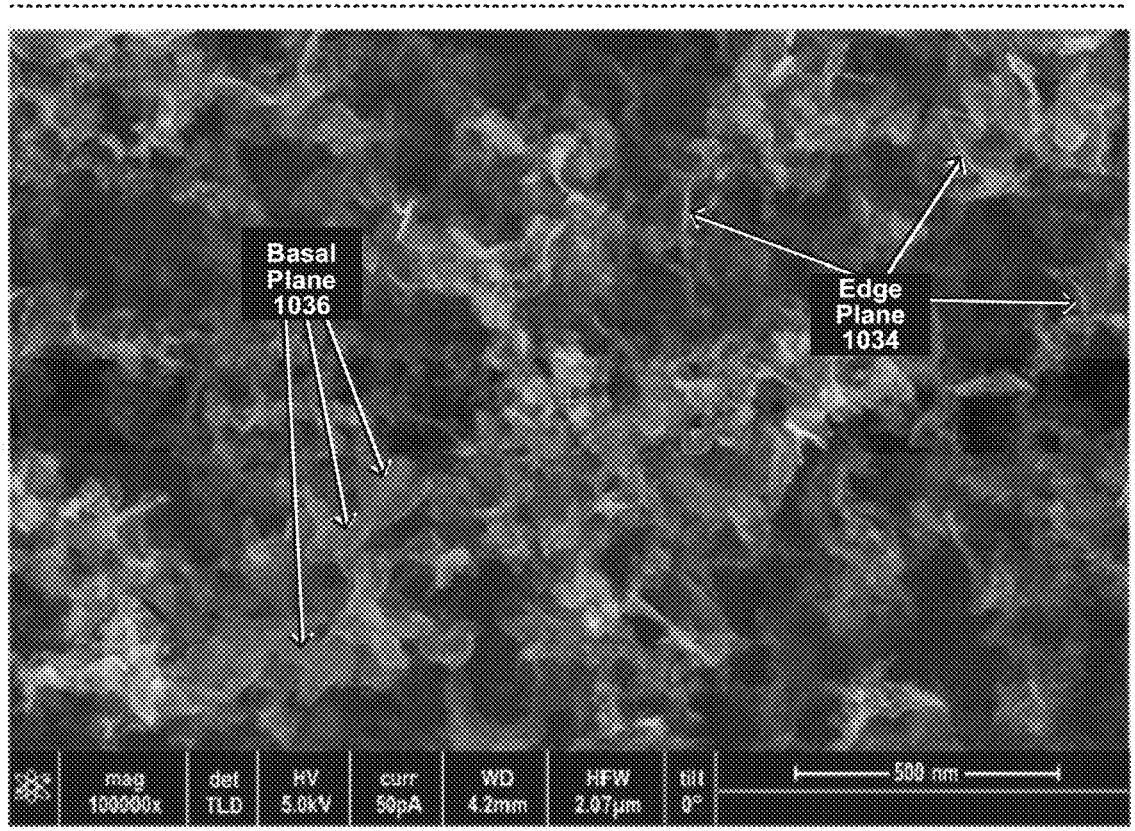

FIG. 10A through FIG. 10Y depict structured carbons, various carbon nanoparticles, and various carbon-containing aggregates, and various three-dimensional carbon-containing structures that are grown over other materials, according to some embodiments of the present disclosure.

Some embodiments of EMSSDs use carbon nanoparticles and aggregates in certain configurations. In some embodiments, the carbon nanoparticles and aggregates are characterized by a high "uniformity" (i.e., high mass fraction of desired carbon allotropes), a high degree of "order" (i.e., low concentration of defects), and/or a high degree of "purity" (i.e., low concentration of elemental impurities), in contrast to the lower uniformity, less ordered, and lower purity particles achievable with conventional systems and methods. This results in a high degree of tunability of the resonating portions of EMSSDs.

In some embodiments, the nanoparticles produced using the methods described herein contain multi-walled spherical fullerenes (MWSFs) or connected MWSFs and have a high uniformity (e.g., a ratio of graphene to MWSF from 20% to 80%), a high degree of order (e.g., a Raman signature with an ID/IG ratio from 0.95 to 1.05), and a high degree of purity (e.g., the ratio of carbon to other elements (other than hydrogen) is greater than 99.9%). In some embodiments, the nanoparticles produced using the methods described herein contain MWSFs or connected MWSFs, and the MWSFs do not contain a core composed of impurity elements other than carbon. In some cases, the particles produced using the methods described herein are aggregates containing the nanoparticles described above with large diameters (e.g., greater than 10 μm across).

Conventional methods have been used to produce particles containing multi-walled spherical fullerenes with a high degree of order, but the conventional methods lead to carbon products with a variety of shortcomings. For example, high temperature synthesis techniques lead to particles with a mixture of many carbon allotropes and therefore low uniformity (e.g., less than 20% fullerenes to other carbon allotropes) and/or small particle sizes (e.g., less than 1 μm, or less than 100 nm in some cases). Methods using catalysts lead to products including the catalyst elements and therefore have low purity (e.g., less than 95% carbon to other elements) as well. These undesirable properties also often lead to undesirable electrical properties of the resulting carbon particles (e.g., electrical conductivity of less than 1000 S/m).

In some embodiments, the carbon nanoparticles and aggregates described herein are characterized by Raman spectroscopy that is indicative of the high degree of order and uniformity of structure. In some embodiments, the uniform, ordered and/or pure carbon nanoparticles and aggregates described herein are produced using relatively high speed, low cost improved thermal reactors and methods, as described below. Additional advantages and/or improvements will also become apparent from the following disclosure.

In the present disclosure, the term "graphene" refers to an allotrope of carbon in the form of a two-dimensional, atomic-scale, hexagonal lattice in which one atom forms each vertex. The carbon atoms in graphene are $sp^2$-bonded. Additionally, graphene has a Raman spectrum with two main peaks: a G-mode at approximately 1580 $cm^{-1}$ and a D-mode at approximately 1350 $cm^{-1}$ (when using a 532 nm excitation laser).

In the present disclosure, the term "fullerene" refers to a molecule of carbon in the form of a hollow sphere, ellipsoid, tube, or other shapes. Spherical fullerenes can also be referred to as Buckminsterfullerenes, or buckyballs. Cylindrical fullerenes can also be referred to as carbon nanotubes. Fullerenes are similar in structure to graphite, which is composed of stacked graphene sheets of linked hexagonal rings. Fullerenes may also contain pentagonal (or sometimes heptagonal) rings.

In the present disclosure, the term "multi-walled fullerene" refers to fullerenes with multiple concentric layers. For example, multi-walled nanotubes (MWNTs) contain multiple rolled layers (concentric tubes) of graphene. Multi-walled spherical fullerenes (MWSFs) contain multiple concentric spheres of fullerenes.

In the present disclosure, the term "nanoparticle" refers to a particle that measures from 1 nm to 989 nm. The nanoparticle can include one or more structural characteristics (e.g., crystal structure, defect concentration, etc.), and one or more types of atoms. The nanoparticle can be any shape, including but not limited to spherical shapes, spheroidal shapes, dumbbell shapes, cylindrical shapes, elongated cylindrical type shapes, rectangular prism shapes, disk shapes, wire shapes, irregular shapes, dense shapes (i.e., with few voids), porous shapes (i.e., with many voids), etc.

In the present disclosure, the term "aggregate" refers to a plurality of nanoparticles that are connected together by Van der Waals forces, by covalent bonds, by ionic bonds, by metallic bonds, or by other physical or chemical interactions. Aggregates can vary in size considerably, but in general are larger than about 500 nm.

In some embodiments, a carbon nanoparticle, as described herein, includes two or more connected multi-walled spherical fullerenes (MWSFs) and layers of graphene coating the connected MWSFs. In some embodiments, a carbon nanoparticle, as described herein, includes two or more connected multi-walled spherical fullerenes (MWSFs) and layers of graphene coating the connected MWSFs where the MWSFs do not contain a core composed of impurity elements other than carbon. In some embodiments, a carbon nanoparticle, as described herein, includes two or more connected multi-walled spherical fullerenes (MWSFs) and layers of graphene coating the connected MWSFs where the MWSFs do not contain a void (i.e., a space with no carbon atoms greater than approximately 0.5 nm, or greater than approximately 1 nm) at the center. In some embodiments, the connected MWSFs are formed of concentric, well-ordered spheres of $sp^2$-hybridized carbon atoms, as contrasted with spheres of poorly-ordered, non-uniform, amorphous carbon particles.

In some embodiments, the nanoparticles containing the connected MWSFs have an average diameter in a range from 5 to 500 nm, or from 5 to 250 nm, or from 5 to 100 nm, or from 5 to 50 nm, or from 10 to 500 nm, or from 10 to 250 nm, or from 10 to 100 nm, or from 10 to 50 nm, or from 40 to 500 nm, or from 40 to 250 nm, or from 40 to 100 nm, or from 50 to 500 nm, or from 50 to 250 nm, or from 50 to 100 nm.

In some embodiments, the carbon nanoparticles described herein form aggregates, wherein many nanoparticles aggregate together to form a larger unit. In some embodiments, a carbon aggregate includes a plurality of carbon nanoparticles. A diameter across the carbon aggregate is in a range from 10 to 500 μm, or from 50 to 500 μm, or from 100 to 500 μm, or from 250 to 500 μm, or from 10 to 250 μm, or from 10 to 100 μm, or from 10 to 50 μm. In some embodiments, the aggregate is formed from a plurality of carbon nanoparticles, as defined above. In some embodiments, aggregates contain connected MWSFs. In some embodiments, the aggregates contain connected MWSFs with a high uniformity metric (e.g., a ratio of graphene to MWSF from 20% to 80%), a high degree of order (e.g., a Raman signature with an ID/IG ratio from 0.95 to 1.05), and a high degree of purity (e.g., greater than 99.9% carbon).

One benefit of producing aggregates of carbon nanoparticles, particularly with diameters in the ranges described above, is that aggregates of particles greater than 10 μm are easier to collect than particles or aggregates of particles that are smaller than 500 nm. The case of collection reduces the cost of manufacturing equipment used in the production of the carbon nanoparticles and increases the yield of the carbon nanoparticles. Additionally, particles greater than 10 μm in size pose fewer safety concerns compared to the risks of handling smaller nanoparticles, e.g., potential health and safety risks due to inhalation of the smaller nanoparticles. The lower health and safety risks, thus, further reduce the manufacturing cost.

In some embodiments, a carbon nanoparticle has a ratio of graphene to MWSFs from 10% to 90%, or from 10% to 80%, or from 10% to 60%, or from 10% to 40%, or from 10% to 20%, or from 20% to 40%, or from 20% to 90%, or from 40% to 90%, or from 60% to 90%, or from 80% to 90%. In some embodiments, a carbon aggregate has a ratio of graphene to MWSFs is from 10% to 90%, or from 10% to 80%, or from 10% to 60%, or from 10% to 40%, or from 10% to 20%, or from 20% to 40%, or from 20% to 90%, or from 40% to 90%, or from 60% to 90%, or from 80% to 90%. In some embodiments, a carbon nanoparticle has a ratio of graphene to connected MWSFs from 10% to 90%, or from 10% to 80%, or from 10% to 60%, or from 10% to 40%, or from 10% to 20%, or from 20% to 40%, or from 20% to 90%, or from 40% to 90%, or from 60% to 90%, or from 80% to 90%. In some embodiments, a carbon aggregate has a ratio of graphene to connected MWSFs is from 10% to 90%, or from 10% to 80%, or from 10% to 60%, or from 10% to 40%, or from 10% to 20%, or from 20% to 40%, or from 20% to 90%, or from 40% to 90%, or from 60% to 90%, or from 80% to 90%.

In some embodiments, Raman spectroscopy is used to characterize carbon allotropes to distinguish their molecular structures. For example, graphene can be characterized using Raman spectroscopy to determine information such as order/disorder, edge and grain boundaries, thickness, number of layers, doping, strain, and thermal conductivity. MWSFs have also been characterized using Raman spectroscopy to determine the degree of order of the MWSFs.

In some embodiments, Raman spectroscopy is used to characterize the structure of MWSFs or connected MWSFs. The main peaks in the Raman spectra are the G-mode and the D-mode. The G-mode is attributed to the vibration of carbon atoms in $sp^2$-hybridized carbon networks, and the D-mode is related to the breathing of hexagonal carbon rings with defects. In some cases, defects may be present, yet may not be detectable in the Raman spectra. For example, if the presented crystalline structure is orthogonal with respect to the basal plane, the D-peak will show an increase. On the other hand, if presented with a perfectly planar surface that is parallel with respect to the basal plane, the D-peak will be zero.

When using 532 nm incident light, the Raman G-mode is typically at 1582 cm$^{-1}$ for planar graphite can be down-shifted for MWSFs or connected MWSFs (e.g., down to 1565 cm$^{-1}$ or down to 1580 cm$^{-1}$). The D-mode is observed at approximately 1350 cm$^{-1}$ in the Raman spectra of MWSFs or connected MWSFs. The ratio of the intensities of the D-mode peak to G-mode peak (i.e., the ID/IG) is related to the degree of order of the MWSFs, where a lower ID/IG indicates a higher degree of order. An ID/IG near or below 1 indicates a relatively high degree of order, and an ID/IG greater than 1.1 indicates a lower degree of order.

In some embodiments, a carbon nanoparticle or a carbon aggregate containing MWSFs or connected MWSFs may have a Raman spectrum with a first Raman peak at about 1350 cm$^{-1}$ and a second Raman peak at about 1580 cm$^{-1}$ when using 532 nm incident light. In some embodiments, the ratio of an intensity of the first Raman peak to an intensity of the second Raman peak (i.e., the ID/IG) for the nanoparticles or the aggregates described herein is in a range from 0.95 to 1.05, or from 0.9 to 1.1, or from 0.8 to 1.2, or from 0.9 to 1.2, or from 0.8 to 1.1, or from 0.5 to 1.5, or less than 1.5, or less than 1.2, or less than 1.1, or less than 1, or less than 0.95, or less than 0.9, or less than 0.8.

In some embodiments, a carbon aggregate containing MWSFs or connected MWSFs, as defined above, has a high purity. In some embodiments, the carbon aggregate containing MWSFs or connected MWSFs has a ratio of carbon to metals of greater than 99.99%, or greater than 99.95%, or greater than 99.9%, or greater than 99.8%, or greater than 99.5%, or greater than 99%. In some embodiments, the carbon aggregate has a ratio of carbon to other elements of greater than 99.99%, or greater than 99.95%, or greater than 99.9%, or greater than 99.5%, or greater than 99%, or greater than 90%, or greater than 80%, or greater than 70%, or greater than 60%. In some embodiments, the carbon aggregate has a ratio of carbon to other elements (except for hydrogen) of greater than 99.99%, or greater than 99.95%, or greater than 99.9%, or greater than 99.8%, or greater than 99.5%, or greater than 99%, or greater than 90%, or greater than 80%, or greater than 70%, or greater than 60%.

In some embodiments, a carbon aggregate containing MWSFs or connected MWSFs, as defined above, has a high specific surface area. In some embodiments, the carbon aggregate has a Brunauer, Emmett and Teller (BET) specific surface area from 10 to 200 m$^2$/g, or from 10 to 100 m$^2$/g, or from 10 to 50 m$^2$/g, or from 50 to 200 m$^2$/g, or from 50 to 100 m$^2$/g, or from 10 to 1000 m$^2$/g.

In some embodiments, a carbon aggregate containing MWSFs or connected MWSFs, as defined above, has a high electrical conductivity. In some embodiments, a carbon aggregate containing MWSFs or connected MWSFs, as defined above, is compressed into a pellet and the pellet has an electrical conductivity greater than 500 S/m, or greater than 1000 S/m, or greater than 2000 S/m, or greater than 3000 S/m, or greater than 4000 S/m, or greater than 5000 S/m, or greater than 10000 S/m, or greater than 20000 S/m, or greater than 30000 S/m, or greater than 40000 S/m, or greater than 50000 S/m, or greater than 60000 S/m, or greater than 70000 S/m, or from 500 S/m to 100000 S/m, or from 500 S/m to 1000 S/m, or from 500 S/m to 10000 S/m, or from 500 S/m to 20000 S/m, or from 500 S/m to 100000 S/m, or from 1000 S/m to 10000 S/m, or from 1000 S/m to 20000 S/m, or from 10000 to 100000 S/m, or from 10000 S/m to 80000 S/m, or from 500 S/m to 10000 S/m. In some cases, the density of the pellet is approximately 1 g/cm$^3$, or approximately 1.2 g/cm$^3$, or approximately 1.5 g/cm$^3$, or approximately 2 g/cm$^3$, or approximately 2.2 g/cm$^3$, or approximately 2.5 g/cm$^3$, or approximately 3 g/cm$^3$. Additionally, tests have been performed in which compressed pellets of the carbon aggregate materials have been formed with compressions of 2000 psi and 12000 psi and with annealing temperatures of 800° C. and 1000° C. The higher compression and/or the higher annealing temperatures generally result in pellets with a higher degree of electrical conductivity, including in the range of 12410.0 S/m to 13173.3 S/m.

High Purity Carbon Allotropes Produced Using Thermal Systems

In some embodiments, the carbon nanoparticles and aggregates described herein are produced using thermal reactors and methods, such as any appropriate thermal reactor and/or method. Further details pertaining to thermal reactors and/or methods of use can be found in U.S. Pat. No. 9,862,602, issued Jan. 9, 2018, entitled "CRACKING OF A PROCESS GAS," which is hereby incorporated by reference in its entirety. Additionally, precursors (e.g., including methane, ethane, propane, butane, and natural gas) can be used with the thermal reactors to produce the carbon nanoparticles and the carbon aggregates described herein.

In some embodiments, the carbon nanoparticles and aggregates described herein are produced using the thermal reactors with gas flow rates from 1 standard liter per minute (slm) to 10 slm, or from 0.1 slm to 20 slm, or from 1 slm to 5 slm, or from 5 slm to 10 slm, or greater than 1 slm, or greater than 5 slm. In some embodiments, the carbon nanoparticles and aggregates described herein are produced using the thermal reactors with gas resonance times from 0.1 seconds to 30 seconds, or from 0.1 seconds to 10 seconds, or from 1 seconds to 10 seconds, or from 1 seconds to 5 seconds, from 5 seconds to 10 seconds, or greater than 0.1 seconds, or greater than 1 seconds, or greater than 5 seconds, or less than 30 seconds.

In some embodiments, the carbon nanoparticles and aggregates described herein are produced using the thermal reactors with production rates from 10 g/hr to 200 g/hr, or from 30 g/hr to 200 g/hr, or from 30 g/hr to 100 g/hr, or from 30 g/hr to 60 g/hr, or from 10 g/hr to 100 g/hr, or greater than 10 g/hr, or greater than 30 g/hr, or greater than 100 g/hr.

In some embodiments, thermal reactors or other cracking apparatuses and thermal reactor methods or other cracking methods can be used for refining, pyrolyzing, dissociating or cracking feedstock process gases into its constituents to produce the carbon nanoparticles and the carbon aggregates described herein, as well as other solid and/or gaseous products (e.g., hydrogen gas and/or lower order hydrocarbon gases). The feedstock process gases generally include, for example, hydrogen gas ($H^2$), carbon dioxide ($CO^2$), $C^1$ to $C^{10}$ hydrocarbons, aromatic hydrocarbons, and/or other hydrocarbon gases such as natural gas, methane, ethane, propane, butane, isobutane, saturated/unsaturated hydrocarbon gases, ethene, propene, etc., and mixtures thereof. The carbon nanoparticles and the carbon aggregates can include, for example, multi-walled spherical fullerenes (MWSFs), connected MWSFs, carbon nanospheres, graphene, graphite, highly ordered pyrolytic graphite, single-walled nanotubes, multi-walled nanotubes, other solid carbon products, and/or the carbon nanoparticles and the carbon aggregates described herein.

Some embodiments for producing the carbon nanoparticles and the carbon aggregates described herein include thermal cracking methods that use, for example, an elongated longitudinal heating element optionally enclosed within an elongated casing, housing or body of a thermal cracking apparatus. The body generally includes, for example, one or more tubes or other appropriate enclosures made of stainless steel, titanium, graphite, quartz, or the like. In some embodiments, the body of the thermal cracking apparatus is generally cylindrical in shape with a central elongate longitudinal axis arranged vertically and a feedstock process gas inlet at or near the top of the body. The feedstock process gas flows longitudinally down through the body or a portion thereof. In the vertical configuration, both gas flow and gravity assist in the removal of the solid products from the body of the thermal cracking apparatus.

The heating element generally includes, for example, a heating lamp, one or more resistive wires or filaments (or twisted wires), metal filaments, metallic strips or rods, and/or other appropriate thermal radical generators or elements that can be heated to a specific temperature (i.e., a molecular cracking temperature) sufficient to thermally crack molecules of the feedstock process gas. The heating element is generally disposed, located or arranged to extend centrally within the body of the thermal cracking apparatus along the central longitudinal axis thereof. For example, if there is only one heating element, then it is placed at or concentric with the central longitudinal axis, and if there is a plurality of the heating elements, then they are spaced or offset generally symmetrically or concentrically at locations near and around and parallel to the central longitudinal axis. Thermal cracking to produce the carbon nanoparticles and aggregates described herein is generally achieved by passing the feedstock process gas over, or in contact with, or within the vicinity of, the heating element within a longitudinal elongated reaction zone generated by heat from the heating element and defined by and contained inside the body of the thermal cracking apparatus to heat the feedstock process gas to or at a specific molecular cracking temperature.

The reaction zone is considered to be the region surrounding the heating element and close enough to the heating element for the feedstock process gas to receive sufficient heat to thermally crack the molecules thereof. The reaction zone is thus generally axially aligned or concentric with the central longitudinal axis of the body. In some embodiments, the thermal cracking is performed under a specific pressure. In some embodiments, the feedstock process gas is circulated around or across the outside surface of a container of the reaction zone or a heating chamber in order to cool the container or chamber and preheat the feedstock process gas before flowing the feedstock process gas into the reaction zone.

In some embodiments, the carbon nanoparticles and aggregates described herein and/or hydrogen gas are produced without the use of catalysts. In other words, the process is catalyst free.

Some embodiments to produce the carbon nanoparticles and aggregates described herein using thermal cracking apparatuses and methods to provide a standalone system that can advantageously be rapidly scaled up or scaled down for different production levels as desired. For example, some embodiments are scalable to provide a standalone hydrogen and/or carbon nanoparticle producing station, a hydrocarbon source, or a fuel cell station. Some embodiments can be scaled up to provide higher capacity systems, e.g., for a refinery or the like.

In some embodiments, a thermal cracking apparatus for cracking a feedstock process gas to produce the carbon nanoparticles and aggregates described herein include a body, a feedstock process gas inlet, and an elongated heating element. The body has an inner volume with a longitudinal axis. The inner volume has a reaction zone concentric with the longitudinal axis. A feedstock process gas is flowed into the inner volume through the feedstock process gas inlet during thermal cracking operations. The elongated heating element is disposed within the inner volume along the longitudinal axis and is surrounded by the reaction zone. During the thermal cracking operations, the elongated heating element is heated by electrical power to a molecular cracking temperature to generate the reaction zone, the feedstock process gas is heated by heat from the elongated heating element, and the heat thermally cracks molecules of the feedstock process gas that are within the reaction zone into constituents of the molecules.

In some embodiments, a method for cracking a feedstock process gas to produce the carbon nanoparticles and aggregates described herein includes (1) providing a thermal cracking apparatus having an inner volume that has a longitudinal axis and an elongated heating element disposed within the inner volume along the longitudinal axis; (2) heating the elongated heating element by electrical power to a molecular cracking temperature to generate a longitudinal elongated reaction zone within the inner volume; (3) flowing a feedstock process gas into the inner volume and through the longitudinal elongated reaction zone (e.g., wherein the feedstock process gas is heated by heat from the elongated heating element); and (4) thermally cracking molecules of the feedstock process gas within the longitudinal elongated reaction zone into constituents thereof (e.g., hydrogen gas and one or more solid products) as the feedstock process gas flows through the longitudinal elongated reaction zone.

In some embodiments, the feedstock process gas to produce the carbon nanoparticles and aggregates described herein includes a hydrocarbon gas. The results of cracking include hydrogen (e.g., $H^2$) and various forms of the carbon nanoparticles and aggregates described herein. In some embodiments, the carbon nanoparticles and aggregates include two or more MWSFs and layers of graphene coating the MWSFs, and/or connected MWSFs and layers of graphene coating the connected MWSFs. In some embodiments, the feedstock process gas is preheated (e.g., to 100° C. to 500° C.) by flowing the feedstock process gas through a gas preheating region between a heating chamber and a shell of the thermal cracking apparatus before flowing the feedstock process gas into the inner volume. In some embodiments, a gas having nanoparticles therein is flowed into the inner volume and through the longitudinal elongated reaction zone to mix with the feedstock process gas, and a coating of a solid product (e.g., layers of graphene) is formed around the nanoparticles.

Post-Processing High Purity Structured Carbons

In some embodiments, the carbon nanoparticles and aggregates containing multi-walled spherical fullerenes (MWSFs) or connected MWSFs described herein are produced and collected, and no post-processing is done. In other embodiments, the carbon nanoparticles and aggregates containing multi-walled spherical fullerenes (MWSFs) or connected MWSFs described herein are produced and collected, and some post-processing is done. Some examples of post-processing involved in electromagnetic state sensing devices include mechanical processing such as ball milling, grinding, attrition milling, micro fluidizing, and other techniques to reduce the particle size without damaging the MWSFs.

Some further examples of post-processing include exfoliation processes such as sheer mixing, chemical etching, oxidizing (e.g., Hummer method), thermal annealing, doping by adding elements during annealing (e.g., sulfur, nitrogen), steaming, filtering, and lyophilizing, among others. Some examples of post-processing include sintering processes such as spark plasma sintering (SPS), direct current sintering, microwave sintering, and ultraviolet (UV) sintering, which can be conducted at high pressure and temperature in an inert gas. In some embodiments, multiple post-processing methods can be used together or in a series. In some embodiments, the post-processing produces functionalized carbon nanoparticles or aggregates containing multi-walled spherical fullerenes (MWSFs) or connected MWSFs.

In some embodiments, the materials are mixed together in different combinations. In some embodiments, different carbon nanoparticles and aggregates containing MWSFs or connected MWSFs described herein are mixed together before post-processing. For example, different carbon nanoparticles and aggregates containing MWSFs or connected MWSFs with different properties (e.g., different sizes, different compositions, different purities, from different processing runs, etc.) can be mixed together. In some embodiments, the carbon nanoparticles and aggregates containing MWSFs or connected MWSFs described herein can be mixed with graphene to change the ratio of the connected MWSFs to graphene in the mixture. In some embodiments, different carbon nanoparticles and aggregates containing MWSFs or connected MWSFs described herein can be mixed together after post-processing. For example, different carbon nanoparticles and aggregates containing MWSFs or connected MWSFs with different properties and/or different post-processing methods (e.g., different sizes, different compositions, different functionality, different surface properties, different surface areas) can be mixed together.

In some embodiments, the carbon nanoparticles and aggregates described herein are produced and collected, and subsequently processed by mechanical grinding, milling, and/or exfoliating. In some embodiments, the processing (e.g., by mechanical grinding, milling, exfoliating, etc.) reduces the average size of the particles. In some embodiments, the processing (e.g., by mechanical grinding, milling, exfoliating, etc.) increases the average surface area of the particles. In some embodiments, the processing by mechanical grinding, milling and/or exfoliation shears off some fraction of the carbon layers, producing sheets of graphite mixed with the carbon nanoparticles.

In some embodiments, the mechanical grinding or milling is performed using a ball mill, a planetary mill, a rod mill, a shear mixer, a high-shear granulator, an autogenous mill, or other types of machining used to break solid materials into smaller pieces by grinding, crushing or cutting. In some embodiments, the mechanical grinding, milling and/or exfoliating is performed wet or dry. In some embodiments, the mechanical grinding is performed by grinding for some period of time, then idling for some period of time, and repeating the grinding and idling for a number of cycles. In some embodiments, the grinding period is from 1 minute to 20 minutes, or from 1 minute to 10 minutes, or from 3 minutes to 8 minutes, or approximately 3 minutes, or approximately 8 minutes. In some embodiments, the idling period is from 1 minute to 10 minutes, or approximately 5 minutes, or approximately 6 minutes. In some embodiments, the number of grinding and idling cycles is from 1 minute to 100 minutes, or from 5 minutes to 100 minutes, or from 10 minutes to 100 minutes, or from 5 minutes to 10 minutes, or from 5 minutes to 20 minutes. In some embodiments, the total amount of time of grinding and idling is from 10 minutes to 1200 minutes, or from 10 minutes to 600 minutes, or from 10 minutes to 240 minutes, or from 10 minutes to 120 minutes, or from 100 minutes to 90 minutes, or from 10 minutes to 60 minutes, or approximately 90 minutes, or approximately 120 minutes.

In some embodiments, the grinding steps in the cycle are performed by rotating a mill in one direction for a first cycle (e.g., clockwise), and then rotating a mill in the opposite direction (e.g., counterclockwise) for the next cycle. In some embodiments, the mechanical grinding or milling is performed using a ball mill, and the grinding steps are performed using a rotation speed from 100 to 1000 rpm, or from 100 to 500 rpm, or approximately 400 rpm. In some embodiments, the mechanical grinding or milling is performed using a ball mill that uses a milling media with a diameter from 0.1 mm to 20 mm, or from 0.1 mm to 10 mm, or from 1 mm to 10 mm, or approximately 0.1 mm, or approximately 1 mm, or approximately 10 mm. In some embodiments, the mechanical grinding or milling is performed using a ball mill that uses a milling media composed of metal such as steel, an oxide such as zirconium oxide (zirconia), yttria stabilized zirconium oxide, silica, alumina, magnesium oxide, or other hard materials such as silicon carbide or tungsten carbide.

In some embodiments, the carbon nanoparticles and aggregates described herein are produced and collected, and subsequently processed using elevated temperatures such as thermal annealing or sintering. In some embodiments, the processing using elevated temperatures is done in an inert environment such as nitrogen or argon. In some embodiments, the processing using elevated temperatures is done at atmospheric pressure, or under vacuum, or at low pressure. In some embodiments, the processing using elevated temperatures is done at a temperature from 500° C. to 2500° C., or from 500° C. to 1500° C., or from 800° C. to 1500° C., or from 800° C. to 1200° C., or from 800° C. to 1000° C., or from 2000° C. to 2400° C., or approximately 800° C., or approximately 1000° C., or approximately 1500° C., or approximately 2000° C., or approximately 2400° C.

In some embodiments, the carbon nanoparticles and aggregates described herein are produced and collected, and subsequently, in post processing steps, additional elements or compounds are added to the carbon nanoparticles, thereby incorporating the unique properties of the carbon nanoparticles and aggregates into other mixtures of materials.

In some embodiments, either before or after post-processing, the carbon nanoparticles and aggregates described herein are added to solids, liquids or slurries of other elements or compounds to form additional mixtures of materials incorporating the unique properties of the carbon nanoparticles and aggregates. In some embodiments, the carbon nanoparticles and aggregates described herein are mixed with other solid particles, polymers or other materials.

In some embodiments, either before or after post-processing, the carbon nanoparticles and aggregates described herein are used in various applications beyond applications pertaining to electromagnetic state sensing devices. Such applications including but not limited to transportation applications (e.g., automobile and truck tires, couplings, mounts, elastomeric O-rings, hoses, sealants, grommets, etc.) and industrial applications (e.g., rubber additives, functionalized additives for polymeric materials, additives for epoxies, etc.).

FIGS. 10A and 10B show transmission electron microscope (TEM) images of as-synthesized carbon nanoparticles. The carbon nanoparticles of FIG. 10A (at a first magnification) and FIG. 10B (at a second magnification) contain connected multi-walled spherical fullerenes 1002 (MWSFs) with graphene layers 1004 that coat the connected MWSFs. The ratio of MWSF to graphene allotropes in this example is approximately 80% due to the relatively short resonance times. The MWSFs in FIG. 10A are approximately 5 nm to 10 nm in diameter, and the diameter can be from 5 nm to 500 nm using the conditions described above. In some embodiments, the average diameter across the MWSFs is in a range from 5 nm to 500 nm, or from 5 nm to 250 nm, or from 5 nm to 100 nm, or from 5 nm to 50 nm, or from 10 nm to 500 nm, or from 10 nm to 250 nm, or from 10 nm to 100 nm, or from 10 nm to 50 nm, or from 40 nm to 500 nm, or from 40 nm to 250 nm, or from 40 nm to 100 nm, or from 50 nm to 500 nm, or from 50 nm to 250 nm, or from 50 nm to 100 nm. No catalyst was used in this process, and therefore, there is no central seed containing contaminants. The aggregate particles produced in this example had a particle size of approximately 10 µm to 100 µm, or approximately 10 µm to 500 µm.

FIG. 10C shows the Raman spectrum of the as-synthesized aggregates in this example taken with 532 nm incident light. The ID/IG for the aggregates produced in this example is from approximately 0.99 to 1.03, indicating that the aggregates were composed of carbon allotropes with a high degree of order.

FIG. 10D and FIG. 10E show example TEM images of the carbon nanoparticles after size reduction by grinding in a ball mill. The ball milling was performed in cycles with a 3 minute counter-clockwise grinding step, followed by a 6 minute idle step, followed by a 3 minute clockwise grinding step, followed by a 6 minute idle step. The grinding steps were performed using a rotation speed of 400 rpm. The milling media was zirconia and ranged in size from 0.1 mm to 10 mm. The total size reduction processing time was from 60 minutes to 120 minutes. After size reduction, the aggregate particles produced in this example had a particle size of approximately 1 µm to 5 µm. The carbon nanoparticles after size reduction are connected MWSFs with layers of graphene coating the connected MWSFs.

FIG. 10F shows a Raman spectrum from these aggregates after size reduction taken with a 532 nm incident light. The ID/IG for the aggregate particles in this example after size reduction is approximately 1.04. Additionally, the particles after size reduction had a Brunauer, Emmett and Teller (BET) specific surface area of approximately 40 m$^2$/g to 50 m$^2$/g.

The purity of the aggregates produced in this sample were measured using mass spectrometry and x-ray fluorescence (XRF) spectroscopy. The ratio of carbon to other elements, except for hydrogen, measured in 16 different batches was from 99.86% to 99.98%, with an average of 99.94% carbon.

In this example, carbon nanoparticles were generated using a thermal hot-wire processing system. The precursor material was methane, which was flowed from 1 slm to 5 slm. With these flow rates and the tool geometry, the resonance time of the gas in the reaction chamber was from approximately 20 second to 30 seconds, and the carbon particle production rate was from approximately 20 g/hr.

Further details pertaining to such a processing system can be found in the previously mentioned U.S. Pat. No. 9,862,602, titled "CRACKING OF A PROCESS GAS."

FIG. 10G, FIG. 10H and FIG. 10I show TEM images of as-synthesized carbon nanoparticles of this example. The carbon nanoparticles contain connected multi-walled spherical fullerenes (MWSFs) with layers of graphene coating the connected MWSFs. The ratio of multi-walled fullerenes to graphene allotropes in this example is approximately 30% due to the relatively long resonance times allowing thicker, or more, layers of graphene to coat the MWSFs. No catalyst was used in this process, and therefore, there is no central seed containing contaminants. The as-synthesized aggregate particles produced in this example had particle sizes of approximately 10 µm to 500 µm. FIG. 10J shows a Raman spectrum from the aggregates of this example. The Raman signature of the as-synthesized particles in this example is indicative of the thicker graphene layers which coat the MWSFs in the as-synthesized material. Additionally, the as-synthesized particles had a Brunauer, Emmett and Teller (BET) specific surface area of approximately 90 $m^2/g$ to 100 $m^2/g$.

FIG. 10K and FIG. 10L show TEM images of the carbon nanoparticles of this example. Specifically, the images depict the carbon nanoparticles after performance of size reduction by grinding in a ball mill. The size reduction process conditions were the same as those described as pertains to the foregoing FIG. 10G through FIG. 10J. After size reduction, the aggregate particles produced in this example had a particle size of approximately 1 µm to 5 µm. The TEM images show that the connected MWSFs that were buried in the graphene coating can be observed after size reduction. FIG. 10M shows a Raman spectrum from the aggregates of this example after size reduction taken with 532 nm incident light. The ID/IG for the aggregate particles in this example after size reduction is approximately 1, indicating that the connected MWSFs that were buried in the graphene coating as-synthesized had become detectable in Raman after size reduction, and were well ordered. The particles after size reduction had a Brunauer, Emmett and Teller (BET) specific surface area of approximately 90 $m^2/g$ to 100 $m^2/g$.

FIG. 10N is a scanning electron microscope (SEM) image of carbon aggregates showing the graphite and graphene allotropes at a first magnification. FIG. 10O is a SEM image of carbon aggregates showing the graphite and graphene allotropes at a second magnification. The layered graphene is clearly shown within the distortion (wrinkles) of the carbon. The 3D structure of the carbon allotropes is also visible.

The particle size distribution of the carbon particles of FIG. 10N and FIG. 10O is shown in FIG. 10P. The mass basis cumulative particle size distribution 1006 corresponds to the left y-axis in the graph ($Q^3(x)$ [%]). The histogram of the mass particle size distribution 1008 corresponds to the right axis in the graph ($dQ^3(x)$ [%]). The median particle size is approximately 33 µm. The 10th percentile particle size is approximately 9 µm, and the 90th percentile particle size is approximately 103 µm. The mass density of the particles is approximately 10 g/L.

The particle size distribution of the carbon particles captured from a multiple-stage reactor is shown in FIG. 10Q. The mass basis cumulative particle size distribution 1014 corresponds to the left y-axis in the graph ($Q^3(x)$ [%]). The histogram of the mass particle size distribution 1016 corresponds to the right axis in the graph ($dQ^3(x)$ [%]). The median particle size captured is approximately 11 µm. The 10th percentile particle size is approximately 3.5 µm, and the 90th percentile particle size is approximately 21 µm. The graph in FIG. 10Q also shows the number basis cumulative particle size distribution 1018 corresponding to the left y-axis in the graph ($Q^0(x)$ [%]). The median particle size by number basis is from approximately 0.1 µm to approximately 0.2 µm. The mass density of the particles collected is approximately 22 g/L.

Returning to the discussion of FIG. 10P, the graph also shows a second set of example results. Specifically, in this example, the particles were size-reduced by mechanical grinding, and then the size-reduced particles were processed using a cyclone separator. The mass basis cumulative particle size distribution 1010 of the size-reduced carbon particles captured in this example corresponds to the left y-axis in the graph ($Q^3(x)$ [%]). The histogram of the mass basis particle size distribution 1012 corresponds to the right axis in the graph ($dQ^3(x)$ [%]). The median particle size of the size-reduced carbon particles captured in this example is approximately 6 µm. The 10th percentile particle size is from 1 µm to 2 µm, and the 90th percentile particle size is from 10 µm to 20 µm.

Further details pertaining to making and using cyclone separators can be found in U.S. Pat. No. 10,308,512 entitled "MICROWAVE REACTOR SYSTEM WITH GAS-SOLIDS SEPARATION," which is hereby incorporated by reference in its entirety.

High Purity Carbon Allotropes Produced Using Microwave

In some cases, carbon particles and aggregates containing graphite, graphene and amorphous carbon can be generated using a microwave plasma reactor system using a precursor material that contains methane, or contains isopropyl alcohol (IPA), or contains ethanol, or contains a condensed hydrocarbon (e.g., hexane). In some other examples, the carbon-containing precursors are optionally mixed with a supply gas (e.g., argon). The particles produced in this example contained graphite, graphene, amorphous carbon and no seed particles. The particles in this example had a ratio of carbon to other elements (other than hydrogen) of approximately 99.5% or greater.

In one particular example, a hydrocarbon was the input material for the microwave plasma reactor, and the separated outputs of the reactor comprised hydrogen gas and carbon particles containing graphite, graphene and amorphous carbon. The carbon particles were separated from the hydrogen gas in a multi-stage gas-solid separation system. The solids loading of the separated outputs from the reactor was from 0.001 g/L to 2.5 g/L.

FIG. 10R, FIG. 10S, and FIG. 10T are TEM images of as-synthesized carbon nanoparticles. The images show examples of graphite, graphene and amorphous carbon allotropes. The layers of graphene and other carbon materials can be clearly seen in the images.

The particle size distribution of the carbon particles captured is shown in FIG. 10U. The mass basis cumulative particle size distribution 1020 corresponds to the left y-axis in the graph ($Q^3(x)$ [%]). The histogram of the mass particle size distribution $102_2$ corresponds to the right axis in the graph ($dQ^3(x)$ [%]). The median particle size captured in the cyclone separator in this example was approximately 14 µm. The 10th percentile particle size was approximately 5 µm, and the 90th percentile particle size was approximately 28 µm. The graph in FIG. 10U also shows the number basis cumulative particle size distribution 1024 corresponding to the left y-axis in the graph ($Q^0(x)$ [%]). The median particle size by number basis in this example was from approximately 0.1 µm to approximately 0.2 µm.

FIG. 10V, FIG. 10W, and FIG. 10X, and FIG. 10Y are images that show three-dimensional carbon-containing structures that are grown onto other three-dimensional structures. FIG. 10V is a 100× magnification of three-dimensional carbon structures grown onto carbon fibers, whereas FIG. 10W is a 200× magnification of three-dimensional carbon structures grown onto carbon fibers. FIG. 10X is a 1601× magnification of three-dimensional carbon structures grown onto carbon fibers. The three-dimensional carbon growth over the fiber surface is shown. FIG. 10Y is a 10000× magnification of three-dimensional carbon structures grown onto carbon fibers. The image depicts growth onto the basal plane as well as onto edge planes.

More specifically, FIG. 10V thru FIG. 10Y show example SEM images of 3D carbon materials grown onto fibers using plasma energy from a microwave plasma reactor as well as thermal energy from a thermal reactor. FIG. 10V shows an SEM image of intersecting fibers 1031 and 1032 with 3D carbon material 1030 grown on the surface of the fibers. FIG. 10W is a higher magnification image (the scale bar is 300 µm compared to 500 m for FIG. 10V) showing 3D carbon growth 1030 on the fiber 1032.

FIG. 10X is a further magnified view (scale bar is 40 µm) showing 3D carbon growth 1030 on fiber surface 1035, where the 3D nature of the carbon growth 1030 can be clearly seen. FIG. 10Y shows a close-up view (scale bar is 500 nm) of the carbon alone, showing interconnection between basal planes 1036 and edge planes 1034 of numerous sub-particles of the 3D carbon material grown on the fiber. FIG. 10V through FIG. 10Y demonstrate the ability to grow 3D carbon on a 3D fiber structure according to some embodiments, such as 3D carbon growth grown on a 3D carbon fiber.

In some embodiments, 3D carbon growth on fibers can be achieved by introducing a plurality of fibers into the microwave plasma reactor and using plasma in the microwave reactor to etch the fibers. The etching creates nucleation sites such that when carbon particles and sub-particles are created by hydrocarbon disassociation in the reactor, growth of 3D carbon structures is initiated at these nucleation sites. The direct growth of the 3D carbon structures on the fibers, which themselves are three-dimensional in nature, provides a highly integrated, 3D structure with pores into which resin can permeate. This 3D reinforcement matrix (including the 3D carbon structures integrated with high aspect ratio reinforcing fibers) for a resin composite results in enhanced material properties, such as tensile strength and shear, compared to composites with conventional fibers that have smooth surfaces and which smooth surfaces typically delaminate from the resin matrix.

In some embodiments, carbon materials, such as 3D carbon materials described herein, can be functionalized to promote adhesion and/or add elements such as oxygen, nitrogen, carbon, silicon, or hardening agents. In some embodiments, the carbon materials can be functionalized in situ—that is, within the same reactor in which the carbon materials are produced. In some embodiments, the carbon materials can be functionalized in post-processing. For example, the surfaces of fullerenes or graphene can be functionalized with oxygen- or nitrogen-containing species which form bonds with polymers of the resin matrix, thus improving adhesion and providing strong binding to enhance the strength of composites.

Embodiments include functionalizing surface treatments for carbon (e.g., CNTs, CNO, graphene, 3D carbon materials such as 3D graphene) utilizing plasma reactors (e.g., microwave plasma reactors) described herein. Various embodiments can include in situ surface treatment during creation of carbon materials that can be combined with a binder or polymer in a composite material. Various embodiments can include surface treatment after creation of the carbon materials while the carbon materials are still within the reactor.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure.

The specification and drawings are to be regarded in an illustrative sense rather than in a restrictive sense.

What is claimed is:

1. A network hub configured to monitor contents of a container, the network hub comprising:
    a transceiver;
    one or more processors; and
    a memory storing machine-readable code that, when executed by the one or more processors, causes the network hub to perform operations including:
        receiving, from a mobile device associated with the network hub, information pertaining to a return signal associated with a carbon-based resonance portion disposed on the container and responsive to one or more electromagnetic pings, the return signal indicating whether a level or volume of a product associated with the container satisfies a first threshold or whether a concentration of an analyte associated with the product satisfies a second threshold; and
        transmitting, over one or more wireless networks to an online delivery service, an order for delivery of one or more additional products to the user based at least in part on the return signal indicating that the level or amount of the product satisfies the first threshold or that the concentration of the analyte satisfies the second threshold.

2. The network hub of claim 1, wherein the product comprises perishable food and the concentration of the analyte is indicative of spoilage of the perishable food.

3. The network hub of claim 1, wherein execution of the machine-readable code causes the network hub to perform operations further including:
    generating a notification to replenish the product based on the return signal indicating that the level or amount of the product satisfies the first threshold or that the concentration of the analyte satisfies the second threshold.

4. The network hub of claim 3, wherein the notification indicates one or more of a quantity, a quality, an expiration date, a refill date, a refill count, a lot number, a chemical composition, or a concentration of the product.

5. The network hub of claim 4, wherein execution of the machine-readable code causes the network hub to maintain a log storing one or more of the quantity, the quality, the expiration date, the refill date, the refill count, the lot number, the chemical composition, or the concentration of the product.

6. The network hub of claim 3, wherein the notification comprises an audible alert.

7. The network hub of claim 6, wherein the audible alert comprises natural language provided to the user by a voice assistant associated with the network hub.

8. The network hub of claim 3, wherein the notification is provided to the user via email or text message.

9. The network hub of claim 3, wherein execution of the machine-readable code causes the network hub to perform operations further including:
receiving a request to replenish the product based at least in part on the notification, wherein the order is transmitted to the online delivery service in response to the received request.

10. The network hub of claim 9, wherein the request is received from the mobile device.

11. The network hub of claim 9, wherein the request is an audible command received from the user by a voice assistant associated with the network hub.

12. The network hub of claim 1, wherein the return signal further indicates a product identification (ID).

13. The network hub of claim 1, wherein the return signal further indicates a temperature of the product.

14. The network hub of claim 1, wherein execution of the machine-readable code causes the network hub to perform operations further including:
transmitting, to the mobile device, instructions to emit the one or more electromagnetic pings in a vicinity of the container.

15. The network hub of claim 14, wherein the instructions indicate a frequency or a range of frequencies of the one or more electromagnetic pings to be emitted in the vicinity of the container.

16. The network hub of claim 15, wherein the indicated frequency or range of frequencies is based at least in part on a resonant frequency of the carbon-based resonance portion disposed on the container.

17. The network hub of claim 1, wherein the one or more electromagnetic pings are emitted in a pantry associated with the user and the product comprises perishable food.

18. The network hub of claim 17, wherein the return signal indicates a quantity of the perishable food, an expiration date of the perishable food, or a temperature of the perishable food.

19. The network hub of claim 1, wherein the one or more electromagnetic pings are emitted in a medicine chest associated with the user and the product comprises mediation.

20. The network hub of claim 19, wherein the return signal indicates a quantity of the medication, an expiration date of the medication, a refill date of the medication, a refill count of the medication, a lot number of the medication, a chemical composition of the medication, or a concentration of the medication.

21. The network hub of claim 1, wherein a frequency of the return signal is based at least in part on the carbon-based resonance portion disposed on the container.

22. A method performed by one or more processors associated with a network hub, the method comprising:
receiving, from a mobile device associated with the network hub, information pertaining to a return signal associated with a carbon-based resonance portion disposed on the container and responsive to one or more electromagnetic pings, the return signal indicating whether a level or volume of a product associated with the container satisfies a first threshold or whether a concentration of an analyte associated with the product satisfies a second threshold; and
transmitting, over one or more wireless networks to an online delivery service, an order for delivery of one or more additional products to the user based at least in part on the return signal indicating that the level or amount of the product satisfies the first threshold or that the concentration of the analyte satisfies the second threshold.

23. The method of claim 22, wherein the product comprises perishable food and the concentration of the analyte is indicative of spoilage of the perishable food.

24. The method of claim 22, further comprising:
generating a notification to replenish the product based on the return signal indicating that the level or amount of the product satisfies the first threshold or that the concentration of the analyte satisfies the second threshold.

25. The method of claim 24, wherein the notification indicates one or more of a quantity, a quality, an expiration date, a refill date, a refill count, a lot number, a chemical composition, or a concentration of the product.

26. The method of claim 25, further comprising:
maintaining a log storing one or more of the quantity, the quality, the expiration date, the refill date, the refill count, the lot number, the chemical composition, or the concentration of the product.

27. The method of claim 24, wherein the notification comprises an audible alert.

28. The method of claim 24, further comprising:
receiving a request to replenish the product based at least in part on the notification, wherein the order is transmitted to the online delivery service in response to the received request.

29. The method of claim 22, wherein the one or more electromagnetic pings are emitted in a pantry associated with the user and the product comprises perishable food.

30. The method of claim 29, wherein the return signal indicates a quantity of the perishable food, an expiration date of the perishable food, or a temperature of the perishable food.

* * * * *